(12) United States Patent
Li et al.

(10) Patent No.: US 10,784,995 B2
(45) Date of Patent: Sep. 22, 2020

(54) HYBRID AUTOMATIC REPEAT REQUEST-ACKNOWLEDGEMENT INFORMATION FEEDBACK METHOD, TERMINAL DEVICE, AND NETWORK DEVICE

(71) Applicant: Huawei Technologies Co., Ltd., Shenzhen (CN)

(72) Inventors: Yuan Li, Beijing (CN); Jiafeng Shao, Beijing (CN); Chaojun Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/370,395

(22) Filed: Mar. 29, 2019

(65) Prior Publication Data

US 2019/0296864 A1 Sep. 26, 2019

Related U.S. Application Data

(63) Continuation of application No. PCT/CN2016/104699, filed on Nov. 4, 2016.

(30) Foreign Application Priority Data

Sep. 30, 2016 (WO) ................ PCT/CN2016/101077

(51) Int. Cl.
*H04L 1/18* (2006.01)
*H04W 76/28* (2018.01)
(Continued)

(52) U.S. Cl.
CPC .......... *H04L 1/1819* (2013.01); *H04L 1/1854* (2013.01); *H04L 5/00* (2013.01);
(Continued)

(58) Field of Classification Search
CPC ... H04L 1/1819; H04L 1/1854; H04L 5/0055; H04L 5/0082; H04L 72/1289;
(Continued)

(56) References Cited

U.S. PATENT DOCUMENTS

2005/0201337 A1 9/2005 Heo et al.
2013/0195041 A1* 8/2013 Papasakellariou .. H04W 72/042
370/329

(Continued)

FOREIGN PATENT DOCUMENTS

CN 1534915 A 10/2004
CN 101911813 A 12/2010
(Continued)

OTHER PUBLICATIONS

3GPP TS 36.212 V14.0.0 (Sep. 2016); "3rd Generation Partnership Project; Technical Specification Group Radio Access Network; Evolved Universal Terrestrial Radio Access (E-UTRA); Multiplexing and channel coding (Release 14)", total 148 pages.
(Continued)

*Primary Examiner* — Mewale A Ambaye
(74) *Attorney, Agent, or Firm* — Slater Matsil, LLP

(57) ABSTRACT

A HARQ-ACK information feedback method is disclosed. In an embodiment, a feedback method includes performing data channel detection on a first downlink subframe, performing data channel detection on a second downlink subframe, wherein the second downlink subframe does not overlap with the first downlink subframe in time domain, sending first HARQ-ACK information to a network device by using a first uplink channel when determining that the first downlink subframe includes a first downlink data channel and that the second downlink subframe does not include a second downlink data channel, wherein the first HARQ-ACK information indicates a receiving status of the
(Continued)

first downlink data channel and that a first length of a time domain resource corresponding to the first downlink data channel is different from a second length of a time domain resource corresponding to the second downlink data channel.

22 Claims, 11 Drawing Sheets

(51) Int. Cl.
*H04L 5/00* (2006.01)
*H04W 72/04* (2009.01)
(52) U.S. Cl.
CPC .......... *H04L 5/0023* (2013.01); *H04L 5/0044* (2013.01); *H04L 5/0055* (2013.01); *H04L 5/0082* (2013.01); *H04W 72/0446* (2013.01); *H04W 76/28* (2018.02)
(58) Field of Classification Search
CPC ... H04L 5/0023; H04L 5/0044; H04L 5/0053; H04W 72/042; H04W 72/1273; H04W 72/1289; H04W 72/0446; H04W 76/28
See application file for complete search history.

(56) References Cited

U.S. PATENT DOCUMENTS

| | | | |
|---|---|---|---|
| 2013/0272157 A1 | 10/2013 | Gao et al. | |
| 2013/0301503 A1 | 11/2013 | Park | |
| 2016/0143044 A1* | 5/2016 | Suzuki | H04W 72/0446 |
| | | | 370/329 |
| 2016/0192354 A1* | 6/2016 | Wei | H04L 1/1854 |
| | | | 370/329 |
| 2017/0142715 A1* | 5/2017 | Li | H04L 5/0048 |
| 2017/0318582 A1 | 11/2017 | Au et al. | |
| 2018/0049165 A1 | 2/2018 | Byun et al. | |
| 2019/0081742 A1* | 3/2019 | Li | H04W 72/0413 |

FOREIGN PATENT DOCUMENTS

| | | | |
|---|---|---|---|
| CN | 102468940 | A | 5/2012 |
| CN | 102480775 | A | 5/2012 |
| CN | 103391630 | A | 11/2013 |
| CN | 102468940 | * | 3/2015 |
| CN | 104620629 | A | 5/2015 |
| CN | 104770030 | A | 7/2015 |
| CN | 105933100 | A | 9/2016 |
| WO | 2009118621 | A2 | 10/2009 |
| WO | 2012036479 | A1 | 3/2012 |
| WO | 2016064049 | A1 | 4/2016 |
| WO | 2016143968 | A1 | 9/2016 |

OTHER PUBLICATIONS

3GPP TS 36.213 V14.0.0 (Sep. 2016); "3rd Generation Partnership Project; Technical Specification Group Radio Access Network; Evolved Universal Terrestrial Radio Access (E-UTRA); Physical layer procedures (Release 14)", total 406 pages.

CATT, "Discussion on the simultaneous transmissions of normal TTI and sTTI", 3GPP TSG RAN WG1 Meeting #86, R1-166460, Gothenburg, Sweden, Aug. 22-26, 2016, total 3 pages.

Interdigital, "Short TTI PUCCH Design", 3GPP TSG RAN WG1 Meeting #84bis, R1-162965, Busan, Korea, Apr. 11-15, 2016, total 3 pages.

3GPP TS 36.211 V14.0.0 (Sep. 2016); "3rd Generation Partnership Project; Technical Specification Group Radio Acces Network; Evolved Universal Terrestrial Radio Access (E-UTRA); Physical channels and modulation (Release 14)"; total 170 pages.

* cited by examiner

HYBRID AUTOMATIC REPEAT REQUEST-ACKNOWLEDGEMENT INFORMATION FEEDBACK METHOD, TERMINAL DEVICE, AND NETWORK DEVICE

CROSS-REFERENCE TO RELATED APPLICATIONS

This application is a continuation of International Application No. PCT/CN2016/104699, filed on Nov. 4, 2016, which claims priority to International Application No. PCT/CN2016/101077, filed on Sep. 30, 2016. The disclosures of the aforementioned applications are hereby incorporated by reference in their entireties.

TECHNICAL FIELD

The present invention relates to the field of wireless communications, and in particular, to a hybrid automatic repeat request-acknowledgement (hybrid automatic repeat request-acknowledgement, HARQ-ACK) feedback method and a terminal device.

BACKGROUND

A Long Term Evolution (Long Term Evolution, LTE) system uses the orthogonal frequency division multiplexing (orthogonal frequency division multiplexing, OFDM) technology, where a minimum resource unit used in data transmission is a resource element (resource element, RE), which corresponds to one OFDM symbol (OFDM symbol, OS) in time domain and one subcarrier in frequency domain. On this basis, a resource block (resource block, RB) includes a plurality of OSs consecutive in time domain and a plurality of subcarriers consecutive in frequency domain. An RB is a basic unit for resource scheduling. A transmission time interval (transmission time interval, TTI) is used as a granularity for resource allocation in the LTE system. A length of one TTI is 14 OSs, namely, a 1-millisecond (ms) subframe. Specifically, one TTI includes two slots, and each slot includes seven OSs.

To further reduce a transmission latency of the LTE system and improve user experience, a latency reduction (latency reduction) technology is introduced in Release 14, to reduce a time domain granularity for resource allocation from a 1-ms TTI to a short transmission time interval (short TTI, sTTI), and reduce time spent in packet assembly and demodulation coding, thereby reducing a physical layer air-interface latency. A length of an sTTI that may be supported by the LTE system includes 7 OSs, 2 OSs, 2&3 OSs, 3&4 OSs, or the like. In a 2&3 OSs structure, a length of some sTTIs in a subframe is 2 OSs, a length of some other sTTIs is 3 OSs. In a 3&4 OSs structure, each slot includes two sTTIs, a length of one sTTI is 3 OSs, and a length of the other sTTI is 4 OSs.

In addition, to meet different latency requirements of different users, a base station may configure different sTTI lengths for different users. Different sTTI lengths for each user may be semi-statically adjusted among 2 OSs, 2&3 OSs, 3&4 OSs, and 7 OSs, and dynamical switching may be performed between each sTTI length and a 1-ms TI length.

A terminal device can support dynamic switching between the 1-ms TII and the sTTI, so that there may be a plurality of HARQ feedback latencies in a HARQ feedback process of the terminal device. Therefore, when the base station and the terminal device support a plurality of transmission time intervals, how to feed back HARQ-ACK information of data channels corresponding to the plurality of transmission time intervals becomes a problem that needs to be resolved urgently.

SUMMARY

Embodiments of the present invention provide a HARQ-ACK information feedback method, a terminal device, a network device, and a communications system, so that when the network device and the terminal device support a plurality of transmission time intervals, HARQ-ACK information of data channels corresponding to the plurality of transmission time intervals can be fed back.

According to a first aspect, a HARQ-ACK information feedback method is provided, wherein the method includes: performing, by a terminal device, data channel detection on a first downlink subframe; performing, by the terminal device, data channel detection on a second downlink subframe, where the second downlink subframe does not overlap the first downlink subframe in terms of time domain resources; sending, by the terminal device, first HARQ-ACK information to a network device by using a first uplink channel when determining that the first downlink subframe includes a first downlink data channel and that the second downlink subframe does not include a second downlink data channel, where the first HARQ-ACK information is used to indicate a receiving status of the first downlink data channel, and a first length of a time domain resource corresponding to the first downlink data channel is greater than a second length of a time domain resource corresponding to the second downlink data channel, or a first length of a time domain resource corresponding to the first downlink data channel is less than a second length of a time domain resource corresponding to the second downlink data channel; and sending, by the terminal device, second HARQ-ACK information to the network device by using a second uplink channel when determining that the first downlink subframe includes the first downlink data channel and that the second downlink subframe includes the second downlink data channel, where the second HARQ-ACK information is used to indicate the receiving status of the first downlink data channel, and a radio resource occupied by the first uplink channel is different from that occupied by the second uplink channel.

In the feedback method, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in a possible implementation, the feedback method further includes: sending, by the terminal device, third HARQ-ACK information to the network device by using a third uplink channel when determining that the first downlink subframe includes the first downlink data channel and that the second downlink subframe includes the second downlink data channel, where the third HARQ-ACK information is used to indicate a receiving status of the second downlink data channel, the third uplink channel overlaps the first uplink channel in time domain, and the third uplink channel does not overlap the second uplink channel in time domain.

Optionally, in a possible implementation, the feedback method further includes: when the terminal device fails to detect a seventh downlink data channel in the second downlink subframe, the second HARQ-ACK information is further used to indicate a receiving status of the seventh downlink data channel, where the seventh downlink data channel does not overlap the second downlink data channel in time domain, and a length of a time domain resource corresponding to the seventh downlink data channel is equal to the second length.

Optionally, in a possible implementation, when the terminal device sends the second HARQ-ACK information to the network device by using the second uplink channel, the second HARQ-ACK is further used to indicate a receiving status of the second downlink data channel.

Optionally, in a possible implementation, the second uplink channel overlaps the first uplink channel in time domain.

Optionally, in a possible implementation, the second HARQ-ACK information is further used to indicate a receiving status of a third downlink data channel, where the third downlink data channel and the second downlink data channel correspond to a same time domain resource and correspond to different carriers.

Optionally, in a possible implementation, when determining, by the terminal device, that the first downlink subframe includes the first downlink data channel and that the second downlink subframe includes the second downlink data channel, the method further includes: sending, by the terminal device, seventh HARQ-ACK information to the network device by using a seventh uplink channel when further determining that the second downlink subframe includes an eighth downlink data channel, where the seventh HARQ-ACK information is used to indicate the receiving status of the first downlink data channel and a receiving status of the eighth downlink data channel, the eighth downlink data channel does not overlap the second downlink data channel in time domain, and the seventh uplink channel does not overlap the second uplink channel in time domain.

Optionally, in a possible implementation, the determining, by the terminal device, that the second downlink subframe does not include a second downlink data channel includes: when the terminal device fails to detect the second downlink data channel in the second downlink subframe or the terminal device detects a fourth downlink data channel in the second downlink subframe, determining, by the terminal device, that the second downlink subframe does not include the second downlink data channel, where a length of a time domain resource corresponding to the fourth downlink data channel is greater than the second length, or a length of a time domain resource corresponding to the fourth downlink data channel is less than the second length.

Optionally, in a possible implementation, the feedback method further includes: sending, by the terminal device, fourth HARQ-ACK information to the network device by using a fourth uplink channel when determining that the first downlink subframe does not include the first downlink data channel and that the second downlink subframe includes the second downlink data channel, where the fourth HARQ-ACK information is used to indicate the receiving status of the second downlink data channel, and the fourth uplink channel overlaps the first uplink channel in time domain.

Optionally, in a possible implementation, the fourth uplink channel is the same as the second uplink channel.

Optionally, in a possible implementation, the determining, by the terminal device, that the first downlink subframe does not include the first downlink data channel includes: when the terminal device fails to detect the first downlink data channel in the first downlink subframe, determining, by the terminal device, that the first downlink subframe does not include the first downlink data channel, where the fourth HARQ-ACK information is further used to indicate the receiving status of the first downlink data channel in the first downlink subframe.

Optionally, in a possible implementation, the determining, by the terminal device, that the first downlink subframe does not include the first downlink data channel includes: when the terminal device detects a fifth downlink data channel in the first downlink subframe, determining, by the terminal device, that the first downlink subframe does not include the first downlink data channel, where a length of a time domain resource corresponding to the fifth downlink data channel is greater than the first length, or a length of a time domain resource corresponding to the fifth downlink data channel is less than the first length.

Optionally, in a possible implementation, the fourth HARQ-ACK information is further used to indicate the receiving status of the first downlink data channel in the first downlink subframe.

Optionally, in a possible implementation, the fourth HARQ-ACK information is further used to indicate a receiving status of the fifth downlink data channel in the first downlink subframe.

Optionally, in a possible implementation, when determining, by the terminal device, that the first downlink subframe does not include the first downlink data channel and that the second downlink subframe includes the second downlink data channel, the method further includes: sending, by the terminal device, eighth HARQ-ACK information to the network device by using an eighth uplink channel when further determining that the second downlink subframe includes a ninth downlink data channel, where the eighth HARQ-ACK information is used to indicate the receiving status of the first downlink data channel and a receiving status of the ninth downlink data channel, the ninth downlink data channel does not overlap the second downlink data channel in time domain, and the eighth uplink channel does not overlap the fourth uplink channel in time domain.

Optionally, in a possible implementation, the feedback method further includes: receiving, by the terminal device, control signaling sent by the network device, where the control signaling is used to indicate that the network device has sent the first downlink data channel in the first downlink subframe, or the control signaling is used to instruct the terminal device to send, to the network device, HARQ-ACK information used to indicate the receiving status of the first downlink data channel.

Optionally, in a possible implementation, when the terminal device determines that the second downlink subframe includes the second downlink data channel, the receiving, by the terminal device, control signaling sent by the network device includes: receiving, by the terminal device, the control signaling that is sent by the network device by using a downlink control channel corresponding to the second downlink data channel.

Optionally, in a possible implementation, the feedback method further includes: sending, by the terminal device, fifth HARQ-ACK information to the network device by using a fifth uplink channel, where the fifth HARQ-ACK information is used to indicate a receiving status of the fifth downlink data channel, and the fifth uplink channel and the fourth uplink channel occupy different radio resources.

Optionally, in a possible implementation, the feedback method further includes: sending, by the terminal device, sixth HARQ-ACK information to the network device by using a sixth uplink channel when the terminal device fails to detect a sixth downlink data channel in the first downlink subframe, where the sixth HARQ-ACK information is used to indicate a receiving status of the sixth downlink data channel, the sixth uplink channel and the fourth uplink channel occupy different radio resources, and a length of a time domain resource corresponding to the sixth downlink data channel is greater than the first length, or a length of a time domain resource corresponding to the sixth downlink data channel is less than the first length.

Optionally, in a possible implementation, the first downlink subframe is located before the second downlink subframe, and the first length is greater than the second length.

Optionally, in a possible implementation, a length of a time domain resource corresponding to the first uplink channel is greater than a length of a time domain resource corresponding to the second uplink channel.

According to a second aspect, a HARQ-ACK information feedback method is provided, wherein the method includes: performing, by a terminal device, data channel detection on a first downlink subframe; performing, by the terminal device, data channel detection on a second downlink subframe, where the first downlink subframe does not overlap the second downlink subframe in terms of time domain resources; and sending, by the terminal device, first HARQ-ACK information to a network device by using a first uplink channel when determining that the first downlink subframe includes the first downlink data channel and that the second downlink subframe does not include the second downlink data channel, where the first HARQ-ACK information is used to indicate a receiving status of the first downlink data channel.

In the feedback method, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in a possible implementation, the feedback method further includes: sending, by the terminal device, second HARQ-ACK information to the network device by using the first uplink channel when determining that the first downlink subframe includes the first downlink data channel and that the second downlink subframe includes the second downlink data channel, where the second HARQ-ACK information is used to indicate the receiving status of the first downlink data channel and a receiving status of the second downlink data channel.

Optionally, in a possible implementation, when determining, by the terminal device, that the first downlink subframe includes the first downlink data channel and that the second downlink subframe includes the second downlink data channel, the method further includes: sending, by the terminal device, fifth HARQ-ACK information to the network device by using a fourth uplink channel when further determining that the first downlink subframe includes a fifth downlink data channel, where the fifth HARQ-ACK information is used to indicate the receiving status of the second downlink data channel and a receiving status of the fifth downlink data channel, the fifth downlink data channel does not overlap the first downlink data channel in time domain, and the fourth uplink channel does not overlap the first uplink channel in time domain.

Optionally, in a possible implementation, the determining, by the terminal device, that the second downlink subframe does not include the second downlink data channel includes: when the terminal device fails to detect the second downlink data channel in the second downlink subframe, determining, by the terminal device, that the second downlink subframe does not include the second downlink data channel, where the first HARQ-ACK is further used to indicate the receiving status of the second downlink data channel.

Optionally, in a possible implementation, the determining, by the terminal device, that the second downlink subframe does not include the second downlink data channel includes: when the terminal device detects a third downlink data channel in the second downlink subframe, determining, by the terminal device, that the second downlink subframe does not include the second downlink data channel, where a length of a time domain resource corresponding to the third downlink data channel is greater than a length of a time domain resource corresponding to the second downlink data channel, or a length of a time domain resource corresponding to the third downlink data channel is less than a length of a time domain resource corresponding to the second downlink data channel.

Optionally, in a possible implementation, the first HARQ-ACK is further used to indicate the receiving status of the second downlink data channel.

Optionally, in a possible implementation, the first HARQ-ACK is further used to indicate a receiving status of the third downlink data channel.

Optionally, in a possible implementation, when determining, by the terminal device, that the first downlink subframe includes the first downlink data channel and that the second downlink subframe does not include the second downlink data channel, the method further includes: sending, by the terminal device, sixth HARQ-ACK information to the network device by using a fifth uplink channel when further determining that the first downlink subframe includes a sixth downlink data channel, where the sixth HARQ-ACK information is used to indicate the receiving status of the second downlink data channel and a receiving status of the sixth downlink data channel, the sixth downlink data channel does not overlap the first downlink data channel in time domain, and the fifth uplink channel does not overlap the first uplink channel in time domain.

Optionally, in a possible implementation, the feedback method further includes: receiving, by the terminal device, control signaling sent by the network device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in a possible implementation, the receiving, by the terminal device, control signaling sent by the network device includes: receiving, by the terminal device, the control signaling that is sent by the network device by using a downlink control channel corresponding to the first downlink data channel.

Optionally, in a possible implementation, the terminal device sends third HARQ-ACK information to the network device by using a second uplink channel, the third HARQ-ACK information is used to indicate the receiving status of the third downlink data channel, and the second uplink channel and the first uplink channel correspond to different radio resources.

Optionally, in a possible implementation, the feedback method further includes: sending, by the terminal device, fourth HARQ-ACK information to the network device by using a third uplink channel when the terminal device fails to detect a fourth downlink data channel in the second downlink subframe, where the fourth HARQ-ACK information is used to indicate a receiving status of the fourth downlink data channel, the third uplink channel and the first uplink channel occupy different radio resources, and a length of a time domain resource corresponding to the fourth downlink data channel is greater than the length of the time domain resource corresponding to the second downlink data channel, or a length of a time domain resource corresponding to the fourth downlink data channel is less than the length of the time domain resource corresponding to the second downlink data channel.

Optionally, in a possible implementation, a first length of a time domain resource corresponding to the first downlink data channel is greater than a second length of the time domain resource corresponding to the second downlink data channel, and the first downlink subframe is located before the second downlink subframe; or the first length is less than the second length, and the first downlink subframe is located after the second downlink subframe.

According to a third aspect, a HARQ-ACK information feedback method is provided, wherein the method includes: receiving, by a network device, first HARQ-ACK information that is sent by a terminal device on a first uplink channel, where the first HARQ-ACK is used to indicate a receiving status of a first downlink data channel in a first downlink subframe and a receiving status of a second downlink data channel in a second downlink subframe, and the first downlink subframe does not overlap the second downlink subframe in terms of time domain resources; and transmitting, by the network device, downlink data based on the first HARQ-ACK information.

In the feedback method, HARQ-ACK information sent by the terminal device and received by the network device is HARQ-ACK information that is used to indicate the receiving status of the first downlink data channel and that is sent by the terminal device by using a different uplink channel, where the different uplink channel is selected, when the terminal device determines that the first downlink subframe includes the first downlink data channel, for the first downlink data channel depending on whether the second downlink subframe includes the second downlink data channel, so that HARQ-ACK information used to indicate a receiving status of a downlink data channel is properly fed back when different transmission time intervals appear during data transmission.

Optionally, in a possible implementation, the feedback method further includes: further receiving, by the network device, third HARQ-ACK information that is sent by the terminal device on a third uplink channel, where the third HARQ-ACK is used to indicate a receiving status of a third downlink data channel in the first downlink subframe and a receiving status of the second downlink data channel, the third downlink data channel does not overlap the first downlink data channel in terms of time domain resources, and the third uplink channel does not overlap the first uplink channel in time domain.

Optionally, in a possible implementation, the feedback method further includes: receiving, by the network device, second HARQ-ACK information that is sent by the terminal device on a second uplink channel, where the second HARQ-ACK information is used to indicate a receiving status of a third downlink data channel in the second downlink subframe, the second uplink channel and the first uplink channel occupy different radio resources, and a length of a time domain resource corresponding to the third downlink data channel is greater than a length of a time domain resource corresponding to the second downlink data channel, or a length of a time domain resource corresponding to the third downlink data channel is less than a length of a time domain resource corresponding to the second downlink data channel.

Optionally, in a possible implementation, the feedback method further includes: sending, by the network device, control signaling to the terminal device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in a possible implementation, the feedback method further includes: sending, by the network device, the control signaling to the terminal device by using a downlink control channel corresponding to the first downlink data channel.

Optionally, in a possible implementation, a first length of a time domain resource corresponding to the first downlink data channel is greater than a second length of the time domain resource corresponding to the second downlink data channel, and the first downlink subframe is located before the second downlink subframe; or the first length is less than the second length, and the first downlink subframe is located after the second downlink subframe.

According to a fourth aspect, the a terminal device is provided, wherein the terminal device includes modules configured to perform the feedback method in the first aspect or any possible implementation of the first aspect.

According to a fifth aspect, a terminal device is provided, wherein the terminal device includes modules configured to perform the feedback method in the second aspect or any possible implementation of the second aspect.

According to a sixth aspect a network device is provides, wherein the network device includes modules configured to perform the feedback method in the third aspect or any possible implementation of the third aspect.

According to a seventh aspect, a communications system is provided, wherein the communications method includes the terminal device in the fourth aspect or the fifth aspect, and/or the network device in the sixth aspect.

According to an eighth aspect, a terminal device is provided, wherein the terminal includes a processor and a memory, where the memory is configured to store code, the processor is configured to execute the code in the memory, and when the code is executed, the processor implements the feedback method in the first aspect or any possible implementation of the first aspect.

Optionally, the terminal device may further include a transceiver, where the transceiver is configured to communicate with another device when invoked by the processor.

According to a ninth aspect, a terminal device is provided, wherein the terminal includes a processor and a memory, where the memory is configured to store code, the processor is configured to execute the code in the memory, and when the code is executed, the processor implements the feedback method in the second aspect or any possible implementation of the second aspect.

Optionally, the terminal device may further include a transceiver, where the transceiver is configured to communicate with another device when invoked by the processor.

According to a tenth aspect, a network device is provided, wherein the network device includes a processor, a memory, and a transceiver, where the memory is configured to store code, the processor is configured to execute the code in the memory, the transceiver is configured to communicate with another device when invoked by the processor, and when the code is executed, the processor implements the feedback method in the third aspect or any possible implementation of the third aspect.

According to an eleventh aspect, a communications system is provided, wherein the communication system includes the terminal device in the eighth aspect or the ninth aspect, and/or the network device in the tenth aspect.

According to a twelfth aspect, a computer readable medium is provided, wherein the computer readable medium is configured to store program code to be executed by the terminal device, and the program code includes an instruction used to perform the feedback method in the first aspect or any possible implementation of the first aspect.

According to a thirteenth aspect, a computer readable medium is provided, wherein the computer readable medium is configured to store program code to be executed by the terminal device, and the program code includes an instruction used to perform the feedback method in the second aspect or any possible implementation of the second aspect.

According to a fourteenth aspect, a computer readable medium is provided, wherein the computer readable medium is configured to store program code to be executed by the network device, and the program code includes an instruction used to perform the feedback method in the third aspect or any possible implementation of the third aspect.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
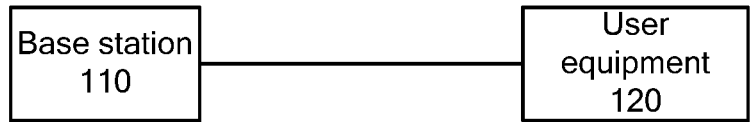
FIG. 1 is a schematic diagram of an architecture to which a HARQ-ACK information feedback method in an embodiment of the present invention may be applied.

For ease of understanding, first, an overall description is given to a schematic diagram of a system architecture that can implement a HARQ-ACK information feedback method in the embodiments of the present invention. It should be understood that the embodiments of the present invention are not limited to the system architecture shown in FIG. 1. In addition, an apparatus in FIG. 1 may be hardware, or may be functionally divided software, or a combination thereof.

After a network device 110 sends data to user equipment 120 by using a downlink data channel, the user equipment 120 may feed back, to the network device 110, HARQ-ACK information indicating a receiving status of the downlink data channel. For example, the user equipment 120 feeds back, to the network device 110 by using the HARQ-ACK information, that the downlink data channel is correctly or incorrectly received or not received. In this way, the network device 110 determines, based on the receiving status of the downlink data channel that is fed back by the user equipment 120, whether downlink data needs to be sent again subsequently.

There is a latency between sending a downlink data channel to the user equipment 120 by the network device 110 and feeding back HARQ-ACK information to the network device 110 by the user equipment 120, and different transmission time intervals correspond to different feedback latencies.

For example, when the transmission time interval is 1 millisecond, the HARQ-ACK information feedback latency may be 4 milliseconds; or when the transmission time interval is 7 OSs, the HARQ-ACK information feedback latency may be 2 milliseconds.

It can be learned that, when the network device 110 transmits downlink data channels to the user equipment 120 at different transmission time intervals, that is, when different downlink data channels correspond to time domain resources having different lengths, for example, the network device 110 first sends a first downlink data channel to the user equipment 120 at a 1-millisecond transmission time interval, and then sends a second downlink data channel to the user equipment 120 at a 7-OS transmission time interval, a HARQ-ACK information feedback time of the first downlink data channel may overlap that of the second downlink data channel.

In this case, when the user equipment 120 receives downlink data channels sent by the network device 110 at different transmission time intervals, how to feed back HARQ-ACK information of the downlink data channels to the network device 110 becomes a to-be-resolved problem.

To resolve the problem, a HARQ-ACK information feedback method is provided, so that the user equipment 120 can transmit the HARQ-ACK information of the downlink data channels to the network device 110 when receiving the downlink data channels sent by the network device 110 at different transmission time intervals.

In this embodiment of the present invention, the network device may be a base transceiver station (base transceiver station, BTS) in a Global System for Mobile Communications (Global System for Mobile communications, GSM) or Code Division Multiple Access (Code Division Multiple Access, CDMA) system, or may be a NodeB (NodeB) in a Wideband Code Division Multiple Access (Wideband Code Division Multiple Access, WCDMA) system, or may be an evolved NodeB (evolved Node B, eNB or eNodeB) in an LTE system, or may be a base station device, a small cell device, or the like in a future 5G network. This is not limited in the present invention.

In the embodiments of the present invention, a terminal device may also be referred to as user equipment (user equipment), and the terminal device may communicate with one or more core networks (core network) by using a radio access network (radio access network, RAN). The terminal device may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (session initiation protocol, SIP) phone, a wireless local loop (Wireless Local Loop, WLL) station, a personal digital assistant (personal digital assistant, PDA), a handheld device having a wireless communication function, a computing device, another processing device connected to a wireless modem, an in-vehicle device, a wearable device, a terminal device in a future 5G network, or the like.

Figure 2:
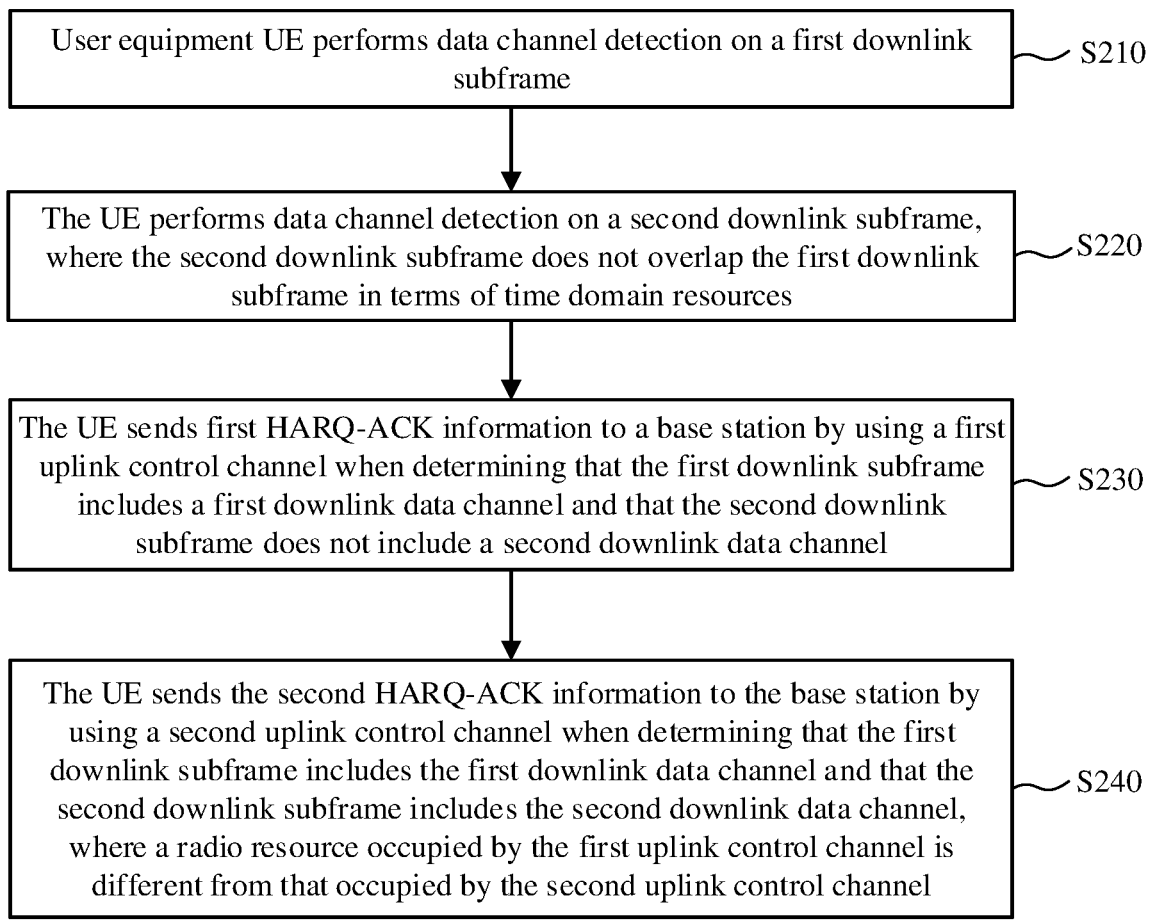
FIG. 2 is a schematic flowchart of a HARQ-ACK information feedback method according to an embodiment of the present invention.

FIG. 2 is a schematic flowchart of a HARQ-ACK information feedback method according to an embodiment of the present invention. It should be understood that FIG. 2 shows steps or operations of the feedback method. However, these steps or operations are merely examples, and other operations or variants of the operations in FIG. 2 may further be performed in this embodiment of the present invention. In addition, the steps in FIG. 2 may be performed in an order different from that presented in FIG. 2, and it is possible that not all operations in FIG. 2 need to be performed.

S210. A terminal device performs data channel detection on a first downlink subframe. Specifically, the terminal device detects whether the first downlink subframe includes a downlink data channel corresponding to a specific transmission time interval.

For example, the terminal device detects whether the first downlink subframe includes a downlink data channel corresponding to a 1-ms TI or a downlink data channel corresponding to an sTTI. In this case, the downlink data channel corresponding to the 1-ms TI may be a PDSCH, and the downlink data channel corresponding to the sTTI may be a short PDSCH, which may be referred to as an sPDSCH for short.

S220. The terminal device performs data channel detection on a second downlink subframe, where the second downlink subframe does not overlap the first downlink subframe in terms of time domain resources.

It should be understood that, that two time domain resources overlap (overlap) includes that the two time domain resources have an overlapped part, where the two time domain resources may be the same, or may be different but have an overlapped part. For example, one time domain resource in a 1-ms subframe is a 1-ms TTI, another time domain resource in the subframe is an sTTI whose length is 2 OSs, and the two time domain resources are different but have an overlapped part. The subframe does not overlap a next subframe in terms of time domain resources.

Specifically, the terminal device detects whether the second downlink subframe includes a downlink data channel corresponding to a specific transmission time interval. For example, the terminal device detects whether the second downlink subframe includes a downlink data channel corresponding to a 1-ms TTI or a downlink data channel corresponding to an sTTI. In this case, the downlink data channel corresponding to the 1 ms may be a PDSCH, and the downlink data channel corresponding to the sTTI may be an sPDSCH.

S230. The terminal device sends first HARQ-ACK information to a network device by using a first uplink channel when determining that the first downlink subframe includes a first downlink data channel and that the second downlink subframe does not include a second downlink data channel.

The first HARQ-ACK information is used to indicate a receiving status of the first downlink data channel, and a first length of a time domain resource corresponding to the first downlink data channel is different from a second length of a time domain resource corresponding to the second downlink data channel.

A time domain resource corresponding to a target downlink data channel includes a time domain resource that corresponds to the target downlink data channel when the network device sends the target downlink data channel. The time domain resource may be a time domain resource that corresponds to a data information part and that is obtained by excluding, from a transmission time interval at which the target downlink data channel is sent, a time domain part that is occupied by a control channel. For example, a time domain resource corresponding to a 1-ms PDSCH may be a time domain part that is obtained by excluding, from a 1-ms TTI, a part occupied by a PDCCH. Alternatively, the time domain resource may be all time domain resources corresponding to a transmission time interval at which the target downlink data channel is sent. For example, a time domain resource corresponding to a 2-OS sPDSCH may be two downlink OFDM symbols corresponding to the sTTI. The target downlink data channel may be a first downlink data channel, a second downlink data channel, a third downlink data channel, a fourth downlink data channel, a fifth downlink data channel, a sixth downlink data channel, a seventh downlink data channel, an eighth downlink data channel, or a ninth downlink data channel. A time domain resource corresponding to a target uplink channel includes a time domain resource that corresponds to the target uplink channel when the terminal device sends the target uplink channel. This is similar to a definition of a time domain resource corresponding to a target downlink data channel, and details are not described again. The target uplink channel is a first uplink channel, a second uplink channel, a third uplink channel, a fourth uplink channel, a fifth uplink channel, a sixth uplink channel, a seventh uplink channel, or an eighth uplink channel.

In this embodiment of the present invention, that a length of a time domain resource corresponding to a first target downlink data channel is different from a length of a time domain resource corresponding to a second target downlink data channel may include the following cases: The length of the time domain resource corresponding to the first target downlink data channel is greater than the length of the time domain resource corresponding to the second target downlink data channel, or the length of the time domain resource corresponding to the first target downlink data channel is less than the length of the time domain resource corresponding to the second target downlink data channel. The first target downlink data channel or the second target downlink data channel may be a first downlink data channel, a second downlink data channel, a third downlink data channel, a fourth downlink data channel, a fifth downlink data channel, a sixth downlink data channel, a seventh downlink data channel, an eighth downlink data channel, or a ninth downlink data channel in subsequent examples.

Specifically, considering that a HARQ feedback latency of a 1-ms TTI is greater than a HARQ feedback latency of an sTTI, when a PDSCH is earlier than an sPDSCH, an uplink channel for performing HARQ feedback for the PDSCH and an uplink channel for performing HARQ feedback for the sPDSCH may overlap in time domain. For example, the two uplink channels are in a same uplink subframe, or receiving status information of the PDSCH and that of the sPDSCH are both carried in a same uplink channel.

When the terminal device performs detection on the first downlink subframe, and determines, based on the detection, that the first downlink subframe includes the first downlink data channel, and when the terminal device performs detection on the second downlink subframe, and determines, based on the detection, that the second downlink subframe does not include the second downlink data channel, the terminal device determines the first uplink channel as an uplink channel for sending the first HARQ-ACK information, and uses the first uplink channel to send the first HARQ-ACK information that is used to indicate the receiving status of the first downlink data channel.

The first uplink channel may be an uplink control channel, or may be an uplink traffic channel that may be alternatively referred to as an uplink data channel. The uplink control channel may be a physical uplink control channel (physical uplink control channel, PUCCH) or a short physical uplink control channel (short physical uplink control channel, sPUCCH), and the uplink traffic channel may be a physical uplink shared channel (physical uplink shared channel, PUSCH) or a short physical uplink shared channel (short physical uplink shared channel, sPUSCH).

S240. The terminal device sends second HARQ-ACK information to the network device by using a second uplink channel when determining that the first downlink subframe includes the first downlink data channel and that the second downlink subframe includes the second downlink data channel, where a radio resource occupied by the first uplink channel is different from that occupied by the second uplink channel.

When the terminal device performs detection on the first downlink subframe, and determines, based on the detection, that the first downlink subframe includes the first downlink data channel, and when the terminal device performs detection on the second downlink subframe, and determines, based on the detection, that the second downlink subframe includes the second downlink data channel, the terminal device determines the second uplink channel as an uplink channel for sending the second HARQ-ACK information, and uses the second uplink channel to send the second HARQ-ACK information that is used to indicate the receiving status of the first downlink data channel.

The second uplink channel may be an uplink control channel, or may be an uplink traffic channel that may be alternatively referred to as an uplink data channel. The uplink control channel may be a PUCCH or an sPUCCH, and the uplink traffic channel may be a PUSCH or an sPUSCH.

In this embodiment of the present invention, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Figure 3:
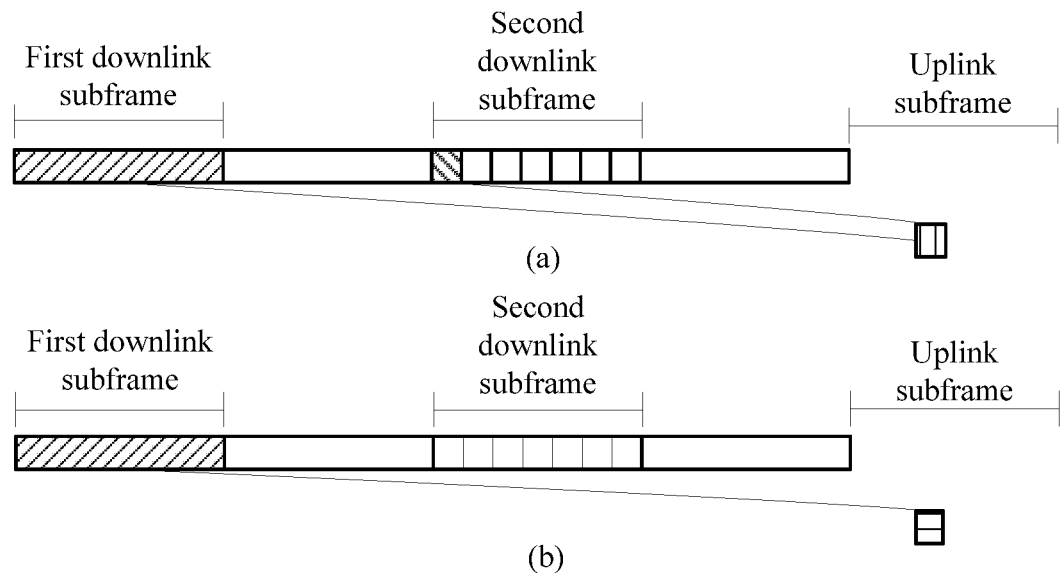
FIG. 3 is a schematic diagram of a HARQ-ACK information feedback method according to an embodiment of the present invention.

As shown in FIG. 3, a first downlink data channel in a first downlink subframe is a 1-ms PDSCH, and a second downlink data channel in a second downlink subframe is an sPDSCH. In FIG. 3, a forward-slash grid represents that a 1-ms PDSCH is detected, a back-slash grid represents that an sPDSCH is detected, a horizontal-line grid represents a first uplink channel, and a vertical-line grid represents a second uplink channel.

As shown in part (a) of FIG. 3, when detecting the 1-ms PDSCH in the first downlink subframe and detecting the sPDSCH in the second downlink subframe, a terminal device uses the second uplink channel to feed back HARQ-ACK information of the 1-ms PDSCH.

As shown in part (b) of FIG. 3, when detecting the 1-ms PDSCH in the first downlink subframe and failing to detect the sPDSCH in the second downlink subframe, a terminal device uses the first uplink channel to feed back HARQ-ACK information of the 1-ms PDSCH.

It can be learned from part (a) and part (b) of FIG. 3 that, when detecting the 1-ms PDSCH, the terminal device selects, depending on whether the sPDSCH is detected, a different uplink channel for the 1-ms PDSCH to feed back the HARQ-ACK information carrying a receiving status of the 1-ms PDSCH.

In this case, as shown in part (a) of FIG. 3, the terminal device may alternatively use the second uplink channel to feed back a receiving status of the sPDSCH. Specifically, the HARQ-ACK information carrying the receiving status of the 1-ms PDSCH may be further used to indicate the receiving status of the sPDSCH. Certainly, another uplink channel may alternatively be used to feed back the receiving status of the sPDSCH.

In this embodiment of the present invention, optionally, when serving as an uplink control channel, the first uplink channel or the second uplink channel may be specifically a PUCCH whose transmission time interval is 1 ms or an sPUCCH whose transmission time interval is less than 1 ms. Optionally, when serving as an uplink traffic channel, the first uplink channel or the second uplink channel may be specifically a PUSCH whose transmission time interval is 1 ms or an sPUSCH whose transmission time interval is less than 1 ms. The first downlink data channel and the second downlink data channel each may be a PDSCH or an sPDSCH.

Optionally, a time domain length of the sPUCCH may be one of one symbol, two symbols, three symbols, four symbols, and one slot. A time domain length of the 1 ms PUCCH is 1 ms. Optionally, a time domain length of the sPDCCH may be one of one symbol, two symbols, three symbols, four symbols, and one slot. A time domain length of a PDCCH may be 1 ms. Optionally, a time domain length of the sPUSCH may be one of one symbol, two symbols, three symbols, four symbols, and one slot. A time domain length of the 1 ms PUSCH is 1 ms.

Optionally, a receiving status of the first downlink data channel or the second downlink data channel may be acknowledgement (acknowledgement, ACK) or negative acknowledgement (negative acknowledgement, NACK). Alternatively, the receiving status of the first downlink data channel or the second downlink data channel may be "ACK", "NACK", or discontinuous transmission (discontinuous transmission, "DTX").

For example, when the terminal device detects a downlink data channel in a downlink subframe, if the terminal device correctly receives the downlink data channel, a receiving status of the downlink data channel is "ACK"; or if the terminal device incorrectly receives the downlink data channel, a receiving status of the downlink data channel is "NACK". When the terminal device determines, through detection, that a downlink subframe does not include a downlink data channel, a receiving status of the downlink data channel may be "NACK" or "DTX".

Optionally, the receiving status of the downlink data channel may be "ACK" or "NACK" that is used, when the terminal device detects the downlink data channel in the downlink subframe, to indicate that the downlink data channel is correctly or incorrectly received.

Certainly, after determining, through detection, that the downlink subframe does not include the downlink data channel, the terminal device may alternatively determine, for the downlink data channel, a receiving status used to indicate that the terminal device fails to receive the downlink data channel. In this case, the receiving status of the downlink data channel may be represented by "NACK" or "DTX".

For example, when the terminal device fails to receive the first downlink data channel in the first downlink subframe, the terminal device may generate HARQ-ACK information indicating that the receiving status is "NACK" or "DTX". In this case, "NACK" or "DTX" indicates that the terminal device fails to receive the first downlink data channel in the first downlink subframe. Alternatively, when the terminal device fails to receive the second downlink data channel in the second downlink subframe, the terminal device may generate HARQ-ACK information indicating that the receiving status is "NACK" or "DTX".

Optionally, "ACK" may be represented by a binary "1", and "NACK" may be represented by a binary "0". Alternatively, "ACK" may be represented by a binary "1", and "NACK" and "DTX" may be represented by a binary "0".

When the terminal device detects the downlink data channel in the downlink subframe, that the data channel is detected may be determined by detecting a physical downlink control channel (physical downlink control channel, PDCCH), and that the data channel is detected does not represent that the data channel is correctly received. Therefore, when the downlink data channel is detected in the downlink subframe, the receiving status of the downlink data channel may be "ACK", or may be "NACK". Specifically, the terminal device blindly detects a cyclic redundancy check (cyclic redundancy check, CRC) included in a PDCCH corresponding to the downlink data channel and determines, through checking, whether the data channel is detected. If the checking is correct, it indicates that a corresponding downlink data channel is detected.

It should be noted that, that the terminal device determines that the first downlink subframe does not include the first downlink data channel does not affect determining the receiving status of the first downlink data channel by the terminal device. Specifically, when the terminal device determines that the first downlink subframe does not include the first downlink data channel, the receiving status generated for the first downlink data channel by the terminal device may be "NACK" or "DTX".

It should be noted that, that the terminal device determines that the second downlink subframe does not include the second downlink data channel does not affect determining the receiving status of the second downlink data channel by the terminal device. Specifically, when the terminal device determines that the second downlink subframe does not include the second downlink data channel, the receiving status generated for the second downlink data channel by the terminal device may be "NACK" or "DTX".

In this embodiment of the present invention, when performing data channel detection on a downlink subframe, the terminal device may determine whether a downlink data channel exists in the downlink subframe by using a plurality of methods.

In one method, the terminal device determines, by detecting a target downlink data channel in a target downlink subframe, whether the target downlink subframe includes the target downlink data channel. In another method, the terminal device determines, by detecting another downlink data channel that is in a target downlink subframe and whose length is different from that of a target downlink data channel, that the target downlink subframe does not include the target downlink data channel.

The target downlink subframe is the first downlink subframe or the second downlink subframe. The target downlink data channel is the first downlink data channel or the second downlink data channel, or is a third downlink data channel, a fourth downlink data channel, a fifth downlink data channel, a sixth downlink data channel, a seventh downlink data channel, an eighth downlink data channel, or a ninth downlink data channel which is subsequently mentioned.

For example, when the terminal device determines whether the target downlink subframe includes the target downlink data channel, the terminal device may directly detect the target downlink data channel in the target downlink subframe. If the target downlink data channel is detected, the terminal device determines that the target downlink subframe includes the target downlink data channel; or if the target downlink data channel is not detected, the terminal device determines that the target downlink subframe does not include the target downlink data channel. The terminal device may alternatively determine, by detecting that the target downlink subframe includes a downlink data channel whose corresponding time domain resource length is different from that of the target downlink data channel, that the target downlink subframe does not include the target downlink data channel.

When the terminal device detects whether the target downlink data channel exists in the target downlink subframe, the terminal device may determine, based on a downlink control channel corresponding to the target downlink data channel, whether the target downlink subframe includes the target downlink data channel. The corresponding downlink control channel is a downlink control channel scheduled for the target downlink data channel. The target downlink data channel and the corresponding downlink control channel may be in a same transmission time interval, or may be in two different transmission time intervals. If the target downlink data channel and the corresponding downlink control channel are in different transmission time intervals, the target downlink data channel and the corresponding downlink control channel may be in a same downlink subframe, or may be in different downlink subframes. The transmission time interval is a 1-ms TTI or an sTTI. That the target downlink data channel and the corresponding downlink control channel are in a same transmission time interval includes the following case: The target downlink data channel and the corresponding downlink control channel are in a time domain range of the same transmission time interval. For example, an sPDSCH and an sPDCCH that is used to schedule the sPDSCH are in a same transmission time interval. When an application control channel uses a two-level downlink control information downLink control information, DCI) structure in different transmission time intervals, a 1-ms PDCCH may further carry a part of control information of the sPDSCH. The control information is universal for all sPDSCHs in a current subframe. In this case, the sPDSCH also corresponds to the 1-ms PDCCH. The terminal device may determine, by detecting downlink grant DL grant signaling included in the corresponding downlink control channel, whether the target data channel is included. If the corresponding DL grant signaling is detected, the terminal device determines that the target data channel is included; otherwise, the target data channel is not included. Alternatively, the terminal device may determine, by detecting signaling that is used to indicate a TI length included in a current downlink subframe and that is included in the downlink control channel, whether the target downlink data channel is included. If the signaling indicates that the TTI length of the current subframe is different from that of the target downlink data channel, the terminal device determines that the target downlink data channel is not included. For example, when the control channel uses the two-level DCI structure, and the 1-ms PDCCH indicates that a TTI length of the current subframe is 1 ms, it is determined that the subframe does not include the target downlink data channel sPDSCH.

When the corresponding downlink control channel and the target downlink data channel are in a same transmission time interval, if the terminal device detects that the target downlink subframe includes the corresponding downlink control channel, the terminal device determines that the target downlink subframe includes the target downlink data channel; otherwise, the terminal device determines that the downlink subframe does not include the target downlink data channel. For example, if the target downlink data channel is a 1-ms PDSCH, the corresponding downlink control channel is a 1 ms-TTI PDCCH. When detecting the 1 ms-TTI PDCCH, the terminal device determines that the downlink subframe includes the 1-ms PDSCH. If the target downlink data channel is an sPDSCH, the corresponding downlink control channel is an sPDCCH having a same sTTI. When detecting that the target downlink subframe includes the sPDCCH having the same sTTI, the terminal device determines that the target downlink subframe includes the corresponding sPDSCH.

When the corresponding downlink control channel and the target downlink data channel are not in a same transmission time interval, it may be determined, by determining that the corresponding downlink control channel is detected and signaling indicating that the target downlink data channel exists is received, that the downlink subframe includes the target downlink data channel; otherwise, it may be determined that the downlink subframe does not include the target downlink data channel. The corresponding downlink control channel and the target downlink data channel may be in a same downlink subframe, or may be in different downlink subframes.

For example, the target downlink data channel is an sPDSCH, a corresponding downlink control channel thereto may be a PDCCH in a same subframe, and the PDCCH is not in an sTTI. Because the sPDSCH may be scheduled at two levels, a network device may alternatively notify, by using control signaling in the PDCCH, whether the current subframe includes the target downlink data channel.

The control signaling may be embodied as follows: The control signaling in the PDCCH notifies the terminal device whether a subframe at which the target downlink data channel is located is a 1 ms-TI subframe or an sTTI subframe; and concurrently, the signaling indirectly notifies whether the current subframe includes the target downlink data channel. If the subframe is the 1 ms-TI subframe, the downlink data channel included in the subframe is a PDSCH; or if the subframe is the sTTI subframe, the downlink data channel included in the subframe is an sPDSCH. Therefore, if the second downlink data channel is an sPDSCH, existence of the sPDSCH may also be determined by detecting a PDCCH.

In addition, when a scheduling mode is multi-sTTI scheduling, multi-subframe scheduling, or semi-persistent scheduling, one control channel, PDCCH, or sPDCCH may schedule at least two data channels, PDSCHs, or sPDSCHs. In this case, the target downlink data channel and the corresponding downlink control channel may be in different transmission time intervals or different downlink subframes.

The following describes a specific manner of detecting a downlink control channel by the terminal device. When performing downlink data scheduling or uplink data scheduling on the terminal device, the network device may scramble downlink control information (downlink control information, DCI) by using a terminal device-specific scrambling code. Therefore, the terminal device may descramble a downlink control channel by using the terminal device-specific scrambling code, and determine that the network device schedules the downlink data channel for the terminal device. If the terminal device detects, by using the downlink control channel, information about scheduling of the PDSCH or the sPDSCH, the terminal device may determine that the downlink data channel is detected, and the terminal device needs to perform HARQ feedback on the downlink data channel.

Further, if the second downlink data channel is an sTTI, the terminal device detects, by using a control channel, a UL grant for scheduling the sPUSCH. The sPUSCH overlaps a first uplink control channel in time domain (because a scheduling latency of the sTTI may be the same as a HARQ-ACK feedback latency of the sTTI). In this case, although no downlink data is scheduled by the network device, the network device may not require the terminal device to feed back a HARQ-ACK by using an sPUCCH. However, the sPUSCH and the first uplink control channel cannot be transmitted concurrently even if they overlap in time domain. In this case, the terminal device needs to select an sPUCCH that does not overlap the sPUSCH in time domain, to feed back the HARQ-ACK.

The terminal device may determine, by detecting that the target downlink subframe includes another downlink data channel whose length is different from that of the target downlink data channel, that the target downlink subframe does not include the target downlink data channel. This is because a structure of a same downlink subframe may be only one of a 1 ms-TI subframe and an sTTI subframe, or because the another downlink data channel whose length is different from that of the target downlink data channel has a higher demodulation priority. Therefore, if the terminal device detects one of the structures, the other structure can be excluded. If a data channel of another time length is detected, it indicates that a receiving status of the target data channel in the downlink subframe is detected to be "DTX". In this case, regardless of whether the terminal device detects the target downlink data channel, the terminal device can determine that the target downlink subframe does not include the target downlink data channel. The structure of the downlink subframe may be obtained by using control signaling or by detecting a structure of a reference signal in the downlink subframe.

For example, if the terminal device determines, by detecting a control channel corresponding to a 1-ms PDSCH, that a current subframe includes a 1-ms TTI, or determines, based on a subframe type indicated by a PDCCH (an indicating manner is as described above) or based on a detected structure of a reference signal in the current subframe, that a current downlink subframe is a 1 ms-TI subframe, a possibility of existence of an sPDSCH can be excluded. In other words, even if existence of an sPDSCH is not detected, it can be determined that the current subframe does not include an sPDSCH.

For example, if a demodulation priority of an sPDSCH is higher, after determining that a current subframe includes an sPDSCH and detecting a 1-ms PDSCH, the terminal device may determine that the current subframe does not include a 1-ms PDSCH. This is because demodulation of an sPDSCH in the current subframe may interrupt demodulation of a 1-ms PDSCH in the same subframe.

After detecting the first downlink data channel in the first downlink subframe, the terminal device may select a different uplink channel based on existence of the second downlink data channel in the second downlink subframe, to feed back a HARQ-ACK carrying the receiving status of the first downlink data channel, thereby resolving a problem that HARQ-ACK feedback information is fuzzy.

It should be noted that, for any uplink channel carrying a HARQ-ACK, corresponding downlink data channels (namely, a quantity of included bits) are predefined or notified by the network device, instead of being flexibly determined based on existence of a TTI or an sTTI. In this way, that the network device and the terminal device have inconsistent understandings of HARQ-ACK information included in each uplink channel can be avoided.

It should be understood that, in this embodiment of the present invention, a technical solution for feeding back a receiving status of a downlink data channel can be also used to feed back a receiving status of a downlink control channel. For example, the downlink control channel carries downlink Semi-Persistent Scheduling Release (Semi-Persistent Scheduling Release, SPS Release) signaling.

In this embodiment of the present invention, when the first uplink channel and the second uplink channel occupy different radio resources, the first uplink channel and the second uplink channel may correspond to totally different time domain resources, or may correspond to different time domain resources having overlapped time domains, or may correspond to a same time domain resource but different frequency domain resources, code domain resources, or space domain resources.

That the first uplink channel and the second uplink channel correspond to totally different time domain resources may be: There is no overlap between a time domain resource corresponding to the first uplink channel and a time domain resource corresponding to the second uplink channel, but lengths of the corresponding time domain resources may be the same or may be different. The time domain resource corresponding to the first uplink channel may be earlier than or later than the time domain resource corresponding to the second uplink channel.

Figure 4:
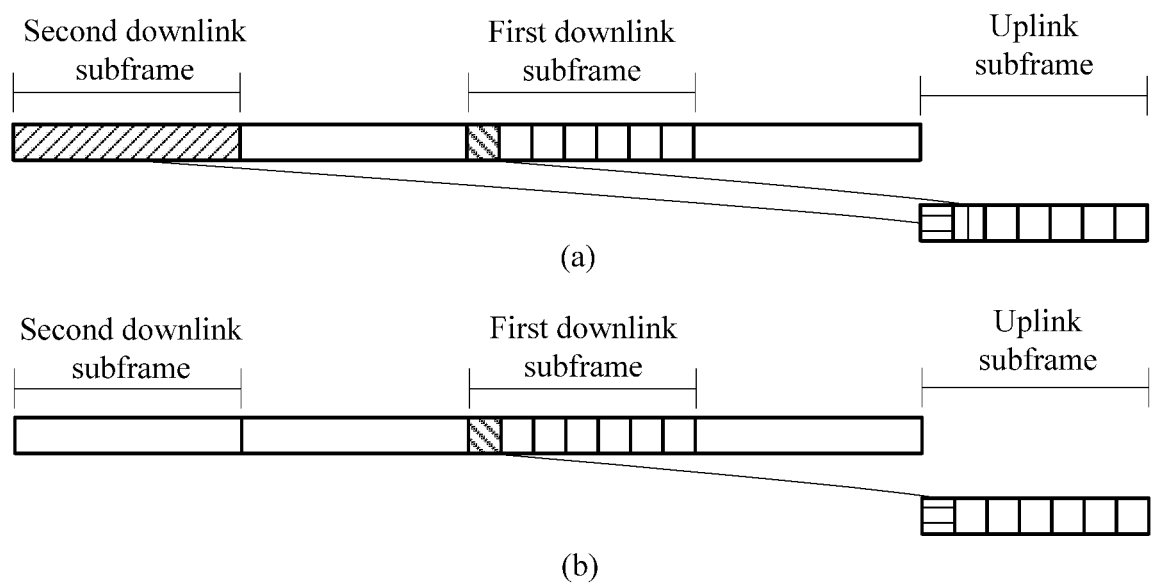
FIG. 4 is a schematic diagram of a HARQ-ACK information feedback method according to another embodiment of the present invention.

As shown in FIG. 4, a first downlink data channel in a first downlink subframe is an sPDSCH, and a second downlink data channel in a second downlink subframe is a 1-ms PDSCH. A same reference numeral in FIG. 4 and FIG. 3 denotes a same meaning. For brevity, details are not described herein again.

As shown in part (a) of FIG. 4, when detecting the sPDSCH in the first downlink subframe and detecting the 1-ms PDSCH in the second downlink subframe, a terminal device uses a second uplink channel to feed back a HARQ-ACK of the sPDSCH.

As shown in part (b) of FIG. 4, when detecting the sPDSCH in the first downlink subframe and failing to detect the 1-ms PDSCH in the second downlink subframe, a terminal device uses a first uplink channel to feed back a HARQ-ACK of the sPDSCH.

It can be learned from part (a) and part (b) of FIG. 4 that, a time domain resource corresponding to the first uplink channel does not overlap a time domain resource corresponding to the second uplink channel, and the time domain resource corresponding to the first uplink channel is earlier than the time domain resource corresponding to the second uplink channel.

In this case, as shown in part (a) of FIG. 4, the terminal device may use the first uplink channel to feed back a HARQ-ACK of the PDSCH.

It should be noted that a radio resource occupied by a target uplink channel may be explicitly or implicitly indicated by a network device. The implicit indication includes obtaining the radio resource by mapping a resource corresponding to a downlink control channel corresponding to a downlink data channel. The explicit indication includes: The network device indicates the radio resource of the target uplink channel by using control signaling included in the downlink control channel corresponding to the downlink data channel, or the network device configures the radio resource by using higher layer radio resource control (radio resource control, RRC) signaling, or the network device configures a target uplink channel resource set by using the RRC signaling, and then the control signaling included in the downlink control channel indicates a sequence number in the resource set, so that the terminal device obtains a specific resource. The radio resource includes at least one of a time domain resource, a frequency domain resource, a code domain resource, and a space domain resource. The target uplink channel is an uplink channel by which the terminal device feeds back a receiving status of a downlink data channel in a downlink subframe. The target uplink channel is a first uplink channel, a second uplink channel, a third uplink channel, a fourth uplink channel, a fifth uplink channel, a sixth uplink channel, a seventh uplink channel, or an eighth uplink channel.

The first uplink channel is different from the second uplink channel. When the first uplink channel and the second uplink channel correspond to an overlapped time domain resource, a length of a time domain resource corresponding to the first uplink channel may be different from a length of a time domain resource corresponding to the second uplink channel, and the two time domain resources have overlapped parts in time domain.

Figure 5:
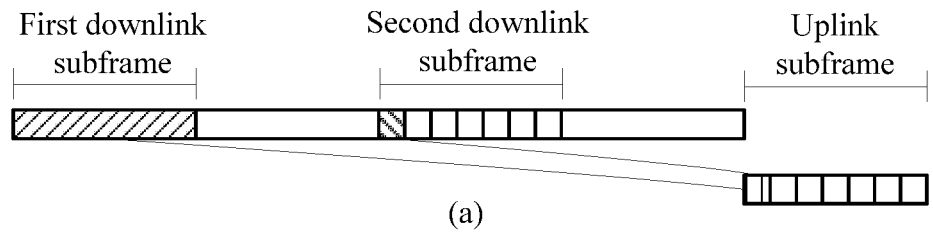
FIG. 5 is a schematic diagram of a HARQ-ACK information feedback method according to still another embodiment of the present invention.
Figure 5:
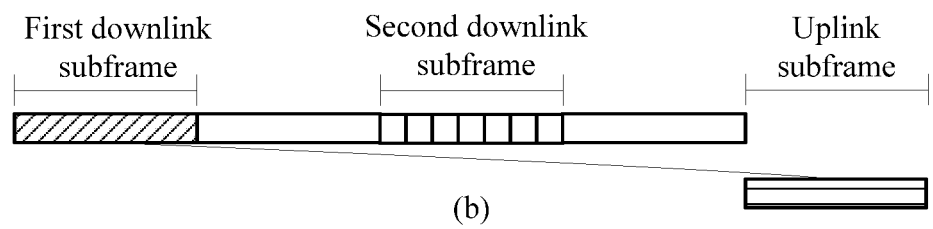

As shown in FIG. 5, a first downlink data channel in a first downlink subframe is a 1-ms PDSCH, and a second downlink data channel in a second downlink subframe is an sPDSCH. A same reference numeral in FIG. 5 and FIG. 3 denotes a same meaning. For brevity, details are not described herein again.

As shown in part (a) of FIG. 5, when detecting the 1-ms PDSCH in the first downlink subframe and detecting the sPDSCH in the second downlink subframe, a terminal device uses a second uplink channel to feed back a HARQ-ACK of the 1-ms PDSCH.

As shown in part (b) of FIG. 5, when detecting the 1-ms PDSCH in the first downlink subframe and failing to detect the sPDSCH in the second downlink subframe, a terminal device uses a first uplink channel to feed back a HARQ-ACK of the 1-ms PDSCH.

It can be learned from part (a) and part (b) of FIG. 5 that, a time domain resource corresponding to the first uplink channel overlaps a time domain resource corresponding to the second uplink channel.

In this case, as shown in part (a) of FIG. 5, the terminal device may use the second uplink channel to feed back a HARQ-ACK of the sPDSCH.

The same time domain resource but different frequency domain resources, code domain resources, or space domain resources include that the first uplink channel and the second uplink channel are identical in terms of time domain resources but orthogonal in frequency domain, code domain, or space domain.

In this embodiment of the present invention, optionally, after the terminal device detects that the first downlink subframe includes the first downlink data channel and that the second downlink subframe includes the second downlink data channel, and determines that second HARQ-ACK information is sent on the second uplink channel, the terminal device may send, on a third uplink channel, third HARQ-ACK information used to indicate a receiving status of the second downlink data channel.

Optionally, the third uplink channel may overlap the first uplink channel in time domain. To be specific, there is an overlapped part between a time domain resource corresponding to the third uplink channel and a time domain resource corresponding to the first uplink channel. When the third uplink channel overlaps the first uplink channel in time domain, because it is possible that the terminal device does not support concurrent transmission, namely, concurrent sending of parts that overlap in time domain and that are of two channels, when the terminal device detects that the first downlink subframe includes the first downlink data channel and that the second downlink subframe includes the second downlink data channel, the first uplink channel cannot be used to send HARQ-ACK information used to indicate a receiving status of the first downlink data channel, but the second uplink channel needs to be used to feed back the HARQ-ACK.

Further, a radio resource occupied by the third uplink channel and that occupied by the second uplink channel may be the same. In other words, the two uplink channels may be a same uplink channel, and the third HARQ-ACK information is the second HARQ-ACK information. The terminal device may use the uplink channel to feed back the receiving status of the first downlink data channel and that of the second downlink data channel. When it is detected that the first downlink subframe includes the first downlink data channel and that the second downlink subframe includes the second downlink data channel, if a HARQ-ACK feedback of the first downlink data channel and that of the second downlink data channel correspond to uplink channels in a same time domain resource according to a HARQ timing relationship, the receiving status of the first downlink data channel and that of the second downlink data channel are fed back on the uplink channel.

Optionally, a time domain resource corresponding to the third uplink channel may not overlap that corresponding to the second uplink channel. When the terminal device detects that the first downlink subframe includes the first downlink data channel and that the second downlink subframe includes the second downlink data channel, if a HARQ-ACK feedback of the first downlink data channel and that of the second downlink data channel correspond to uplink channels in different time domain resources according to a HARQ timing relationship, two pieces of HARQ-ACK information are respectively sent on two uplink channels, for example, the third uplink channel and the second uplink channel. Because it is possible that the terminal device does not support concurrent transmission, the two uplink channels do not overlap in time domain.

Optionally, when the terminal device fails to detect a seventh downlink data channel in the second downlink subframe, the second HARQ-ACK information is further used to indicate a receiving status of the seventh downlink data channel, where the seventh downlink data channel does not overlap the second downlink data channel in time domain, and a length of a time domain resource corresponding to the seventh downlink data channel is equal to a second length. When the terminal device detects the second downlink data channel in the second downlink subframe, and determines, based on HARQ feedback timing for the second downlink data channel and HARQ feedback timing for the first downlink data channel, that the second downlink data channel and the first downlink data channel are in two adjacent uplink sTTIs of a same uplink subframe, the second uplink channel and the third uplink channel respectively feed back the second HARQ-ACK information and the third HARQ-ACK information. In other words, the second HARQ-ACK information does not indicate a receiving status of the second downlink data channel. In addition, the second uplink channel further corresponds to the seventh downlink data channel in the second downlink subframe in addition to the first downlink data channel. To be specific, based on HARQ timing for the first downlink data channel and that for the seventh downlink data channel, a HARQ-ACK of the first downlink data channel and that of the seventh downlink data channel both need to be sent on the second uplink channel. In this case, if the terminal device fails to detect the seventh downlink channel in an sTTI of the second downlink subframe corresponding to the second uplink channel, the terminal device cannot determine whether a base station does not send the seventh downlink channel or the terminal device fails to detect the seventh downlink channel that has been sent on the channel. Therefore, the terminal device further adds a receiving status of an undetected seventh downlink channel to the second HARQ-ACK information, to ensure that a quantity of bits of the second HARQ-ACK information is fixed, thereby ensuring correct demodulation of the base station. The seventh downlink data channel and the second downlink data channel are located in a same downlink subframe, and in a same downlink subframe, a terminal device corresponds to only TTIs having a same length. Therefore, the terminal device assumes that the two downlink data channels are in two equal-length sTTIs that do not overlap in time domain and that are in a same subframe, namely, two adjacent different sTTIs; and a time domain length of the seventh downlink data channel is equal to the second length.

Figure 6:
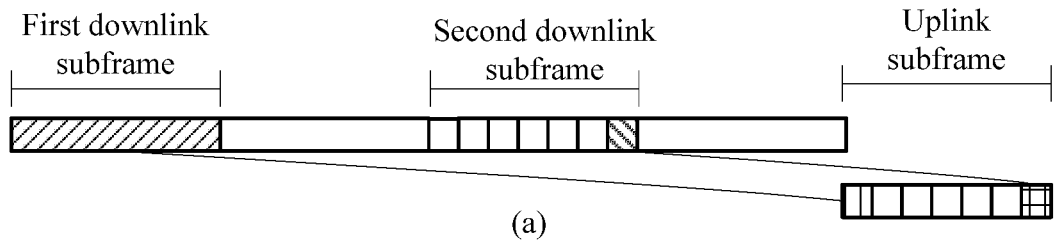
FIG. 6 is a schematic diagram of a HARQ-ACK information feedback method according to yet another embodiment of the present invention.
Figure 6:
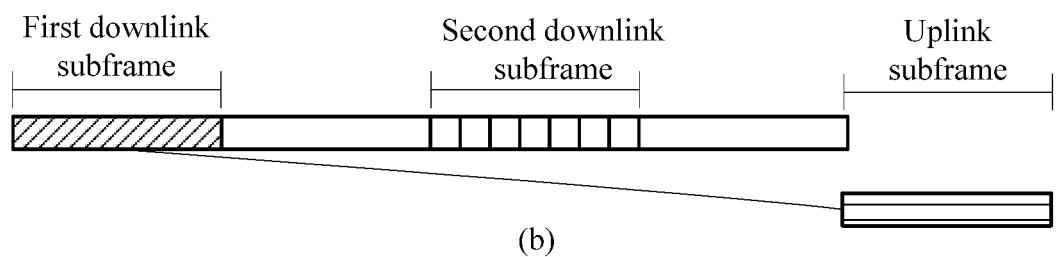
Figure 6:
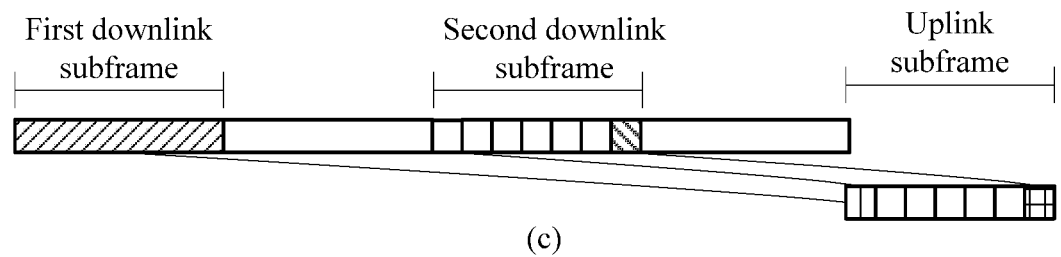

As shown in FIG. 6, a first downlink data channel in a first downlink subframe is a 1-ms PDSCH, and a second downlink data channel in a second downlink subframe is an sPDSCH. A same reference numeral in FIG. 6 and FIG. 3 denotes a same meaning. For brevity, details are not described herein again. A grid with graticule lines in FIG. 6 represents a third uplink channel.

As shown in part (a) of FIG. 6, when detecting the 1-ms PDSCH in the first downlink subframe and detecting the sPDSCH in the second downlink subframe, a terminal device uses a second uplink channel to feed back a HARQ-ACK of the 1-ms PDSCH.

As shown in part (b) of FIG. 6, when detecting the 1-ms PDSCH in the first downlink subframe and failing to detect the sPDSCH in the second downlink subframe, a terminal device uses a first uplink channel to feed back a HARQ-ACK of the 1-ms PDSCH.

As shown in part (c) of FIG. 6, a seventh downlink data channel is located in the first sTTI of the second downlink subframe, a receiving status of the seventh downlink data channel may be sent on a second uplink channel based on a HARQ feedback latency of the seventh downlink data channel. Specifically, if a terminal device fails to detect the seventh downlink data channel, the terminal device may further add the receiving status of the seventh downlink data channel to second HARQ-ACK information to be fed back on the second uplink channel.

In this case, as shown in part (a) and part (c) of FIG. 6, the terminal device may use the third uplink channel to feed back a third HARQ-ACK of the sPDSCH, where the third uplink channel overlaps the first uplink channel in time domain. In addition, the third uplink channel does not overlap the second uplink channel in time domain.

It should be noted that, for a downlink data channel corresponding to any transmission time interval, a time interval required for feeding back a receiving status of the downlink data channel corresponding to the transmission time interval, namely, a HARQ-ACK latency or HARQ-ACK timing, is predefined. Therefore, according to the feedback method in this embodiment of the present invention, if the terminal device detects the first downlink data channel in the first downlink subframe and detects the second downlink data channel in the second downlink subframe, and a HARQ-ACK feedback latency of the second downlink data channel and a HARQ-ACK feedback latency of the first downlink data channel make uplink channels that feed back HARQ-ACK information overlap in time domain, the terminal device selects the second uplink channel to send a HARQ-ACK of the first downlink data channel. In this way, the following can be avoided: The terminal device cannot feed back the HARQ-ACK of the first downlink data channel or a HARQ-ACK of the second downlink data channel due to an incapability of supporting concurrent transmission.

When the first downlink data channel is detected in the first downlink subframe and the second downlink data channel is detected in the second downlink subframe, and the HARQ-ACK feedback latency of the second downlink data channel and the HARQ-ACK feedback latency of the first downlink data channel make the uplink channels that feed back HARQ-ACK information overlap in time domain, the second uplink channel corresponding to the first downlink data channel and the third uplink channel corresponding to the second downlink data channel may overlap in time domain, or may not overlap in time domain. When an uplink channel corresponding to the first downlink data channel does not overlap an uplink channel corresponding to the second downlink data channel in time domain, HARQ-ACK information carrying a receiving status of the first downlink data channel and HARQ-ACK information carrying a receiving status of the second downlink data channel may be sent on the two uplink channels, respectively.

When the uplink channel corresponding to the first downlink data channel overlaps the uplink channel corresponding to the second downlink data channel in time domain, the receiving status of the first downlink data channel and the receiving status of the second downlink data channel may be on a same uplink channel. To be specific, a HARQ-ACK of the uplink channel includes the receiving statuses of the two downlink data channels. Optionally, when the terminal device sends the second HARQ-ACK information to a network device by using the second uplink channel, the second HARQ-ACK may be further used to indicate the receiving status of the second downlink data channel. When the terminal device detects the first downlink data channel in the first downlink subframe and detects the second downlink data channel in the second downlink subframe, the terminal device selects the second uplink channel to send the HARQ-ACK of the first downlink data channel, where HARQ timing for the second uplink channel and that for the first downlink data channel are predefined. Based on HARQ timing of HARQ feedback performed for the second downlink data channel, if a HARQ-ACK receiving status of the second downlink data channel also needs to be fed back on a time domain resource corresponding to the second uplink channel, the terminal device may feed back both the receiving status of the first downlink data channel and that of the second downlink data channel by using the second uplink channel. In other words, the second HARQ-ACK is further used to indicate the receiving status of the second downlink data channel.

Optionally, the second uplink channel may overlap the first uplink channel in time domain. Based on the HARQ timing, if the HARQ-ACK receiving status of the second downlink data channel also needs to be fed back on the time domain resource corresponding to the second uplink channel, when the second uplink channel overlaps the first uplink channel in time domain, the terminal device cannot separately transmit the receiving status of the first downlink data channel and that of the second downlink data channel on the two uplink channels respectively, but needs to feed back both the receiving status of the first downlink data channel and that of the second downlink data channel on the second uplink channel.

Figure 7:
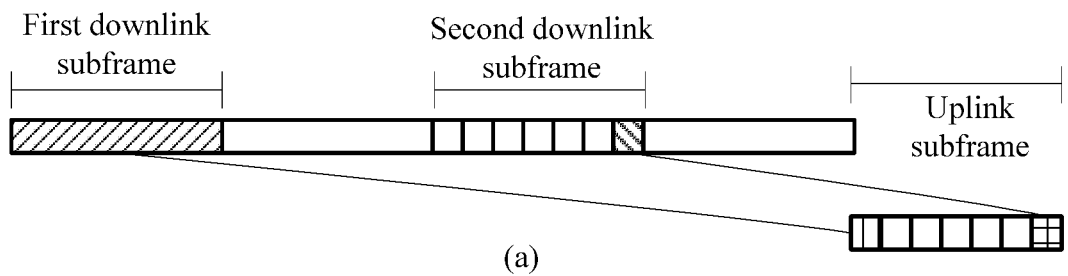
FIG. 7 is a schematic diagram of a HARQ-ACK information feedback method according to still yet another embodiment of the present invention.
Figure 7:
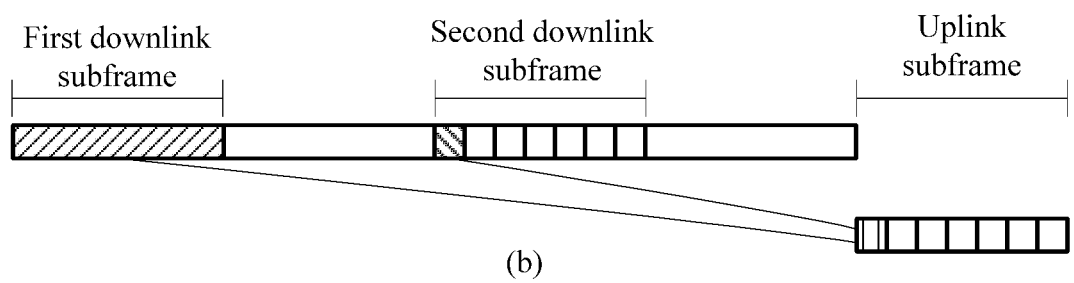

A same reference numeral in FIG. 7 and FIG. 3 denotes a same meaning. For brevity, details are not described herein again. A grid with graticule lines in FIG. 7 represents a third uplink channel.

As shown in part (a) of FIG. 7, a terminal device detects a 1-ms PDSCH in a first downlink subframe and detects an sPDSCH in a second downlink subframe. Because a feedback time of the 1-ms PDSCH does not overlap a feedback time of the sPDSCH, a time domain resource of a second uplink channel carrying HARQ-ACK information of a receiving status of a first downlink data channel is different from a time domain resource of a third uplink channel carrying HARQ-ACK information of a receiving status of a second downlink data channel. In other words, radio resources of the uplink channels are different.

As shown in part (b) of FIG. 7, a terminal device detects a 1-ms PDSCH in a first downlink subframe and detects an sPDSCH in a second downlink subframe. Because a feedback time of the 1-ms PDSCH overlaps a feedback time of the sPDSCH, both an uplink channel carrying HARQ-ACK information of a receiving status of a first downlink data channel and an uplink channel carrying HARQ-ACK information of a receiving status of a second downlink data channel may be a second uplink channel. To be specific, a radio resource of the uplink channel carrying the HARQ-ACK information of the receiving status of the first downlink data channel is the same as that of the uplink channel carrying the HARQ-ACK information of the receiving status of the second downlink data channel.

It should be noted that, a HARQ-ACK latency or HARQ-ACK timing for a downlink data channel may be fixed, or may be flexible. In a fixed manner, a time interval or a time sequence relationship between a TI corresponding to a downlink data channel and a TI corresponding to an uplink channel carrying HARQ-ACK information of a receiving status of the downlink data channel is fixed. For example, if a receiving status corresponding to a 1-ms PDSCH in a subframe # n is fed back on an sPUCCH in a subframe # n+k (k is an integer greater than zero), the sPUCCH is always located in the first sTTI or last sTTI of the subframe # n+k. In a flexible manner, a time interval or a time sequence relationship between a TI corresponding to a downlink data channel and a TI corresponding to an uplink channel carrying HARQ-ACK information of a receiving status of the downlink data channel is flexible. For example, if a receiving status corresponding to a 1-ms PDSCH in a subframe # n is fed back on an sPUCCH in a subframe # n+k, the sPUCCH is not limited to an sTTI at a fixed time domain position, and a base station may indicate a position, in # n+k, of an sTTI in which the sPUCCH is located, or an sPUCCH that is also needed to feed back a receiving status of an sPDSCH may be selected from # n+k, to feed back both the receiving status of the 1-ms PDSCH and the receiving status of the sPDSCH. HARQ-ACK timing from the sPDSCH to a short uplink channel that feeds back a receiving status of the sPDSCH is generally fixed. For example, the sPDSCH corresponds to the $q^{th}$ (q is an integer greater than zero) sTTI in the subframe # n, the short uplink channel corresponding to the sPDSCH corresponds to the $(q+m)^{th}$ (m is an integer greater than zero) sTTI subsequent to the $q^{th}$ sTTI. For example, if m is a quantity of sTTIs included in a subframe, the short uplink channel corresponding to the sPDSCH is the $q^{th}$ sTTI of a subframe # n+1.

Optionally, the second uplink channel corresponds to or is located in one of uplink sTTIs of an uplink subframe. The uplink subframe is an uplink subframe that is used to carry the HARQ-ACK information of the receiving status of the first downlink channel based on HARQ timing. For example, a receiving status corresponding to a 1-ms PDSCH in the subframe # n is fed back in the subframe # n+k. Further, the uplink subframe is an uplink subframe in which the first uplink channel is located or to which the first uplink channel corresponds.

Further, optionally, the second uplink channel corresponds to the last uplink sTTI of the uplink subframe. Correspondingly, the second downlink data channel corresponds to the last downlink sTTI of the second downlink subframe. A benefit is that a problem that it is too late for the terminal device to perform packet assembly on the second uplink channel can be avoided. For example, assuming that a 1-ms uplink channel (the first uplink channel) corresponding to a 1-ms PDSCH (the first downlink data channel) in the subframe # n is located in # n+4, a short uplink channel (the second uplink channel) corresponding to the 1-ms PDSCH is located in the first sTTI of # n+4, and a short uplink channel (the third uplink channel) corresponding to the sixth sPDSCH (the second downlink data channel) in a subframe # n+3 is located in the sixth sTTI of # n+4. If the terminal device detects the second downlink data channel, the terminal device needs to switch the 1-ms uplink channel to a short uplink channel. However, because the second uplink channel is earlier than the third uplink channel, it is too late for the terminal device to perform packet assembly on the second uplink channel. Assuming that the second uplink channel corresponding to the first downlink data channel is located in the last sTTI of # n+4, a moment at which the 1-ms uplink channel is switched to the short uplink channel is always earlier than or the same as the second uplink channel. Therefore, the terminal device can perform packet assembly on the second uplink channel in a timely manner. This feedback manner corresponds to fixed 1-ms PDSCH HARQ-ACK timing.

Optionally, when the terminal device determines that the first downlink subframe includes the first downlink data channel and that the second downlink subframe includes the second downlink data channel, the terminal device feeds back the receiving status of the first downlink data channel in each of at least two sTTIs in the uplink subframe. In other words, the receiving status of the first downlink data channel is fed back repeatedly in the at least two sTTIs. In this case, any one of the at least two sTTIs may correspond to the second uplink channel. Further, the at least two sTTIs include all sTTIs that are in the uplink subframe after the terminal device is switched from the 1-ms PDSCH (the first downlink data channel) to the short uplink channel. For example, assuming that a 1-ms uplink channel (the first uplink channel) corresponding to a 1-ms PDSCH (the first downlink data channel) in the subframe # n is located in # n+4, a short uplink channel (the second uplink channel) corresponding to the 1-ms PDSCH is located in the first sTTI of # n+4, and a short uplink channel corresponding to the second sPDSCH (the second downlink data channel) in a subframe # n+3 is located in the second sTTI of # n+4. When a first sPDSCH detected by the terminal device in # n+2 is the second downlink data channel, the 1-ms uplink channel of # n+4 needs to be switched to a short uplink channel. Therefore, starting from the second sTTI of # n+4, the terminal device feeds back a receiving status of the 1-ms PDSCH in each of sTTIs that are in the uplink subframe (even if the terminal device fails to detect, in # n+3, an sPDSCH corresponding to an sTTI). Further, the at least two sTTIs are both located in the second slot of the uplink subframe. This feedback manner corresponds to fixed 1-ms PDSCH HARQ-ACK timing.

Optionally, when the terminal device determines that the first downlink subframe includes the first downlink data channel and that the second downlink subframe includes the second downlink data channel, the terminal device further feeds back the receiving status of the first downlink data channel in an uplink sTTI that is used to carry an sPDSCH receiving status and that is in the uplink subframe. Specifically, if the terminal device detects at least one sPDSCH in the second downlink subframe, for one sPDSCH (the second downlink data channel) of the at least one sPDSCH, the terminal device feeds back both a receiving status of the sPDSCH and a receiving status of a 1-ms PDSCH (the first downlink data channel) on a short uplink channel (the second uplink channel) corresponding to the sPDSCH. If the terminal device fails to detect an sPDSCH in an sTTI of the second downlink subframe, the terminal device does not feed back the receiving status of the 1-ms PDSCH on the short uplink channel corresponding to the sPDSCH. Further, the uplink sTTI used to carry an sPDSCH receiving status is located in the second slot of the uplink subframe. When at least one short uplink channel overlaps a 1-ms uplink channel (for example, a 1 ms PUCCH) in time domain, if the at least one short uplink channel is located in one slot of the 1 ms uplink subframe, only a slot that is used to send a short uplink channel and that overlaps the 1 ms PUCCH may be punctured (puncture), and another slot that does not overlap the 1 ms PUCCH may continue sending the 1 ms PUCCH carrying the receiving status of the first downlink data channel, to improve 1 ms HARQ-ACK transmission reliability. If all short uplink channels are located in the first slot of the 1 ms, a 1-ms HARQ-ACK and a short HARQ-ACK are sent on a second slot of the PUCCH and a short uplink channel, respectively. To be specific, a short uplink channel in the first slot may not be used to carry the 1 ms HARQ-ACK. If the short uplink channel is located in the second slot of the 1 ms, the short uplink channel also needs to carry the 1 ms HARQ-ACK, in addition to the short HARQ-ACK, because the first slot of the 1 ms PUCCH may be also punctured. This feedback manner corresponds to flexible 1-ms PDSCH HARQ-ACK timing.

Optionally, when the terminal device determines that the first downlink subframe includes the first downlink data channel and that the second downlink subframe includes the second downlink data channel, the terminal device feeds back the receiving status of the first downlink data channel in each of at least two uplink sTTIs that are used to carry an sPDSCH receiving status and that are in the uplink subframe. In other words, the receiving status of the first downlink data channel is fed back repeatedly in the at least two uplink sTTIs. The at least two sPDSCHs include an eighth downlink data channel and the second downlink data channel. The at least two uplink sTTIs include the second uplink channel and a seventh uplink channel. In other words, the terminal device feeds back seventh HARQ-ACK information by using the seventh uplink channel when further determining that the second downlink subframe includes the eighth downlink data channel, where the seventh HARQ-ACK information is used to indicate the receiving status of the first downlink data channel and a receiving status of the eighth downlink data channel. For example, assuming there is a 1-ms PDSCH (the first downlink data channel) in the subframe # n, if the terminal device detects that at least two sPDSCHs (including the second downlink data channel and the eighth downlink data channel) in the second downlink subframe # n+3 are located in the first sTTI, the second sTTI, and the fourth sTTI, the terminal device feeds back a corresponding sPDSCH receiving status and a receiving status of the 1-ms PDSCH on all short uplink channels (including a second uplink data channel and a seventh uplink data channel) that are located in the first sTTI, the second sTTI, and the fourth sTTI of # n+4 and that correspond to the sPDSCHs. It should be understood that a TTI corresponding to the seventh uplink channel may be determined based on fixed HARQ-ACK timing for the eighth downlink data channel. It should be understood that the eighth downlink data channel does not overlap the second downlink data channel in time domain, and the seventh uplink channel does not overlap the second uplink channel in time domain. Further, a length of a time domain resource occupied by the eighth downlink data channel is equal to a second length. Further, the seventh uplink channel overlaps the first uplink channel in time domain, or the seventh uplink channel and the second uplink channel are located in a same uplink subframe. Further, the at least two uplink sTTIs used to carry an sPDSCH receiving status include all uplink sTTIs (namely, all uplink sTTIs corresponding to all sPDSCHs detected in the second downlink subframe) that are used to carry an sPDSCH receiving status and that are in the uplink subframe. Further, the at least two uplink sTTIs are located in the second slot of the uplink subframe. This feedback manner corresponds to flexible 1-ms PDSCH HARQ-ACK timing.

In this embodiment of the present invention, optionally, if a wireless communications system is a downlink multicarrier system in which at least two downlink carriers are configured for a network device, each carrier may send downlink data to a terminal device, and each carrier sends the downlink data independently, that is, at a same moment, one of the carriers is allowed to send data while another carrier does not send data, the terminal device needs to separately perform detection on data channels on each carrier, to determine whether the carrier has downlink data.

It is considered that, in an sTTI-supporting wireless communications system, to reduce design complexity, a same transmission time interval may be configured for all carriers in a same downlink subframe, for example, the transmission time intervals of all carriers in a same downlink subframe are 1-ms TTIs or sTTIs.

Based on the above consideration, provided that the terminal device detects that a 1-ms PDSCH exists in one of the carriers, the terminal device can determine that all channels on other carriers of the current subframe are 1-ms PDSCHs. Provided that the terminal device detects that an sPDSCH exists in one of the carriers, the terminal device can determine that all channels on other carriers of the current subframe are sPDSCHs.

In addition, it is considered that the terminal device may only add HARQ-ACK feedbacks of a plurality of downlink carriers to uplink channels of one uplink carrier, or the terminal device may allow uplink channels to be sent on different carriers in a same uplink subframe, but these uplink channels are not allowed to be in different lengths or overlap in time domain. In this scenario, provided that the terminal device detects the second downlink data channel on one of the plurality of carriers, the terminal device may determine that, in a subframe at which the second downlink data channel is located, lengths of data channels on each carrier are the second length. In addition, an uplink channel corresponding to the second downlink data channel also overlaps an uplink channel corresponding to the first downlink data channel in time domain. Therefore, the second uplink channel also needs to be selected.

The terminal device selects, only when the terminal device fails to detect the second downlink data channel in all carriers in the second downlink subframe, the first uplink channel to send HARQ-ACK information of the first downlink data channel.

Figure 8:
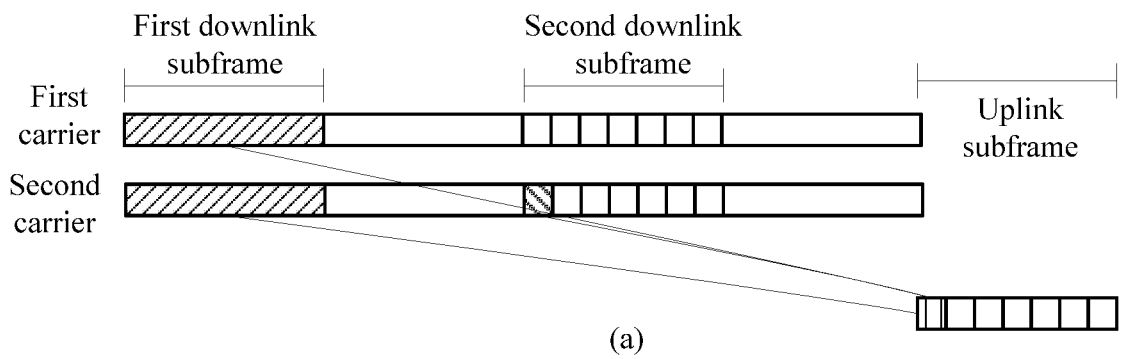
FIG. 8 is a schematic diagram of a HARQ-ACK information feedback method according to a further embodiment of the present invention.
Figure 8:
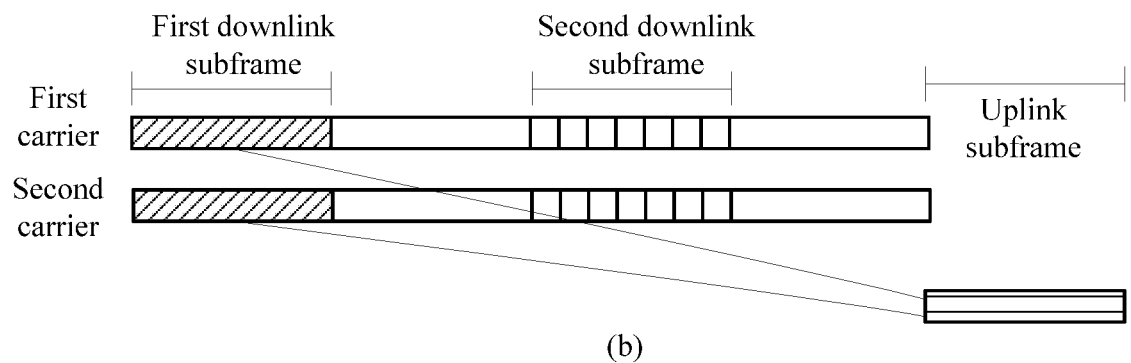

A same reference numeral in FIG. 8 and FIG. 3 denotes a same meaning. For brevity, details are not described herein again.

As shown in part (a) of FIG. 8, a first carrier in a second downlink subframe does not include an sPDSCH, and an sPDSCH is detected on a second carrier. Therefore, a terminal device also needs to select a second uplink channel to send HARQ-ACK information of a first downlink data channel.

However, as shown in part (b) of FIG. 8, when no sPDSCH is detected on any carrier in a second downlink subframe, a terminal device selects a first uplink channel to send HARQ-ACK information of a first downlink data channel.

Optionally, the first carrier occupied by the first downlink data channel may be different from the second carrier occupied by a second downlink data channel, and the first uplink channel and the second uplink channel may be located on a same carrier, or may be located on different carriers. The first uplink channel may occupy the first carrier or the second carrier (for example, in a time division multiplexing system), or may occupy other carriers (for example, in a time division multiplexing system and a frequency division multiplexing system), and the second uplink channel may occupy the first carrier or the second carrier (for example, in a time division multiplexing system), or may occupy other carriers (for example, in a time division multiplexing system and a frequency division multiplexing system).

Optionally, when the first carrier is different from the second carrier, the terminal device may further add, to HARQ-ACK information of the second uplink channel when determining to send the HARQ-ACK information of the first downlink data channel by using a second uplink data channel, a receiving status of a downlink data channel (which may be referred to as a third downlink data channel) that is on the first carrier and that is detected in the second downlink subframe, where the third downlink data channel and the second downlink data channel correspond to a same time domain resource.

If the terminal device fails to detect the third downlink data channel, the terminal device may also define a receiving status of the downlink data channel as "NACK" or "DTX", and sends the receiving status to a network device on the second uplink channel, to avoid an error case in which the terminal device and the network device have inconsistent understandings of a quantity of HARQ-ACK bits because the terminal device fails to detect the third downlink data channel that has been sent by the network device and consequently misses feeding back the HARQ-ACK information of the downlink data channel.

Optionally, when determining that the second downlink subframe does not include the second downlink data channel, the terminal device may directly detect the second downlink data channel in the second downlink subframe, or may determine, by detecting that the second downlink subframe includes a downlink data channel whose corresponding time domain resource length is different from that of the second downlink data channel, that the second downlink subframe does not include the second downlink data channel. For example, when the terminal device fails to detect the second downlink data channel in the second downlink subframe, or the terminal device detects a fourth downlink data channel in the second downlink subframe, the terminal device may determine that the second downlink subframe does not include the second downlink data channel, where a length of a time domain resource corresponding to the fourth downlink data channel is different from a length of a time domain resource corresponding to the second downlink data channel. It should be understood that, when determining that the second downlink subframe does not include the second downlink data channel, the terminal device may directly detect a target downlink data channel in a target downlink subframe, or may determine, by detecting that the target downlink subframe includes a downlink data channel whose corresponding time domain resource length is different from that of the target downlink data channel, that the target downlink subframe does not include the target downlink data channel. Herein, the target downlink subframe is the second downlink subframe, and the target downlink data channel is the second downlink data channel. Details are not described.

In this embodiment of the present invention, optionally, if the terminal device detects the first downlink data channel in the first downlink subframe and detects the second downlink data channel in the second downlink subframe (this case may be referred to as a first detection case), the terminal device selects and uses the second uplink channel to send second HARQ-ACK information of the first downlink data channel. When determining that the first downlink subframe includes the first downlink data channel and that the second downlink subframe does not include the second downlink data channel (this case may be referred to as a second detection case), the terminal device selects and uses the first uplink channel to send first HARQ-ACK information of the first downlink data channel. When determining that the first downlink subframe does not include the first downlink data channel and that the second downlink subframe includes the second downlink data channel (this case may be referred to as a third detection case), the terminal device may select a fourth uplink channel to send fourth HARQ-ACK information carrying a receiving status of the second downlink data channel.

The fourth uplink channel may overlap the first uplink channel in time domain. The fourth uplink channel may be the same as or different from the second uplink channel. Specifically, a radio resource occupied by the fourth uplink channel may be the same as or different from a radio resource occupied by the second uplink channel. Herein, that the radio resources are the same means that resources are the same in time domain, frequency domain, code domain, and space domain. In other words, the fourth uplink channel and the second uplink channel are a same uplink channel.

In this embodiment of the present invention, optionally, when the radio resource occupied by the fourth uplink channel is different from the radio resource occupied by the second uplink channel, if the radio resource occupied by the fourth uplink channel may also be different from a radio resource occupied by the first uplink channel, that is, the three uplink channels differ from one another, the network device may determine, by distinguishing an uplink channel from the different uplink channels, a downlink data channel whose receiving status is specifically represented by a receiving status indicated by HARQ-ACK information carried in the uplink channel.

Figure 9:
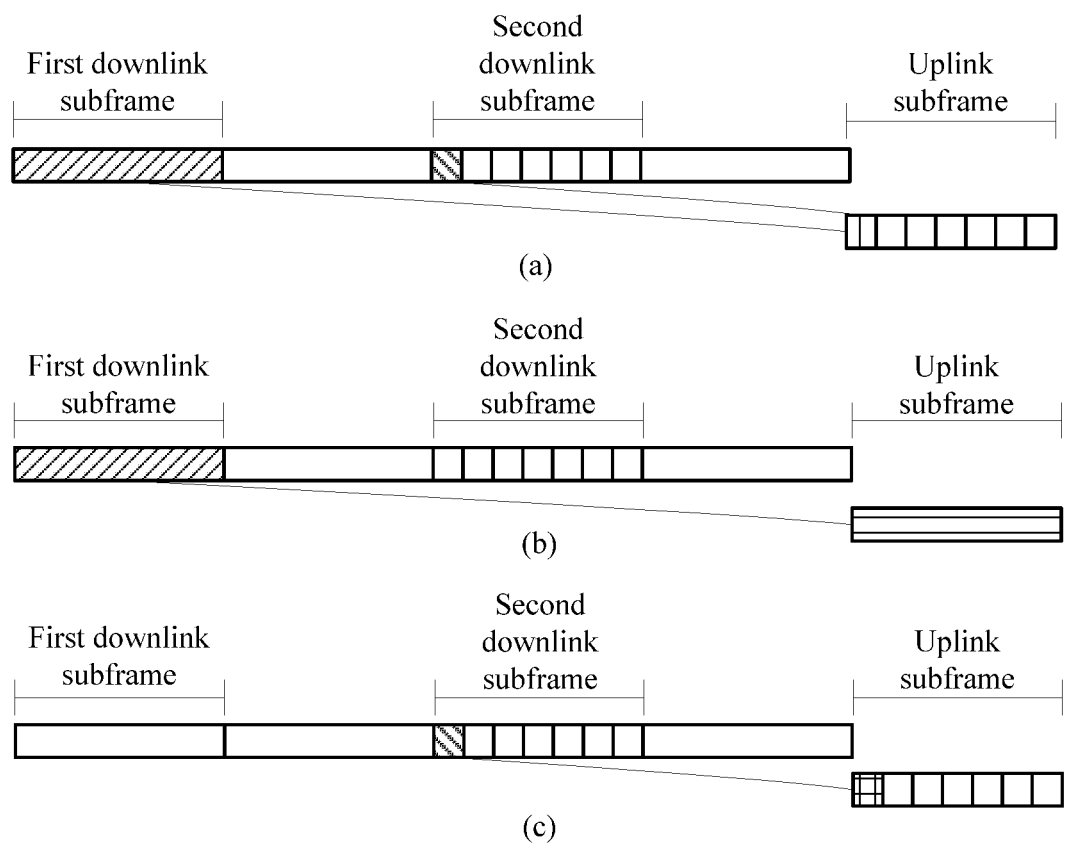
FIG. 9 is a schematic diagram of a HARQ-ACK information feedback method according to a still further embodiment of the present invention.

A same reference numeral in FIG. 9 and FIG. 3 denotes a same meaning. For brevity, details are not described herein again. A grid with graticule lines in FIG. 9 represents a fourth uplink channel.

As shown in part (b) of FIG. 9, a terminal device detects a 1-ms PDSCH in a first downlink subframe and fails to detect an sPDSCH in a second downlink subframe. Therefore, the terminal device selects a first uplink channel to send first HARQ-ACK information carrying a receiving status of a first downlink data channel.

As shown in part (a) of FIG. 9, a terminal device detects a 1-ms PDSCH in a first downlink subframe and detects an sPDSCH in a second downlink subframe. Therefore, the terminal device selects a second uplink channel to send second HARQ-ACK information. In this case, the second HARQ-ACK information carries both a receiving status of a first downlink data channel and a receiving status of a second downlink data channel.

As shown in part (c) of FIG. 9, a terminal device fails to detect a 1-ms PDSCH in a first downlink subframe and detects an sPDSCH in a second downlink subframe. Therefore, the terminal device selects a fourth uplink channel to send fourth HARQ-ACK information carrying a receiving status of a second downlink data channel.

In this embodiment of the present invention, optionally, when the terminal device determines that the first downlink subframe does not include the first downlink data channel and determines that the second downlink subframe includes the second downlink data channel, the fourth HARQ-ACK information on the fourth uplink channel may be further used to indicate a receiving status of the first downlink data channel. In this case, "NACK" or "DTX" may be used to represent the receiving status of the first downlink data channel. Specifically, the terminal device may additionally add, to the fourth HARQ-ACK information, a bit field used to feed back the receiving status of the first downlink data channel.

Figure 10:
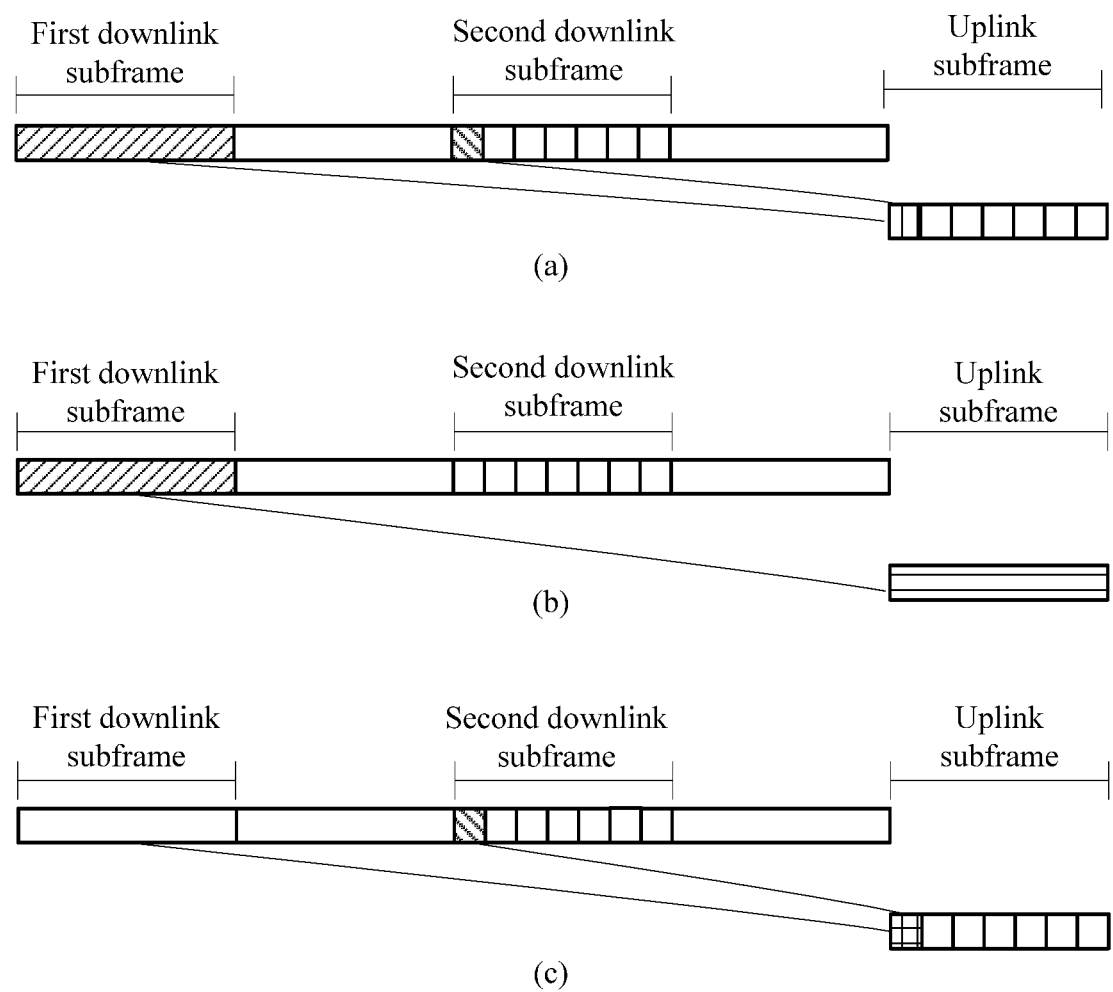
FIG. 10 is a schematic diagram of a HARQ-ACK information feedback method according to a yet further embodiment of the present invention.

As shown in part (b) of FIG. 10, a terminal device detects a 1-ms PDSCH in a first downlink subframe and fails to detect an sPDSCH in a second downlink subframe. Therefore, the terminal device selects a first uplink channel to send first HARQ-ACK information carrying a receiving status of a first downlink data channel.

As shown in part (a) of FIG. 10, a terminal device detects a 1-ms PDSCH in a first downlink subframe and detects an sPDSCH in a second downlink subframe. Therefore, the terminal device selects a second uplink channel to send second HARQ-ACK information. In this case, the second HARQ-ACK information carries both a receiving status of a first downlink data channel and a receiving status of a second downlink data channel.

As shown in part (c) of FIG. 10, a terminal device fails to detect a 1-ms PDSCH in a first downlink subframe and detects an sPDSCH in a second downlink subframe. Therefore, the terminal device selects a fourth uplink channel to send fourth HARQ-ACK information carrying a receiving status of a second downlink data channel. In this case, the fourth HARQ-ACK information further carries a receiving status of a first downlink data channel, and the receiving status of the first downlink data channel may be represented by "NACK" or "DTX".

A same reference numeral in FIG. 10 and FIG. 3 denotes a same meaning. For brevity, details are not described herein again. A grid with graticule lines in FIG. 10 represents the fourth uplink channel.

In this embodiment of the present invention, if the terminal device determines that the first downlink subframe does not include the first downlink data channel and that the second downlink subframe includes the second downlink data channel, and when the fourth HARQ-ACK information carries both the receiving status of the first downlink data channel and that of the second downlink data channel, the fourth uplink channel may be the same as or may be different from the second uplink channel.

If the fourth uplink channel is the same as the second uplink channel, that is, the fourth uplink channel is the second uplink channel, it indicates that the second uplink channel may be used to send both the receiving status of the first downlink data channel and that of the second downlink data channel. In this case, the receiving status of the first downlink data channel is "NACK" or "DTX".

When the fourth uplink channel is the same as the second uplink channel, regardless of whether the first downlink data channel is detected in the first downlink subframe, when the terminal device detects the second downlink data channel in the second downlink subframe, HARQ-ACK information that is sent carries both the receiving statuses of the two downlink data channels, to ensure that a quantity of HARQ-ACK bits that are in the second uplink channel, that are used to indicate a downlink data receiving status, and that are used in the two detection cases remains the same, so that the network device can demodulate and decode the second uplink channel according to a predefined rule, and read corresponding HARQ-ACK information. Therefore, a decoding error caused when the network device and the terminal device have different understandings of a quantity of HARQ-ACK bits can be avoided.

When determining that the first downlink subframe does not include the first downlink data channel and that the second downlink subframe includes the second downlink data channel, the terminal device selects the second uplink channel to send the fourth HARQ-ACK information. This can save control channel resources when compared with a method for respectively using different uplink channels in the three different detection cases. However, in comparison with a method for selecting, by the terminal device, the second uplink channel to send the fourth HARQ-ACK information, the method for respectively using different uplink channels in the three different detection cases can reduce a quantity of HARQ-ACK bits used to indicate a receiving status. Each of the two methods has its own advantages. A proper method may be selected and used as required.

The receiving status corresponding to the first downlink data channel and fed back in the fourth HARQ-ACK information is "NACK" or "DTX". Therefore, if the network device has sent the first downlink data channel while the terminal device fails to detect the existence of the channel, the network device may learn, once "DTX" or "NACK" is received, that the terminal device fails to correctly receive the data channel, and retransmission may be performed. If the network device actually has not sent the first downlink data channel, the network device does not need to perform retransmission even when receiving a "DTX" or "NACK" state.

Optionally, when determining that the first downlink subframe does not include the first downlink data channel and that the second downlink subframe includes the second downlink data channel, the terminal device selects the fourth uplink channel to send the fourth HARQ-ACK information, where the fourth uplink channel corresponds to or is located in one of uplink sTTIs of an uplink subframe, and the uplink subframe is an uplink subframe that is used to carry HARQ-ACK information of the receiving status of the first downlink channel based on HARQ timing. This is similar to that the second uplink channel corresponds to or is located in one of uplink sTTIs of an uplink subframe. Details are not described again.

Optionally, when the terminal device determines that the first downlink subframe does not include the first downlink data channel and that the second downlink subframe includes the second downlink data channel, the terminal device further feeds back the receiving status of the first downlink data channel in an uplink sTTI (the fourth uplink channel) that is used to carry an sPDSCH receiving status and that is in the uplink subframe. This is similar to the case in which the terminal device determines that the first downlink subframe includes the first downlink data channel and that the second downlink subframe includes the second downlink data channel. Details are not described again. Further, the uplink sTTI used to carry an sPDSCH receiving status is located in the second slot of the uplink subframe. In this case, the receiving status corresponding to the first downlink data channel is "NACK" or "DTX".

Optionally, when the terminal device determines that the first downlink subframe does not include the first downlink data channel and that the second downlink subframe includes the second downlink data channel, the terminal device feeds back the receiving status of the first downlink data channel in each of at least two uplink sTTIs that are used to carry an sPDSCH receiving status and that are in the uplink subframe. The at least two sPDSCHs include a ninth downlink data channel and the second downlink data channel, and the at least two uplink sTTIs include the fourth uplink channel and an eighth uplink channel. The terminal device sends eighth HARQ-ACK information to the network device by using the eighth uplink channel when further determining that the second downlink subframe includes the ninth downlink data channel, where the eighth HARQ-ACK information is used to indicate the receiving status of the first downlink data channel and a receiving status of the ninth downlink data channel. This is similar to the case in which the terminal device determines that the first downlink subframe includes the first downlink data channel and that the second downlink subframe includes the second downlink data channel. Details are not described again. It should be understood that the eighth HARQ-ACK information indicates that the receiving status corresponding to the first downlink data channel is "NACK" or "DTX". It should be understood that the ninth downlink data channel does not overlap the second downlink data channel in time domain, and the eighth uplink channel does not overlap the fourth uplink channel in time domain. Further, a length of a time domain resource occupied by the ninth downlink data channel is equal to a second length. Further, the eighth uplink channel overlaps the first uplink channel in time domain, or the eighth uplink channel and the fourth uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, when determining that a target downlink subframe does not include a target downlink data channel, the terminal device may directly detect the target downlink data channel in the target downlink subframe, or may determine, by detecting that the target downlink subframe includes a downlink data channel whose corresponding time domain resource length is different from that of the target downlink data channel, that the target downlink subframe does not include the target downlink data channel. Herein, the target downlink subframe is the first downlink subframe, and the target downlink data channel is the first downlink data channel. Details are not described.

If that the terminal device determines that the first downlink subframe does not include the first downlink data channel is specifically implemented by detecting, in the first downlink subframe, another downlink data channel (for ease of subsequent description, the downlink data channel is referred to as a fifth downlink data channel) whose corresponding time domain resource length is different from that of the first downlink data channel, optionally, in this embodiment of the present invention, the fourth HARQ-ACK information in the fourth uplink channel may be further used to feed back a receiving status of the fifth downlink data channel.

In this embodiment of the present invention, optionally, a length of a time domain resource corresponding to the fifth downlink data channel may be less than a first length of a time domain resource corresponding to the first target downlink data channel. It should be understood that, for consideration of a higher priority of an sPDSCH, when the terminal device detects that the fifth downlink data channel is an sPDSCH and that a length of the fifth downlink data channel is less than that of the first downlink data channel, existence of the first downlink data channel can be excluded. More specifically, the length of the time domain resource corresponding to the fifth downlink data channel may be equal to a second length of a time domain resource corresponding to the second downlink data channel. It should be understood that, considering that the second length may be less than the first length and that the network device may semi-statically configure an sTTI length to support dynamic switching between a 1-ms TTI and an sTTI of the length, if the first downlink data channel is a 1-ms PDSCH, and a length of the second downlink data channel and that of the fifth downlink data channel are both less than the first length, the length of the time domain resource corresponding to the fifth downlink data channel may be equal to the second length.

Optionally, when the terminal device determines that the second downlink subframe includes the second downlink data channel, if neither the first downlink data channel nor the fifth downlink data channel is detected in the first downlink subframe (in this case, the fifth downlink data channel may also be referred to as a sixth downlink data channel), the fourth HARQ-ACK information in the fourth uplink channel may be used to further feed back a receiving status of the sixth downlink data channel, in addition to feeding back the receiving status of the second downlink data channel. In this case, the receiving status of the sixth downlink data channel may be "NACK" or "DTX".

Figure 11:
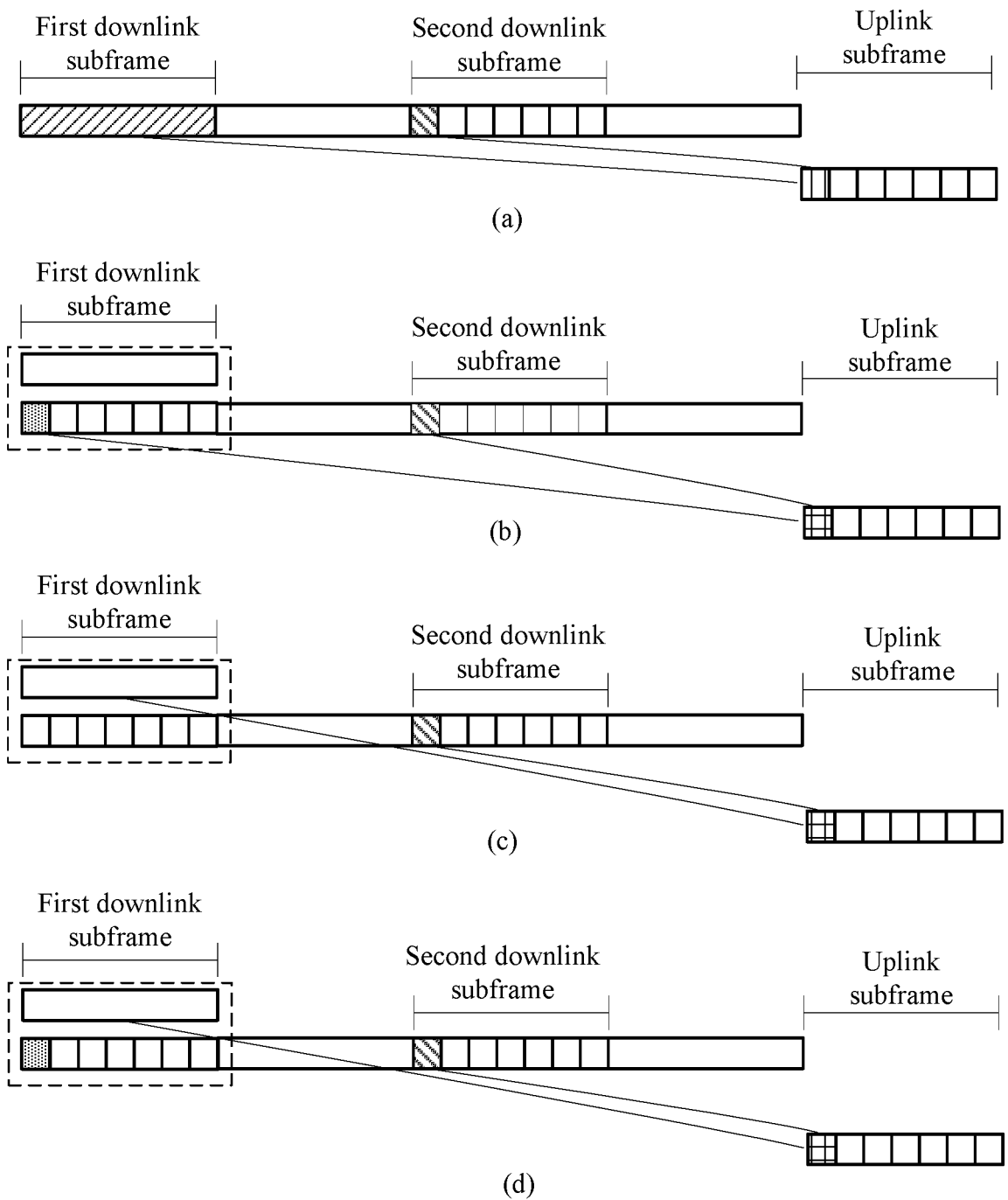
FIG. 11 is a schematic diagram of a HARQ-ACK information feedback method according to a still yet further embodiment of the present invention.

As shown in part (a) of FIG. 11, when detecting a first downlink data channel in a first downlink subframe and detecting a second downlink data channel in a second downlink subframe, a terminal device sends, by using a second uplink channel, a second HARQ-ACK carrying a receiving status of the first downlink data channel and a receiving status of the second downlink data channel.

As shown in part (b) of FIG. 11, when detecting a fifth downlink data channel in a first downlink subframe and detecting a second downlink data channel in a second downlink subframe, a terminal device sends, by using a fourth uplink channel, a fourth HARQ-ACK carrying a receiving status of the fifth downlink data channel and a receiving status of the second downlink data channel.

As shown in part (c) of FIG. 11, if a terminal device detects a second downlink data channel in a second downlink subframe, and the terminal device fails to detect a first downlink data channel or a sixth downlink data channel in a first downlink subframe, the terminal device may send, by alternatively using a fourth uplink channel, a receiving status of the first downlink data channel and a receiving status of the second downlink data channel. In this case, the receiving status of the first downlink data channel may be defined as "NACK" or "DTX".

As shown in part (d) of FIG. 11, when detecting a fifth downlink data channel in a first downlink subframe and detecting a second downlink data channel in a second downlink subframe, a terminal device sends, by using a fourth uplink channel, a fourth HARQ-ACK carrying a receiving status of a first downlink data channel and a receiving status of the second downlink data channel. In this case, the receiving status of the first downlink data channel may be defined as "NACK" or "DTX".

When the terminal device feeds back the receiving status of the second downlink data channel and the receiving status of the first downlink data channel (or the fifth downlink data channel, or the sixth downlink data channel) by using the fourth HARQ-ACK information of the fourth uplink channel, the fourth uplink channel may be the same as the second uplink channel. To be specific, a radio resource of the fourth uplink channel is the same as a radio resource of the second uplink channel. More specifically, the fourth uplink channel is the same as the second uplink channel in terms of time domain resources, frequency domain resources, code domain resources, and space domain resources. In other words, the fourth uplink channel is the second uplink channel.

When the terminal device sends, by using the second uplink channel based on HARQ-ACK feedback timing for the second downlink data channel, the fourth HARQ-ACK information carrying the receiving status of the second downlink data channel, and the fourth HARQ-ACK information also carries the receiving status of the first downlink data channel or the fifth downlink data channel in the first downlink subframe, the terminal device alternatively feeds back, based on original HARQ-ACK feedback timing for the fifth downlink data channel, the receiving status of the fifth downlink data channel on a corresponding original uplink control channel or uplink data channel (for example, a fifth uplink channel on a time domain resource different from those of the first uplink channel and the second uplink channel). In other words, although only downlink traffic channels having a same length are actually sent in the first downlink subframe, the terminal device performs feedback for the downlink subframe twice. To be specific, the terminal device separately performs feedback, by using different types of HARQ timing respectively, for downlink traffic channels that have two different lengths and that may be supported in the subframe.

When the terminal device feeds back a receiving status of the first downlink channel in the first downlink subframe based on HARQ timing for the first downlink channel, if the terminal device fails to detect the sixth downlink data channel in the first downlink subframe, the terminal device alternatively feeds back, based on HARQ-ACK feedback timing for the sixth downlink data channel, a receiving status of the sixth downlink data channel on a corresponding original uplink control channel or uplink data channel (for example, a sixth uplink channel on a time domain resource different from those of the first uplink channel and the second uplink channel). This is similar to the fifth downlink control channel. In this embodiment of the present invention, optionally, a length of a time domain resource corresponding to the sixth downlink data channel is less than a first length of a time domain resource corresponding to the first downlink data channel. More specifically, the length of the time domain resource corresponding to the sixth downlink data channel may be equal to a second length of a time domain resource corresponding to the second downlink data channel.

In this case, if a network device fails to receive a receiving status of an original uplink control channel or uplink data channel, but receives the fourth uplink channel, the network device may also obtain HARQ-ACK information carrying the receiving status of the fifth downlink data channel (or the sixth downlink data channel), so that a diversity gain of receiving HARQ-ACK information can be provided.

Specifically, when the terminal device determines that the second downlink subframe includes the second downlink data channel and detects the fifth downlink data channel instead of the first downlink data channel in the first downlink subframe, the terminal device sends, by using the fourth uplink channel based on the HARQ-ACK feedback timing for the second downlink data channel, the fourth HARQ-ACK information carrying the receiving status of the second downlink data channel. In addition, when the fourth HARQ-ACK information also carries the receiving status ("NACK" or "DTX") of the first downlink data channel in the first downlink subframe, or when the fourth HARQ-ACK information also carries the receiving status of the fifth downlink data channel in the first downlink subframe, the terminal device may alternatively send, by using a corresponding fifth uplink channel based on an original HARQ-ACK feedback timing time of the fifth downlink data channel, fifth HARQ-ACK information carrying the receiving status of the fifth downlink data channel. In this case, a radio resource occupied by the fifth uplink channel and that occupied by the fourth uplink channel may be different.

Specifically, when the terminal device determines that the second downlink subframe does not include the second downlink data channel, and when the terminal device detects the first downlink data channel in the first downlink subframe, but fails to detect the sixth downlink data channel in the first downlink subframe, the terminal device sends first HARQ-ACK information by using the first uplink channel. Alternatively, the terminal device may send, by using a corresponding sixth uplink channel based on an original HARQ-ACK feedback timing time of the sixth downlink data channel, sixth HARQ-ACK information carrying a receiving status of the sixth downlink data channel.

When the terminal device determines that the second downlink subframe includes the second downlink data channel, and when the terminal device detects the first downlink data channel in the first downlink subframe, but fails to detect the sixth downlink data channel in the first downlink subframe, the terminal device sends the second HARQ-ACK information by using the second uplink channel. Alternatively, the terminal device may send, by using a corresponding sixth uplink channel at an original HARQ-ACK feedback timing time of the sixth downlink data channel, sixth HARQ-ACK information carrying a receiving status of the sixth downlink data channel.

Specifically, when the terminal device determines that the second downlink subframe includes the second downlink data channel and fails to detect the first downlink data channel or the sixth downlink data channel in the first downlink subframe, the terminal device sends, by using the fourth uplink channel based on the HARQ-ACK feedback timing for the second downlink data channel, the fourth HARQ-ACK information carrying the receiving status of the second downlink data channel. In addition, when the fourth HARQ-ACK information also carries the receiving status of the first downlink data channel in the first downlink subframe, or when the fourth HARQ-ACK information also carries the receiving status of the sixth downlink data channel in the first downlink subframe, the terminal device may alternatively send, by using a corresponding sixth uplink channel at an original HARQ-ACK feedback timing time of the sixth downlink data channel, sixth HARQ-ACK information carrying the receiving status of the sixth downlink data channel. In this case, a radio resource occupied by the sixth uplink channel and that occupied by the fourth uplink channel may be different.

Figure 12:
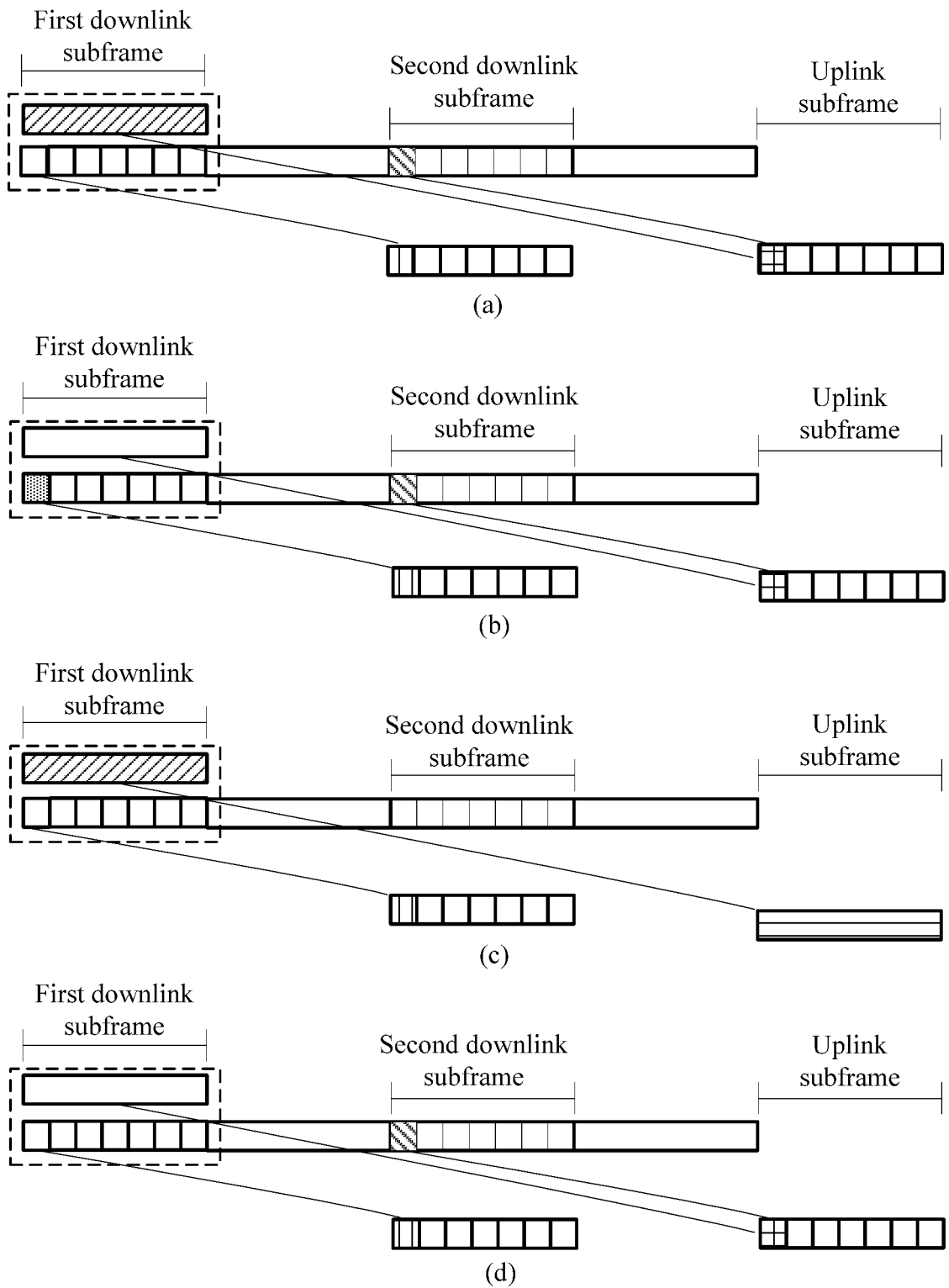
FIG. 12 is a schematic diagram of a HARQ-ACK information feedback method according to even yet another embodiment of the present invention.

For example, as shown in part (a) of FIG. 12, timing for a first downlink data channel PDSCH is 4 ms, and timing for a second downlink data channel sPDSCH and a sixth downlink data channel sPDSCH is 2 ms. When detecting the second downlink data channel in a second downlink subframe, detecting the first downlink data channel in a first downlink subframe but failing to detect a sixth downlink data channel in the first downlink subframe, a terminal device feeds back a receiving status of the first downlink data channel at a latency of 4 ms, and feeds back a receiving status of the sixth downlink data channel in the subframe at a latency of 2 ms.

For example, as shown in part (b) of FIG. 12, timing for a first downlink data channel PDSCH is 4 ms, and timing for a second downlink data channel sPDSCH and a fifth downlink data channel sPDSCH is 2 ms. When determining that a second downlink subframe includes the second downlink data channel and detecting the fifth downlink data channel instead of the first downlink data channel in a first downlink subframe, a terminal device feeds back a NACK state of the first downlink data channel at a latency of 4 ms, and adds a receiving status of the fifth downlink data channel in the subframe to a fifth HARQ-ACK at a latency of 2 ms.

For example, as shown in part (c) of FIG. 12, timing for a first downlink data channel PDSCH is 4 ms, and timing for a second downlink data channel sPDSCH and a sixth downlink data channel sPDSCH is 2 ms. When a terminal device fails to detect the second downlink data channel in a second downlink subframe, and detects the first downlink data channel in a first downlink subframe but fails to detect the sixth downlink data channel in the first downlink subframe, the terminal device feeds back a receiving status of the first downlink data channel at a latency of 4 ms, and feeds back a NACK receiving state of the sixth downlink data channel in the subframe at a latency of 2 ms.

For example, as shown in part (d) of FIG. 12, timing for a first downlink data channel PDSCH is 4 ms, and timing for a second downlink data channel sPDSCH and a sixth downlink data channel sPDSCH is 2 ms. When detecting the second downlink data channel in a second downlink subframe and failing to detect the first downlink data channel or the sixth downlink data channel in a first downlink subframe, a terminal device feeds back a NACK receiving state of the first downlink data channel at a latency of 4 ms, and feeds back a NACK receiving state of the sixth downlink data channel in the subframe at a latency of 2 ms.

If the terminal device fails to detect the first downlink data channel or the sixth downlink data channel in the first downlink subframe, a corresponding receiving status in the sixth HARQ-ACK information is still "NACK" or "DTX". Therefore, after detecting the receiving status, the network device performs retransmission on a corresponding downlink data channel based on the receiving status, regardless of whether the first downlink data channel or the sixth downlink data channel is sent in the first downlink subframe.

Optionally, when a length of a time domain resource corresponding to the fifth downlink data channel (or the sixth downlink data channel) is less than the first length of the first downlink data channel, the time domain resource corresponding to the fifth uplink channel (or the sixth uplink channel) may be earlier than a time domain resource corresponding to the fourth uplink channel.

In this embodiment of the present invention, optionally, the network device may notify, by using indication information or control signaling, the terminal device whether the receiving status of the first downlink data channel needs to be added to an uplink channel. The terminal device feeds back HARQ-ACK information based on an indication of the network device.

Before sending the indication information, the network device may have determined (when the indication information is later than the first downlink data channel) whether the first downlink data channel has been sent in the first downlink subframe or have predetermined (when the indication information is earlier than the first downlink data channel) whether the first downlink data channel is to be sent in the first downlink subframe. Therefore, if the network device has not sent or expects not to send the first downlink data channel, it may indicate that the terminal device has not sent the first downlink data channel or the first downlink subframe does not include the first downlink data channel, or may indicate, to the terminal device, that the receiving status of the first downlink data channel does not need to be fed back. After receiving the control signaling, the terminal device needs to feed back only the receiving status of the second downlink data channel, and does not need to feed back the receiving status of the first downlink data channel.

Further, when the network device indicates, to the terminal device, that the first downlink subframe does not include the first downlink data channel, the network device may send the first downlink data channel and the fifth downlink data channel in the first downlink subframe. If demodulation and HARQ feedback priorities of the fifth downlink data channel are higher than those of the first downlink data channel, the network device does not require the terminal device to feed back the receiving status of the first downlink data channel. Therefore, the network device may instruct the terminal device not to feed back the receiving status of the first downlink data channel. In this case, regardless of whether the first downlink data channel is detected, the terminal device does not feed back the receiving status of the first downlink data channel. A time domain length corresponding to the fifth downlink data channel is different from that corresponding to the first downlink data channel. If the network device has sent or expects to send the first downlink data channel, or if a demodulation priority of the first downlink data channel that has been sent or is expected to be sent is higher, the network device may indicate, to the terminal device, that the first downlink subframe includes the first downlink data channel, or instruct the terminal device to feed back the receiving status of the first downlink data channel. In this case, the terminal device needs to feed back the receiving status of the first downlink data channel and that of the second downlink data channel.

Optionally, the network device may add the indication information to a downlink control channel corresponding to the second downlink data channel. The downlink control channel is a downlink control channel scheduled for the second downlink data channel. The downlink control channel and the second downlink data channel may be in a same transmission time interval or in different transmission time intervals, and may be in a same downlink subframe or in different downlink subframes. For example, the signaling is 1 bit. A status '0' indicates that the first downlink data channel has not been sent in the first downlink subframe, or indicates that the second downlink data channel is the first downlink traffic channel in a group of downlink traffic channels that need to feed back HARQ-ACK information on a same uplink channel. A status '1' indicates that the first downlink data channel has been sent in the first downlink subframe, or indicates that the second downlink data channel is the second downlink traffic channel in the group of downlink traffic channels that need to feed back HARQ-ACK information on the same uplink channel.

Optionally, the network device may further add the indication information to a downlink control channel corresponding to the eighth downlink data channel. This is similar to adding the indication information to the downlink control channel corresponding to the second downlink data channel.

Optionally, the network device may further add the indication information to a downlink control channel corresponding to the ninth downlink data channel. This is similar to adding the indication information to the downlink control channel corresponding to the second downlink data channel.

For example, when the second downlink data channel (sPDSCH) whose transmission time interval is an sTTI is later than the first downlink data channel (PDSCH) whose transmission time interval is 1 ms, the network device may add the indication information or the control signaling to a downlink control channel (sPDCCH or PDCCH) corresponding to the sPDSCH. In this way, if the network device actually does not send a PDSCH in the first downlink subframe, the network device instructs the terminal device not to add, to the uplink channel, HARQ-ACK information carrying a receiving status of the 1-ms PDSCH. In this case, the terminal device needs to feed back only HARQ-ACK information carrying a receiving status of the sPDSCH.

If the network device has sent a PDSCH in the first downlink subframe, the network device instructs the terminal device to add, to the uplink channel, HARQ-ACK information carrying a receiving status of the 1-ms PDSCH. In this case, when receiving the sPDCCH or PDCCH, the terminal device feeds back a HARQ-ACK receiving status of the PDSCH, regardless of whether the 1-ms PDSCH is detected. If the 1-ms PDSCH is not detected, the receiving status is "NACK" or "DTX".

Optionally, the first downlink subframe is located before the second downlink subframe, and the first length is greater than the second length. Further, the first downlink data channel is a 1-ms PDSCH, and the second downlink data channel is an sPDSCH. Considering that a HARQ-ACK feedback latency of a 1-ms PDSCH is greater than that of an sPDSCH, when the first downlink data channel is a 1-ms PDSCH, and the second downlink data channel is an sPDSCH, uplink channels respectively corresponding to the first downlink data channel and the second downlink data channel overlap in time domain, provided that the first downlink subframe is located before the second downlink subframe.

Optionally, a length of a time domain resource corresponding to the first uplink channel is greater than a length of a time domain resource corresponding to the second uplink channel. When the first downlink subframe includes the first downlink data channel and the second downlink subframe does not include the second downlink data channel, HARQ-ACK feedback performance of the first downlink data channel is higher when a relatively long uplink channel is used. Therefore, when the first downlink data channel is a 1-ms PDSCH, and the second downlink data channel is an sPDSCH, a length of a time domain resource corresponding to the first uplink channel is greater than a length of a time domain resource corresponding to the second uplink channel. For example, the first uplink channel is a 1 ms PUCCH, and the second uplink channel is an sPUCCH.

Figure 13:
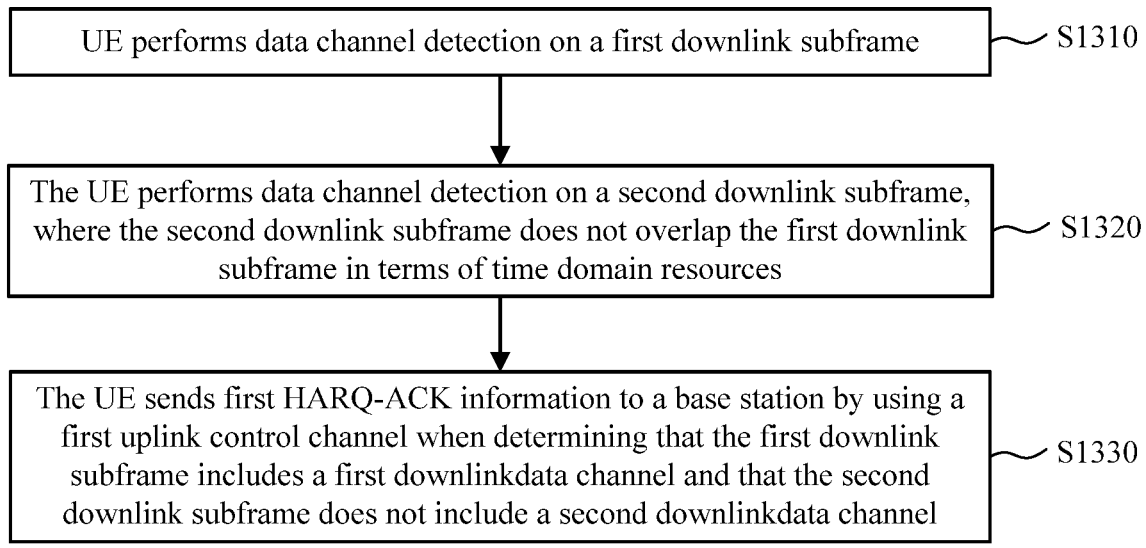
FIG. 13 is a schematic flowchart of a HARQ-ACK information feedback method according to another embodiment of the present invention.

In addition, another embodiment of the present invention further provides another HARQ-ACK information feedback method for a downlink data channel. A schematic flowchart of the feedback method is shown in FIG. 13. It should be understood that FIG. 13 shows steps or operations of the feedback method. However, these steps or operations are merely examples, and this embodiment of the present invention may further perform other operations or variants of the operations in FIG. 13. In addition, the steps in FIG. 13 may be performed in an order different from that presented in FIG. 13, and it is possible that not all operations in FIG. 13 need to be performed.

S1310. A terminal device performs data channel detection on a first downlink subframe. Herein, for a specific implementation in which the terminal device performs data channel detection on the first downlink subframe, refer to related content in the feedback method shown in FIG. 2. Details are not described herein again.

S1320. The terminal device performs data channel detection on a second downlink subframe. The first downlink subframe does not overlap the second downlink subframe in terms of time domain resources. For a specific implementation in which the terminal device performs data channel detection on the second downlink subframe, refer to related content in the feedback method shown in FIG. 2. Details are not described herein again.

S1330. The terminal device sends first HARQ-ACK information to a network device by using a first uplink channel when determining that the first downlink subframe includes a first downlink data channel and that the second downlink subframe does not include a second downlink data channel, where the first HARQ-ACK is used to indicate a receiving status of the first downlink data channel.

Optionally, after the first downlink data channel is detected in the first downlink subframe, if the terminal device determines that there is no second downlink data channel in the second downlink subframe, the terminal device sends, on the first uplink channel, first HARQ-ACK information carrying a receiving status of the first downlink data channel, and the first HARQ-ACK information also carries a receiving status of the second downlink data channel, or a receiving status of a third downlink data channel whose corresponding time domain length is different from that of the second downlink data channel and that may be sent in the second downlink subframe.

It should be understood that a downlink subframe, a downlink data channel, and an uplink channel in this embodiment of the present invention do not necessarily have meanings identical to those of a downlink subframe, a downlink data channel, and an uplink channel that are in the foregoing embodiment and that have same names as the downlink subframe, the downlink data channel, and the uplink channel in this embodiment of the present invention. For example, the first downlink subframe in this embodiment of the present invention may be the first downlink subframe in the foregoing embodiment, or may be the second downlink subframe in the foregoing embodiment. Correspondingly, the second downlink subframe in this embodiment of the present invention may be the second downlink subframe in the foregoing embodiment, or may be the first downlink subframe in the foregoing embodiment. The first downlink data channel in this embodiment of the present invention may be the first downlink data channel in the foregoing embodiment, or may be the second downlink data channel in the foregoing embodiment. Correspondingly, the second downlink data channel in this embodiment of the present invention may be the second downlink data channel in the foregoing embodiment, or may be the first downlink data channel in the foregoing embodiment. The first uplink channel in this embodiment of the present invention may be the first uplink channel in the foregoing embodiment, or may be the second uplink channel in the foregoing embodiment. This is not limited in this embodiment of the present invention.

In this embodiment of the present invention, when determining that the first downlink subframe includes the first downlink data channel and that the second downlink subframe does not include the second downlink data channel, the terminal device sends first HARQ-ACK information to the network device by using the first uplink channel, where the first HARQ-ACK is used to indicate a receiving status of the first downlink data channel. Optionally, the first downlink subframe in this embodiment may correspond to the first downlink subframe in the foregoing embodiment. The second downlink subframe in this embodiment may correspond to the second downlink subframe in the foregoing embodiment. The first downlink data channel in this embodiment may correspond to the first downlink data channel in the foregoing embodiment. The second downlink data channel in this embodiment corresponds to the second downlink data channel in the foregoing embodiment. The first HARQ-ACK information in this embodiment corresponds to the first HARQ-ACK information in the foregoing embodiment. The second HARQ-ACK information in this embodiment corresponds to the second HARQ-ACK information in the foregoing embodiment. Optionally, the first downlink subframe in this embodiment may correspond to the second downlink subframe in the foregoing embodiment. The second downlink subframe in this embodiment may correspond to the first downlink subframe in the foregoing embodiment. The first downlink data channel in this embodiment may correspond to the second downlink data channel in the foregoing embodiment. The second downlink data channel in this embodiment corresponds to the first downlink data channel in the foregoing embodiment. The second HARQ-ACK information in this embodiment corresponds to the first HARQ-ACK information in the foregoing embodiment. The first HARQ-ACK information in this embodiment corresponds to the second HARQ-ACK information in the foregoing embodiment.

In this embodiment of the present invention, optionally, when determining that the first downlink subframe includes the first downlink data channel and further determines that the second downlink subframe includes the second downlink data channel, the terminal device may send, by alternatively using the first uplink channel, the second HARQ-ACK information carrying both the receiving status of the first downlink data channel and that of the second downlink data channel.

It should be understood that, as described in the foregoing embodiment, the terminal device may directly detect a target downlink data channel in a target downlink subframe, or may determine, by detecting that the target downlink subframe includes a downlink data channel whose corresponding time domain resource length is different from that of the target downlink data channel, that the target downlink subframe does not include the target downlink data channel. Herein, the target downlink subframe is the second downlink subframe, and the target downlink data channel is the second downlink data channel. Details are not described.

Specifically, the terminal device may determine, by detecting that there is no second downlink data channel in the second downlink subframe or by detecting that a third downlink data channel exists in the second downlink subframe, that the second downlink subframe does not include the second downlink data channel, where a length of a time domain resource corresponding to the third downlink data channel is different from a length of a time domain resource corresponding to the second downlink data channel.

For example, after the terminal device detects the first downlink data channel in the first downlink subframe, when detecting that there is no second downlink data channel in the second downlink subframe, the terminal device may send, by using the first uplink channel, the first HARQ-ACK information carrying the receiving status of the first downlink data channel and a receiving status of the second downlink data channel. In this case, the receiving status of the second downlink data channel may be "NACK" or "DTX".

Alternatively, after the terminal device detects the first downlink data channel in the first downlink subframe, when detecting that the third downlink data channel exists in the second downlink subframe, the terminal device may send, by using the first uplink channel, the first HARQ-ACK information carrying the receiving status of the first downlink data channel and a receiving status of the second downlink data channel. In this case, the receiving status of the second downlink data channel may be "NACK" or "DTX".

Alternatively, after the terminal device detects the first downlink data channel in the first downlink subframe, when detecting that the third downlink data channel exists in the second downlink subframe, the terminal device may send, by using the first uplink channel, the first HARQ-ACK information carrying the receiving status of the first downlink data channel and that of the third downlink data channel.

Alternatively, after the terminal device detects the first downlink data channel in the first downlink subframe, when detecting that neither the second downlink data channel nor the third downlink data channel exists in the second downlink subframe, the terminal device may send, by using the first uplink channel, the first HARQ-ACK information carrying the receiving status of the first downlink data channel and a receiving status of the third downlink data channel. In this case, the receiving status of the third downlink data channel may be "NACK" or "DTX".

Optionally, the first downlink subframe in this embodiment may correspond to the second downlink subframe in the foregoing embodiment. The second downlink subframe in this embodiment may correspond to the first downlink subframe in the foregoing embodiment. The first downlink data channel in this embodiment may correspond to the second downlink data channel in the foregoing embodiment. The second downlink data channel in this embodiment corresponds to the first downlink data channel in the foregoing embodiment. The second HARQ-ACK information in this embodiment corresponds to the first HARQ-ACK information in the foregoing embodiment. The first HARQ-ACK information in this embodiment corresponds to the second HARQ-ACK information in the foregoing embodiment. The third downlink data channel in this embodiment corresponds to the fifth downlink data channel in the foregoing embodiment. A fourth downlink data channel in this embodiment corresponds to the sixth downlink data channel in the foregoing embodiment.

Optionally, as described in the foregoing embodiment, the first uplink channel corresponds to or is located in one of uplink sTTIs of an uplink subframe. Further, the first uplink channel corresponds to the last uplink sTTI of the uplink subframe. Correspondingly, the first downlink data channel corresponds to the last downlink sTTI of the first downlink subframe.

Optionally, as described in the foregoing embodiment, when the terminal device determines that the first downlink subframe includes the first downlink data channel and that the second downlink subframe includes the second downlink data channel, the terminal device feeds back the receiving status of the second downlink data channel in each of at least two sTTIs in the uplink subframe. Further, the at least two uplink sTTIs are located in the second slot of the uplink subframe.

Optionally, as described in the foregoing embodiment, when the terminal device determines that the first downlink subframe includes the first downlink data channel and that the second downlink subframe includes the second downlink data channel, the terminal device further feeds back the receiving status of the second downlink data channel in an uplink sTTI that is used to carry an sPDSCH receiving status and that is in the uplink subframe. Further, the uplink sTTI is located in the second slot of the uplink subframe.

Optionally, as described in the foregoing embodiment, when the terminal device determines that the first downlink subframe includes the first downlink data channel and that the second downlink subframe includes the second downlink data channel, the terminal device feeds back the receiving status of the second downlink data channel in each of at least two uplink sTTIs that are used to carry an sPDSCH receiving status and that are in the uplink subframe. In other words, the terminal device sends fifth HARQ-ACK information to the network device by using a fourth uplink channel when further determining that the first downlink subframe includes the fifth downlink data channel, where the fifth HARQ-ACK information is used to indicate the receiving status of the second downlink data channel and a receiving status of the fifth downlink data channel. It should be understood that the fifth downlink data channel does not overlap the first downlink data channel in time domain, and the fourth uplink channel does not overlap the first uplink channel in time domain. Further, a length of a time domain resource occupied by the fifth downlink data channel is equal to a length of a time domain resource occupied by the first downlink data channel. Further, the fourth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, as described in the foregoing embodiment, when the terminal device determines that the first downlink subframe includes the first downlink data channel and that the second downlink subframe does not include the second downlink data channel, the terminal device further feeds back the receiving status of the second downlink data channel in an uplink sTTI that is used to carry an sPDSCH receiving status and that is in the uplink subframe. Further, the uplink sTTI is located in the second slot of the uplink subframe. In this case, the receiving status corresponding to the second downlink data channel is "NACK" or "DTX".

Optionally, as described in the foregoing embodiment, when the terminal device determines that the first downlink subframe includes the first downlink data channel and that the second downlink subframe does not include the second downlink data channel, the terminal device feeds back the receiving status of the second downlink data channel in each of at least two uplink sTTIs that are used to carry an sPDSCH receiving status and that are in the uplink subframe. In other words, the terminal device sends sixth HARQ-ACK information to the network device by using a fifth uplink channel when further determining that the first downlink subframe includes a sixth downlink data channel, where the sixth HARQ-ACK information is used to indicate the receiving status of the second downlink data channel and a receiving status of the sixth downlink data channel. It should be understood that the sixth downlink data channel does not overlap the first downlink data channel in time domain, and the fifth uplink channel does not overlap the first uplink channel in time domain. Further, a length of a time domain resource occupied by the sixth downlink data channel is equal to a length of a time domain resource occupied by the first downlink data channel. Further, the fifth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe. In this case, the receiving status corresponding to the second downlink data channel is "NACK" or "DTX".

In this embodiment of the present invention, optionally, when detecting the third downlink data channel in the second downlink subframe, the terminal device sends, by using the first uplink channel based on HARQ-ACK feedback timing for the first downlink data channel, first HARQ-ACK information carrying the receiving status of the first downlink data channel. In addition, when the first HARQ-ACK information also carries the receiving status of the second downlink data channel in the second downlink subframe, or when the first HARQ-ACK information also carries the receiving status of the third downlink data channel in the second downlink subframe, the terminal device alternatively feeds back, based on original HARQ-ACK feedback timing for the third downlink data channel, third HARQ-ACK information on a corresponding original uplink control channel or uplink data channel (for example, the second uplink channel on a time domain resource different from that of the first uplink channel), to carry the receiving status of the third downlink data channel. The third HARQ-ACK information in this embodiment corresponds to the fifth HARQ-ACK information in the foregoing embodiment.

In other words, although only downlink traffic channels having a same length are actually sent in the second downlink subframe, the terminal device performs feedback for the downlink subframe twice. To be specific, the terminal device separately performs feedback, by using different types of HARQ timing respectively, for downlink traffic channels that have two different lengths and that may be supported in the subframe.

Optionally, a time domain resource corresponding to the second uplink channel may be different from that corresponding to the first uplink channel. More specifically, when a length of the time domain resource corresponding to the third downlink data channel is greater than a second length of the time domain resource corresponding to the second downlink data channel, the second uplink channel may be later than the first uplink channel. When the length of the time domain resource corresponding to the third downlink data channel is less than the second length, the second uplink channel may be earlier than the first uplink channel.

For example, when the first downlink subframe is earlier than the second downlink subframe, the second downlink data channel is an sPDSCH, and the first downlink data channel and the third downlink data channel are 1-ms PDSCHs, the terminal device feeds back, on the first uplink channel in the uplink subframe, a receiving status for the first downlink data channel based on HARQ timing (for example, 4 ms) for a 1-ms TTI, feeds back, on the first uplink channel, a NACK for the second downlink data channel in the second downlink subframe based on HARQ timing (for example, 2 ms) for an sTTI, and feeds back, on a second uplink channel in an uplink subframe # n+6, a receiving status for the third downlink data channel in the second downlink subframe based on HARQ timing for a 1-ms TTI, where the second uplink channel is later than the first uplink channel. For example, when the first downlink subframe is later than a second downlink subframe # n, the second downlink data channel is a 1-ms PDSCH, and the first downlink data channel and the third downlink data channel are sPDSCHs, the terminal device feeds back, on the first uplink channel in the uplink subframe, a receiving status for the first downlink data channel based on HARQ timing (for example, 2 ms) for an sTTI, feeds back, on the first uplink channel, a NACK for the second downlink data channel in the second downlink subframe based on HARQ timing (for example, 4 ms) for a 1-ms TTI, and feeds back, on a second uplink channel in the uplink subframe, a receiving status for the third downlink data channel in the second downlink subframe based on HARQ timing for an sTTI, where the second uplink channel is earlier than the first uplink channel.

In this embodiment of the present invention, optionally, when failing to detect the fourth downlink data channel in the second downlink subframe, the terminal device sends, by using the first uplink channel based on HARQ-ACK feedback timing for the first downlink data channel, first HARQ-ACK information carrying the receiving status of the first downlink data channel. Alternatively, when the first HARQ-ACK information also carries the receiving status of the second downlink data channel in the second downlink subframe, the terminal device further feeds back, based on original HARQ-ACK feedback timing for the fourth downlink data channel, fourth HARQ-ACK information on a corresponding original uplink control channel or uplink data channel (for example, a third uplink channel on a time domain resource different from that of the first uplink channel), to carry the receiving status of the fourth downlink data channel. Specifically, a time domain resource length corresponding to the fourth downlink data channel is equal to that corresponding to the third downlink data channel. The fourth HARQ-ACK information in this embodiment corresponds to the sixth HARQ-ACK information in the foregoing embodiment.

In other words, although the network device may not actually send a downlink traffic channel of any length in the second downlink subframe, or the network device has sent the downlink traffic channel but the terminal device fails to detect the downlink traffic channel, the terminal device performs feedback for the downlink subframe twice. To be specific, the terminal device separately performs feedback, by using different types of HARQ timing respectively, for downlink traffic channels that have two different lengths and that may be supported in the subframe.

For example, when the first downlink subframe is earlier than the second downlink subframe, the second downlink data channel is an sPDSCH, and the first downlink data channel and the fourth downlink data channel are 1-ms PDSCHs, or when the first downlink subframe is later than the second downlink subframe, the second downlink data channel is a 1-ms PDSCH, and the first downlink data channel and the fourth downlink data channel are sPDSCHs, a feedback form of the fourth downlink data channel is similar to that of the third downlink data channel. Details are not described again.

In this embodiment of the present invention, optionally, the network device may send control signaling or an indication message to the terminal device, to indicate that the second downlink subframe includes the second downlink data channel, or to instruct the terminal device to send, to the network device, HARQ-ACK information used to indicate the receiving status of the second downlink data channel. This is similar to sending the control signaling by the network device in the foregoing embodiment. Optionally, the first downlink subframe in this embodiment may correspond to the second downlink subframe in the foregoing embodiment. The second downlink subframe in this embodiment may correspond to the first downlink subframe in the foregoing embodiment. The first downlink data channel in this embodiment may correspond to the second downlink data channel in the foregoing embodiment. The second downlink data channel in this embodiment corresponds to the first downlink data channel in the foregoing embodiment.

If the network device has sent or expects to send the second downlink data channel in the second downlink subframe, the network device may indicate, to the terminal device, that the second downlink subframe includes the second downlink data channel, or instruct the terminal device to feed back the receiving status of the second downlink data channel. The terminal device receives control signaling sent by the network device, and sends, to the network device based on the control signaling, HARQ-ACK information used to indicate the receiving status of the second downlink data channel.

Optionally, the terminal device may receive, from a downlink control channel corresponding to the first downlink data channel, the control signaling sent by the network device. For example, the signaling is 1 bit. A status '0' indicates that the second downlink data channel has not been sent in the second downlink subframe, or indicates that the first downlink data channel is the first downlink traffic channel in a group of downlink traffic channels that need to feed back HARQ-ACK information on a same uplink channel. A status '1' indicates that the second downlink data channel has been sent or is expected to be sent in the second downlink subframe, or indicates that the first downlink data channel is the second downlink traffic channel in the group of downlink traffic channels that need to feed back HARQ-ACK information on the same uplink channel.

Optionally, the terminal device may alternatively receive, from a downlink control channel corresponding to the fifth downlink data channel, the control signaling sent by the network device. This is similar to receiving, from a downlink control channel corresponding to the first downlink data channel, the control signaling sent by the network device.

Optionally, the terminal device may alternatively receive, from a downlink control channel corresponding to the sixth downlink data channel, the control signaling sent by the network device. This is similar to receiving, from a downlink control channel corresponding to the first downlink data channel, the control signaling sent by the network device.

If the network device has not sent or expects not to send the first downlink data channel, the network device may indicate, to the terminal device, that the second downlink subframe does not include the second downlink data channel, or instruct the terminal device not to feed back the receiving status of the second downlink data channel. After receiving the control signaling, the terminal device needs to feed back only the receiving status of the first downlink data channel, and does not need to feed back the receiving status of the second downlink data channel. In this case, regardless of whether the terminal device detects the second downlink data channel, the terminal device does not feed back the receiving status of the second downlink data channel.

Further, when the network device indicates, to the terminal device, that the second downlink subframe does not include the second downlink data channel, the network device may send the second downlink data channel and the third downlink data channel in the second downlink subframe. In this case, if demodulation and HARQ feedback priorities of the third downlink data channel are higher, the network device does not require the terminal device to feed back the receiving status of the second downlink data channel. In this embodiment, the control signaling may be PDCCH dynamic signaling or RRC higher layer signaling.

If the control signaling is the RRC higher layer signaling, in order to avoid sending HARQ feedbacks of data channels having two different lengths on a same uplink time domain resource, the network device may avoid dynamic switching between a 1-ms PDSCH and an sPDSCH in a relatively long time. The network device may notify, by using the RRC signaling, the terminal device that the dynamic switching between a 1-ms PDSCH and an sPDSCH is not supported, or that the receiving status of the second downlink data channel does not need to be fed back. After receiving an indication, the terminal device does not feed back the receiving status of the second downlink data channel within a time period in which the RRC signaling is effective. The network device may notify, by using the RRC signaling, the terminal device that the dynamic switching between a 1-ms PDSCH and an sPDSCH is supported, or that the receiving status of the second downlink data channel needs to be fed back. After receiving an indication, the terminal device feeds back the receiving status of the second downlink data channel within a time period in which the RRC signaling is effective.

If the control signaling is PDCCH dynamic signaling, the control signaling may be added to the downlink control channel corresponding to the first downlink data channel, or may be added to each downlink control channel.

If the control signaling is PDCCH dynamic signaling, the control signaling may be cell-specific signaling (the signaling is specific to all activated terminal devices in a cell), or may be user-specific signaling (each piece of signaling is specific to a particular terminal device).

The control signaling may be explicit or implicit. Explicit control signaling includes: A particular bit in the RRC or PDCCH notifies the terminal device that the first uplink channel includes the receiving status of the second downlink data channel. Implicit signaling includes: The network device indicates, to the terminal device, that the second downlink subframe includes or does not include (may include or may not include) a transmission time interval length corresponding to the second downlink data channel.

If the second downlink subframe includes (may include) the second downlink data channel, the first HARQ-ACK sent by the terminal device includes the receiving status of the second downlink data channel. Otherwise, the first HARQ-ACK does not include the receiving status of the second downlink data channel.

Optionally, the first downlink subframe is located before the second downlink subframe, and the first length is greater than the second length. Further, the first downlink data channel is a 1-ms PDSCH, and the second downlink data channel is an sPDSCH. Considering that a HARQ-ACK feedback latency of a 1-ms PDSCH is greater than that of an sPDSCH, when the first downlink data channel is a 1-ms PDSCH, and the second downlink data channel is an sPDSCH, receiving statuses of the two downlink data channels are sent on a same uplink channel, provided that the first downlink subframe is located before the second downlink subframe.

Optionally, the first downlink subframe is located after the second downlink subframe, and the first length is less than the second length. Further, the first downlink data channel is an sPDSCH, and the second downlink data channel is a 1-ms PDSCH. As described in the foregoing, details are not described again.

To reduce HARQ-ACK feedback overheads, if the network device does not need to respectively feed back, on a same uplink channel based on two types of HARQ timing, receiving statuses of two downlink data channels that are located in different downlink subframes and that have different transmission time interval lengths, for example, only a latency-sensitive service or only a latency-insensitive service needs to be transmitted, or it is undesired to increase extra overheads, for example, when feedback information of an uplink channel in a multi-carrier scenario is relatively large, the network device may indicate, in a control signaling notification manner to the terminal device, that the first HARQ-ACK does not need to include the receiving status of the second downlink data channel, that is, the first HARQ-ACK includes only the receiving status of the first downlink data channel. On the contrary, if the network device needs to send both a latency-sensitive service and a latency-insensitive service, or an uplink channel capacity is relatively sufficient, the network device may indicate, to the terminal device, that the first HARQ-ACK needs to further include the receiving status of the second downlink data channel.

On a network device side, a network device receives HARQ-ACK information that is sent by a terminal device on an uplink channel, obtains, from the HARQ-ACK information, a receiving status of a first downlink data channel in a first downlink subframe and/or a receiving status of a second downlink data channel in a second downlink subframe, and then transmits downlink data based on the receiving status of the first downlink data channel in the first downlink subframe and/or the receiving status of the second downlink data channel in the second downlink subframe indicated in the HARQ-ACK information.

The uplink channel may be an uplink control channel, or may be an uplink traffic channel that may be alternatively referred to as an uplink data channel. The first downlink subframe does not overlap the second downlink subframe in terms of time domain resources.

For example, the network device receives first HARQ-ACK information that is sent by the terminal device on the first uplink channel, and the first HARQ-ACK information is used to indicate a receiving status of the first downlink data channel in the first downlink subframe. Herein, the first uplink channel may correspond to the first uplink channel in the feedback method shown in FIG. 2, or may correspond to the second uplink channel in the feedback method shown in FIG. 2. Correspondingly, the first HARQ-ACK information may correspond to the first HARQ-ACK information in the feedback method shown in FIG. 2, or may correspond to the second HARQ-ACK information in the feedback method shown in FIG. 2.

For example, the network device receives first HARQ-ACK information that is sent by the terminal device on the first uplink channel, and the first HARQ-ACK information is used to indicate a receiving status of the second downlink data channel in the second downlink subframe. Herein, the first uplink channel may correspond to the third uplink channel in the feedback method shown in FIG. 2. Correspondingly, the first HARQ-ACK information may correspond to the third HARQ-ACK information in the feedback method shown in FIG. 2.

For example, the network device receives first HARQ-ACK information that is sent by the terminal device on a first uplink channel, and the first HARQ-ACK information is used to indicate a receiving status of the first downlink data channel in the first downlink subframe and a receiving status of the second downlink data channel in the second downlink subframe. Herein, the first uplink channel may correspond to the second uplink channel in the feedback method shown in FIG. 2, and the first HARQ-ACK information may be the second HARQ-ACK information in the feedback method shown in FIG. 2. Herein, the first uplink channel may alternatively correspond to the first uplink channel in the feedback method shown in FIG. 13, and the first HARQ-ACK information may be the second HARQ-ACK information in the feedback method shown in FIG. 13.

For example, the network device receives first HARQ-ACK information that is sent by the terminal device on the first uplink channel, and the first HARQ-ACK information is used to indicate a receiving status of the first downlink data channel in the first downlink subframe and a receiving status of the second downlink data channel in the second downlink subframe. The first downlink data channel described herein corresponds to the second downlink data channel in the feedback method shown in FIG. 2. The second downlink data channel described herein corresponds to the first downlink data channel in the feedback method shown in FIG. 2. The first uplink channel described herein may correspond to the fourth uplink channel in the feedback method shown in FIG. 2. The first HARQ-ACK information described herein may correspond to the fourth HARQ-ACK information in the feedback method shown in FIG. 2. The first downlink data channel described herein may alternatively correspond to the first downlink data channel in the feedback method shown in FIG. 13. The second downlink data channel described herein may alternatively correspond to the second downlink data channel in the feedback method shown in FIG. 13. The first uplink channel described herein may alternatively correspond to the first uplink channel in the feedback method shown in FIG. 13. The first HARQ-ACK information described herein may correspond to the first HARQ-ACK information in the feedback method shown in FIG. 13. In this case, the receiving status of the second downlink data channel described herein may be "NACK" or "DTX".

For example, the network device receives the receiving status of the first downlink data channel and the receiving status of the second downlink data channel that are fed back by the terminal device on the first uplink channel, where the first uplink channel corresponds to or is located in one of uplink sTTIs of an uplink subframe. Further, the first uplink channel corresponds to the last uplink sTTI of the uplink subframe.

For example, the network device receives the receiving status of the second downlink data channel that is fed back by the terminal device in each of at least two sTTIs in the uplink subframe. Further, the at least two uplink sTTIs are located in the second slot of the uplink subframe.

For example, the network device receives the receiving status of the second downlink data channel that is fed back by the terminal device in an uplink sTTI that is used to carry an sPDSCH receiving status and that is in the uplink subframe. Further, the uplink sTTI is located in the second slot of the uplink subframe.

For example, the network device receives the receiving status of the second downlink data channel that is fed back by the terminal device in each of at least two uplink sTTIs that are used to carry an sPDSCH receiving status and that are in the uplink subframe. In other words, the network device further receives third HARQ-ACK information that is sent by the terminal device on a third uplink channel, where the third HARQ-ACK is used to indicate a receiving status of a third downlink data channel in the first downlink subframe and the receiving status of the second downlink data channel. It should be understood that the third downlink data channel does not overlap the first downlink data channel in terms of time domain resources, and the third uplink channel does not overlap the first uplink channel in time domain. Further, a length of a time domain resource occupied by the third downlink data channel is equal to a length of a time domain resource occupied by the first downlink data channel. Further, the third uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

For example, the network device receives first HARQ-ACK information that is sent by the terminal device on the first uplink channel, and the first HARQ-ACK information is used to indicate a receiving status of the first downlink data channel in the first downlink subframe and a receiving status of the third downlink data channel in the second downlink subframe. The first downlink data channel described herein corresponds to the second downlink data channel in the feedback method shown in FIG. 2. The third downlink data channel described herein corresponds to the fifth downlink data channel or the sixth downlink data channel in the feedback method shown in FIG. 2. The first uplink channel described herein may correspond to the fourth uplink channel in the feedback method shown in FIG.

2. The first HARQ-ACK information described herein may correspond to the fourth HARQ-ACK information in the feedback method shown in FIG. 2. The first downlink data channel described herein may alternatively correspond to the first downlink data channel in the feedback method shown in FIG. 13. The third downlink data channel described herein may alternatively correspond to the third downlink data channel or the fourth downlink data channel in the feedback method shown in FIG. 13. The first uplink channel described herein may alternatively correspond to the first uplink channel in the feedback method shown in FIG. 13. The first HARQ-ACK information described herein may correspond to the first HARQ-ACK information in the feedback method shown in FIG. 13. In this case, the receiving status of the second downlink data channel described herein may be "NACK" or "DTX".

Optionally, a first length of a time domain resource corresponding to the first downlink data channel may be greater than a second length of the time domain resource corresponding to the second downlink data channel, and the first downlink subframe is located before the second downlink subframe; or a first length of a time domain resource corresponding to the first downlink data channel may be less than a second length of a time domain resource corresponding to the second downlink data channel, and the first downlink subframe is located after the second downlink subframe.

Optionally, the network device may further receive second HARQ-ACK information that is sent by the terminal device on a second uplink channel, where the second HARQ-ACK information is used to indicate a receiving status of a third downlink data channel in the second downlink subframe, the second uplink channel and the first uplink channel occupy different radio resources, and a length of a time domain resource corresponding to the third downlink data channel is different from a length of a time domain resource corresponding to the second downlink data channel.

Optionally, before the network device receives the foregoing HARQ-ACK information, the network device may send control signaling to the terminal device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, the control signaling may be PDCCH dynamic signaling or RRC higher layer signaling.

Optionally, a specific implementation in which the network device sends the control signaling to the terminal device is: The network device sends the control signaling to the terminal device by using a downlink control channel corresponding to the first downlink data channel.

Optionally, a specific implementation in which the network device sends the control signaling to the terminal device is: The network device sends the control signaling to the terminal device by alternatively using a downlink control channel corresponding to the third downlink data channel.

It should be understood that the HARQ-ACK information feedback method performed by the network device corresponds to the foregoing HARQ-ACK information feedback method performed by the terminal device. For brevity, details are not described herein again.

The foregoing describes the HARQ-ACK information feedback method in the embodiments of the present invention, and the following describes a terminal device, a network device, and a communications system in the embodiments of the present invention.

Figure 14:
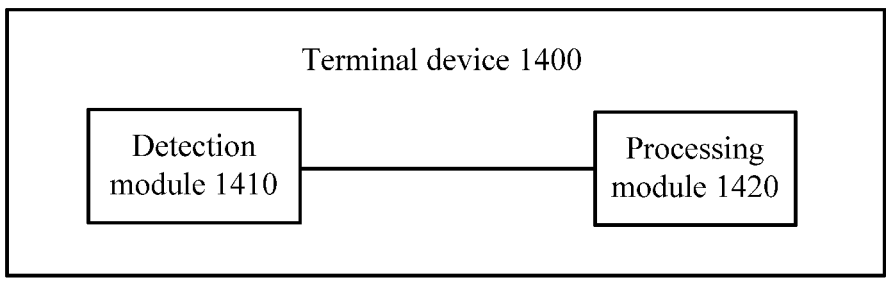
FIG. 14 is a schematic block diagram of a terminal device according to an embodiment of the present invention.

FIG. 14 is a schematic block diagram of a terminal device 1400 according to an embodiment of the present invention. It should be understood that the terminal device shown in FIG. 14 is merely an example. The terminal device in this embodiment of the present invention may further include another module or unit, or may include modules whose functions are similar to those of modules in FIG. 14, or may not include all modules in FIG. 14.

A detection module 1410 is configured to perform data channel detection on a first downlink subframe.

The detection module 1410 is further configured to perform data channel detection on a second downlink subframe, where the second downlink subframe does not overlap the first downlink subframe in terms of time domain resources.

A processing module 1420 is configured to send first HARQ-ACK information to a network device by using a first uplink channel when the detection module determines that the first downlink subframe includes a first downlink data channel and that the second downlink subframe does not include a second downlink data channel, where the first HARQ-ACK information is used to indicate a receiving status of the first downlink data channel, and a first length of a time domain resource corresponding to the first downlink data channel is different from a second length of a time domain resource corresponding to the second downlink data channel.

The processing module 1420 is further configured to send second HARQ-ACK information to the network device by using a second uplink channel when the detection module determines that the first downlink subframe includes the first downlink data channel and that the second downlink subframe includes the second downlink data channel, where the second HARQ-ACK information is used to indicate the receiving status of the first downlink data channel, and a radio resource occupied by the first uplink channel is different from that occupied by the second uplink channel.

In this embodiment of the present invention, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in an embodiment, the processing module is further configured to: send third HARQ-ACK information to the network device by using a third uplink channel when the detection module determines that the first downlink subframe includes the first downlink data channel and that the second downlink subframe includes the second downlink data channel, where the third HARQ-ACK information is used to indicate a receiving status of the second downlink data channel, and the third uplink channel overlaps the first uplink channel in time domain.

Optionally, in an embodiment, when the detection module fails to detect a seventh downlink data channel in the second downlink subframe, the second HARQ-ACK information is further used to indicate a receiving status of the seventh downlink data channel, where the seventh downlink data channel does not overlap the second downlink data channel in time domain, and a length of a time domain resource corresponding to the seventh downlink data channel is equal to the second length.

Optionally, in an embodiment, when the processing module sends the second HARQ-ACK information to the network device by using the second uplink channel, the second HARQ-ACK is further used to indicate the receiving status of the second downlink data channel.

Optionally, in an embodiment, the second uplink channel overlaps the first uplink channel in time domain.

Optionally, in an embodiment, the second HARQ-ACK information is further used to indicate a receiving status of a third downlink data channel, where the third downlink data channel and the second downlink data channel occupy a same time domain resource and occupy different carriers.

Optionally, in an embodiment, the second uplink channel corresponds to or is located in one of uplink sTTIs of an uplink subframe. Further, the second uplink channel corresponds to the last uplink sTTI of the uplink subframe. Correspondingly, the second downlink data channel corresponds to the last downlink sTTI of the second downlink subframe.

Optionally, in an embodiment, when the detection module determines that the first downlink subframe includes the first downlink data channel and that the second downlink subframe includes the second downlink data channel, the processing module is further configured to: feed back the receiving status of the first downlink data channel in each of at least two sTTIs in the uplink subframe. Further, the at least two uplink sTTIs are located in the second slot of the uplink subframe.

Optionally, in an embodiment, when the detection module determines that the first downlink subframe includes the first downlink data channel and that the second downlink subframe includes the second downlink data channel, the processing module is further configured to: further feed back the receiving status of the first downlink data channel in an uplink sTTI that is used to carry an sPDSCH receiving status and that is in the uplink subframe. Further, the uplink sTTI is located in the second slot of the uplink subframe.

Optionally, in an embodiment, when the detection module determines that the first downlink subframe includes the first downlink data channel and that the second downlink subframe includes the second downlink data channel, the processing module is further configured to: feed back the receiving status of the first downlink data channel in each of at least two uplink sTTIs that are used to carry an sPDSCH receiving status and that are in the uplink subframe. In other words, the processing module sends seventh HARQ-ACK information to the network device by using a seventh uplink channel when the detection module further determines that the second downlink subframe includes an eighth downlink data channel, where the seventh HARQ-ACK information is used to indicate the receiving status of the first downlink data channel and a receiving status of the eighth downlink data channel, the eighth downlink data channel does not overlap the second downlink data channel in time domain, and the seventh uplink channel does not overlap the second uplink channel in time domain. Further, a length of a time domain resource occupied by the eighth downlink data channel is equal to the second length. Further, the seventh uplink channel overlaps the first uplink channel in time domain, or the seventh uplink channel and the second uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the detection module is specifically configured to: when the detection module fails to detect the second downlink data channel in the second downlink subframe or detects a fourth downlink data channel in the second downlink subframe, determine that the second downlink subframe does not include the second downlink data channel, where a length of a time domain resource occupied by the fourth downlink data channel is different from the second length.

Optionally, in an embodiment, when the detection module determines that the first downlink subframe does not include the first downlink data channel and that the second downlink subframe includes the second downlink data channel, the processing module is further configured to send fourth HARQ-ACK information to the network device by using a fourth uplink channel, where the fourth HARQ-ACK information is used to indicate the receiving status of the second downlink data channel, and the fourth uplink channel overlaps the first uplink channel in time domain.

Optionally, in an embodiment, the fourth uplink channel is the same as the second uplink channel.

Optionally, in an embodiment, the detection module is specifically configured to: when failing to detect the first downlink data channel in the first downlink subframe, determine that the first downlink subframe does not include the first downlink data channel, where the fourth HARQ-ACK information is further used to indicate the receiving status of the first downlink data channel in the first downlink subframe.

Optionally, in an embodiment, the detection module is specifically configured to: when detecting a fifth downlink data channel in the first downlink subframe, determine that the first downlink subframe does not include the first downlink data channel, where a length of a time domain resource corresponding to the fifth downlink data channel is different from the first length.

Optionally, in an embodiment, the fourth HARQ-ACK information is further used to indicate the receiving status of the first downlink data channel in the first downlink subframe.

Optionally, in an embodiment, the fourth HARQ-ACK information is further used to indicate a receiving status of the fifth downlink data channel in the first downlink subframe.

Optionally, in an embodiment, the fourth uplink channel corresponds to or is located in one of uplink sTTIs of an uplink subframe.

Optionally, in an embodiment, when the detection module determines that the first downlink subframe does not include the first downlink data channel and that the second downlink subframe includes the second downlink data channel, the processing module is further configured to: further feed back the receiving status of the first downlink data channel in an uplink sTTI that is used to carry an sPDSCH receiving status and that is in the uplink subframe. Further, the uplink sTTI is located in the second slot of the uplink subframe.

When the detection module determines that the first downlink subframe does not include the first downlink data channel and that the second downlink subframe includes the second downlink data channel, the processing module is further configured to: feed back the receiving status of the first downlink data channel in each of at least two uplink sTTIs that are used to carry an sPDSCH receiving status and that are in the uplink subframe. In other words, the processing module sends eighth HARQ-ACK information to the network device by using an eighth uplink channel when the detection module further determines that the second downlink subframe includes a ninth downlink data channel, where the eighth HARQ-ACK information is used to indicate the receiving status of the first downlink data channel and a receiving status of the ninth downlink data channel, the ninth downlink data channel does not overlap the second downlink data channel in time domain, and the eighth uplink channel does not overlap the fourth uplink channel in time domain. Further, a length of a time domain resource occupied by the ninth downlink data channel is equal to the second length. Further, the eighth uplink channel overlaps the first uplink channel in time domain, or the eighth uplink channel and the fourth uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the terminal device further includes: a receiving module, configured to receive control signaling sent by the network device, where the control signaling is used to indicate that the network device has sent the first downlink data channel in the first downlink subframe, or the control signaling is used to instruct the terminal device to send, to the network device, HARQ-ACK information used to indicate the receiving status of the first downlink data channel.

Optionally, in an embodiment, the receiving module is specifically configured to receive the control signaling that is sent by the network device by using a downlink control channel corresponding to the second downlink data channel.

Optionally, in an embodiment, the receiving module is further specifically configured to receive the control signaling that is sent by the network device by using a downlink control channel corresponding to the eighth downlink data channel.

Optionally, in an embodiment, the receiving module is further specifically configured to receive the control signaling that is sent by the network device by using a downlink control channel corresponding to the ninth downlink data channel.

Optionally, in an embodiment, the processing module is further configured to: send fifth HARQ-ACK information to the network device by using a fifth uplink channel, where the fifth HARQ-ACK information is used to indicate a receiving status of the fifth downlink data channel, and the fifth uplink channel and the fourth uplink channel occupy different radio resources.

Optionally, in an embodiment, the processing module is further configured to send sixth HARQ-ACK information to the network device by using a sixth uplink channel when the detection module fails to detect a sixth downlink data channel in the first downlink subframe, where the sixth HARQ-ACK information is used to indicate a receiving status of the sixth downlink data channel, a length of a time domain resource corresponding to the sixth downlink data channel is different from the first length, and the sixth uplink channel and the fourth uplink channel occupy different radio resources.

Optionally, in an embodiment, the first downlink subframe is located before the second downlink subframe, and the first length is greater than the second length.

Optionally, in an embodiment, a length of a time domain resource corresponding to the first uplink channel is greater than a length of a time domain resource corresponding to the second uplink channel.

It should be understood that the foregoing and other operations and/or functions of all units of the terminal device in this embodiment of the present invention shown in FIG. 14 are respectively used to implement corresponding procedures of the feedback method shown in FIG. 2. For brevity, details are not described herein again.

Figure 15:
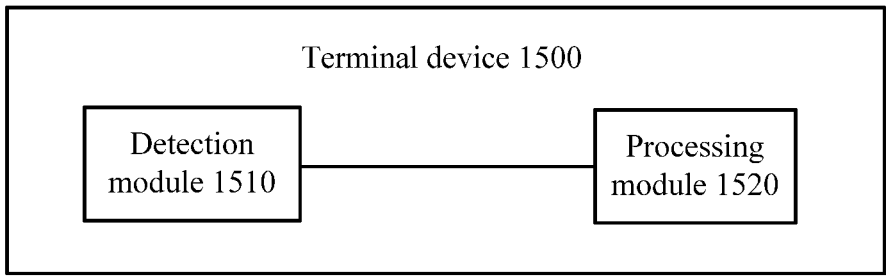
FIG. 15 is a schematic block diagram of a terminal device according to another embodiment of the present invention.

FIG. 15 is a schematic block diagram of a terminal device 1500 according to an embodiment of the present invention. It should be understood that the terminal device shown in FIG. 15 is merely an example. The terminal device in this embodiment of the present invention may further include another module or unit, or may include modules whose functions are similar to those of modules in FIG. 15, or may not include all modules in FIG. 15.

A detection module 1510 is configured to perform data channel detection on a first downlink subframe.

The detection module 1510 is further configured to perform data channel detection on a second downlink subframe, where the first downlink subframe does not overlap the second downlink subframe in terms of time domain resources.

A processing module 1520 is configured to send first HARQ-ACK information to a network device by using a first uplink channel when the detection module determines that the first downlink subframe includes the first downlink data channel and that the second downlink subframe does not include the second downlink data channel, where the first HARQ-ACK information is used to indicate a receiving status of the first downlink data channel.

In this embodiment of the present invention, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in an embodiment, the processing module is further configured to send second HARQ-ACK information to the network device by using the first uplink channel when the detection module determines that the first downlink subframe includes the first downlink data channel and that the second downlink subframe includes the second downlink data channel, where the second HARQ-ACK information is used to indicate the receiving status of the first downlink data channel and a receiving status of the second downlink data channel.

Optionally, in an embodiment, the detection module is specifically configured to: when failing to detect the second downlink data channel in the second downlink subframe, determine that the second downlink subframe does not include the second downlink data channel, where the first HARQ-ACK is further used to indicate the receiving status of the second downlink data channel.

Optionally, in an embodiment, the detection module is specifically configured to: when detecting a third downlink data channel in the second downlink subframe, determine that the second downlink subframe does not include the second downlink data channel, where a length of a time domain resource corresponding to the third downlink data channel is different from a length of a time domain resource corresponding to the second downlink data channel.

Optionally, in an embodiment, the first HARQ-ACK is further used to indicate the receiving status of the second downlink data channel.

Optionally, in an embodiment, the first HARQ-ACK is further used to indicate a receiving status of the third downlink data channel.

Optionally, in an embodiment, the first uplink channel corresponds to or is located in one of uplink sTTIs of an uplink subframe. Further, the first uplink channel corresponds to the last uplink sTTI of the uplink subframe. Correspondingly, the first downlink data channel corresponds to the last downlink sTTI of the first downlink subframe.

Optionally, in an embodiment, when the detection module determines that the first downlink subframe includes the first downlink data channel and that the second downlink subframe includes the second downlink data channel, the processing module is further configured to feed back the receiving status of the second downlink data channel in each of at least two sTTIs in the uplink subframe. Further, the at least two uplink sTTIs are located in the second slot of the uplink subframe.

Optionally, in an embodiment, when the detection module determines that the first downlink subframe includes the first downlink data channel and that the second downlink subframe includes the second downlink data channel, the processing module is further configured to further feed back the receiving status of the second downlink data channel in an uplink sTTI that is used to carry an sPDSCH receiving status and that is in the uplink subframe. Further, the uplink sTTI is located in the second slot of the uplink subframe.

Optionally, in an embodiment, when the detection module determines that the first downlink subframe includes the first downlink data channel and that the second downlink subframe includes the second downlink data channel, the processing module is further configured to feed back the receiving status of the second downlink data channel in each of at least two uplink sTTIs that are used to carry an sPDSCH receiving status and that are in the uplink subframe. In other words, the processing module sends fifth HARQ-ACK information to the network device by using a fourth uplink channel when the detection module further determines that the first downlink subframe includes a fifth downlink data channel, where the fifth HARQ-ACK information is used to indicate the receiving status of the second downlink data channel and a receiving status of the fifth downlink data channel, the fifth downlink data channel does not overlap the first downlink data channel in time domain, and the fourth uplink channel does not overlap the first uplink channel in time domain. Further, a length of a time domain resource occupied by the fifth downlink data channel is equal to a length of a time domain resource occupied by the first downlink data channel. Further, the fourth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, when the detection module determines that the first downlink subframe includes the first downlink data channel and that the second downlink subframe does not include the second downlink data channel, the processing module is further configured to further feed back the receiving status of the second downlink data channel in an uplink sTTI that is used to carry an sPDSCH receiving status and that is in the uplink subframe. Further, the uplink sTTI is located in the second slot of the uplink subframe.

Optionally, in an embodiment, when the detection module determines that the first downlink subframe includes the first downlink data channel and that the second downlink subframe does not include the second downlink data channel, the processing module is further configured to feed back the receiving status of the second downlink data channel in each of at least two uplink sTTIs that are used to carry an sPDSCH receiving status and that are in the uplink subframe. In other words, the processing module sends sixth HARQ-ACK information to the network device by using a fifth uplink channel when the detection module further determines that the first downlink subframe includes a sixth downlink data channel, where the sixth HARQ-ACK information is used to indicate the receiving status of the second downlink data channel and a receiving status of the sixth downlink data channel, the sixth downlink data channel does not overlap the first downlink data channel in time domain, and the fifth uplink channel does not overlap the first uplink channel in time domain. Further, a length of a time domain resource occupied by the sixth downlink data channel is equal to a length of a time domain resource occupied by the first downlink data channel. Further, the fifth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the terminal device further includes: a receiving module, configured to receive control signaling sent by the network device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in an embodiment, the receiving module is specifically configured to receive the control signaling that is sent by the network device by using a downlink control channel corresponding to the first downlink data channel.

Optionally, in an embodiment, the receiving module is further specifically configured to receive the control signaling that is sent by the network device by using a downlink control channel corresponding to the fifth downlink data channel.

Optionally, in an embodiment, the receiving module is further specifically configured to receive the control signaling that is sent by the network device by using a downlink control channel corresponding to the sixth downlink data channel.

Optionally, in an embodiment, the terminal device sends third HARQ-ACK information to the network device by using a second uplink channel, the third HARQ-ACK information is used to indicate the receiving status of the third downlink data channel, and the second uplink channel and the first uplink channel occupy different radio resources.

Optionally, in an embodiment, the processing module is further configured to send fourth HARQ-ACK information to the network device by using a third uplink channel when the detection module fails to detect a fourth downlink data channel in the second downlink subframe, where the fourth HARQ-ACK information is used to indicate a receiving status of the fourth downlink data channel, a length of a time domain resource corresponding to the fourth downlink data channel is different from a length of a time domain resource corresponding to the second downlink data channel, and the third uplink channel and the first uplink channel occupy different radio resources.

Optionally, in an embodiment, a first length of a time domain resource corresponding to the first downlink data channel is greater than a second length of a time domain resource corresponding to the second downlink data channel, and the first downlink subframe is located before the second downlink subframe; or the first length is less than the second length, and the first downlink subframe is located after the second downlink subframe.

It should be understood that the foregoing and other operations and/or functions of all units of the terminal device in this embodiment of the present invention shown in FIG. 15 are respectively used to implement corresponding procedures of the feedback method shown in FIG. 13. For brevity, details are not described herein again.

Figure 16:
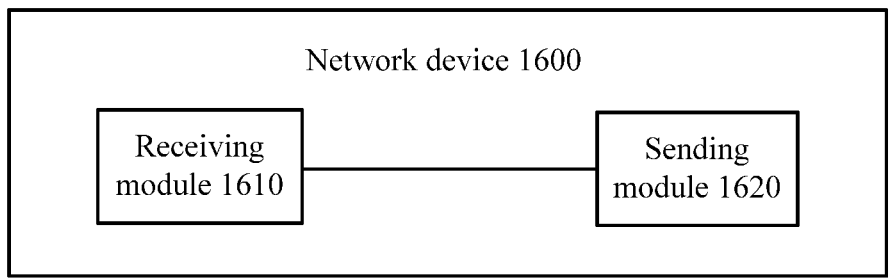
FIG. 16 is a schematic block diagram of a network device according to an embodiment of the present invention.

FIG. 16 is a schematic block diagram of a network device 1600 according to an embodiment of the present invention. It should be understood that the network device shown in FIG. 16 is merely an example. The network device in this embodiment of the present invention may further include another module or unit, or may include modules whose functions are similar to those of modules in FIG. 16, or may not include all modules in FIG. 16.

A receiving module 1610 is configured to receive first HARQ-ACK information that is sent by a terminal device on a first uplink channel, where the first HARQ-ACK is used to indicate a receiving status of a first downlink data channel in a first downlink subframe and a receiving status of a second downlink data channel in a second downlink subframe, and the first downlink subframe does not overlap the second downlink subframe in terms of time domain resources.

A sending module 1620 is configured to transmit downlink data based on the first HARQ-ACK information.

In this embodiment of the present invention, the HARQ-ACK information sent by the terminal device and received by the network device is HARQ-ACK information that is used to indicate the receiving status of the first downlink data channel and that is sent by the terminal device by using a different uplink channel, where the different uplink channel is selected, when the terminal device determines that the first downlink subframe includes the first downlink data channel, for the first downlink data channel depending on whether the second downlink subframe includes the second downlink data channel, so that HARQ-ACK information used to indicate a receiving status of a downlink data channel is properly fed back when different transmission time intervals appear during data transmission.

Optionally, in an embodiment, the receiving module is further configured to: receive the receiving status of the first downlink data channel and the receiving status of the second downlink data channel that are fed back by the terminal device on the first uplink channel, where the first uplink channel corresponds to or is located in one of uplink sTTIs of an uplink subframe. Further, the first uplink channel corresponds to the last uplink sTTI of the uplink subframe.

Optionally, in an embodiment, the receiving module is further configured to: receive the receiving status of the second downlink data channel that is fed back by the terminal device in each of at least two sTTIs in the uplink subframe. Further, the at least two uplink sTTIs are located in the second slot of the uplink subframe.

Optionally, in an embodiment, the receiving module is further configured to: receive the receiving status of the second downlink data channel that is fed back by the terminal device in an uplink sTTI that is used to carry an sPDSCH receiving status and that is in the uplink subframe. Further, the uplink sTTI is located in the second slot of the uplink subframe.

Optionally, in an embodiment, the receiving module is further configured to: receive the receiving status of the second downlink data channel that is fed back by the terminal device in each of at least two uplink sTTIs that are used to carry an sPDSCH receiving status and that are in the uplink subframe. In other words, the receiving module further receives third HARQ-ACK information that is sent by the terminal device on a third uplink channel, where the third HARQ-ACK is used to indicate a receiving status of a third downlink data channel in the first downlink subframe and the receiving status of the second downlink data channel. It should be understood that the third downlink data channel does not overlap the first downlink data channel in terms of time domain resources, and the third uplink channel does not overlap the first uplink channel in time domain. Further, a length of a time domain resource occupied by the third downlink data channel is equal to a length of a time domain resource occupied by the first downlink data channel. Further, the third uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the receiving module is further configured to: receive second HARQ-ACK information that is sent by the terminal device on a second uplink channel, where the second HARQ-ACK information is used to indicate a receiving status of a third downlink data channel in the second downlink subframe, the second uplink channel and the first uplink channel occupy different radio resources, and a length of a time domain resource corresponding to the third downlink data channel is different from a length of a time domain resource corresponding to the second downlink data channel.

Optionally, in an embodiment, the sending module is further configured to: send control signaling to the terminal device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in an embodiment, the sending module is specifically configured to send the control signaling to the terminal device by using a downlink control channel corresponding to the first downlink data channel.

Optionally, in an embodiment, the sending module is specifically configured to send the control signaling to the terminal device by using a downlink control channel corresponding to the third downlink data channel.

Optionally, in an embodiment, a first length of a time domain resource corresponding to the first downlink data channel is greater than a second length of a time domain resource corresponding to the second downlink data channel, and the first downlink subframe is located before the second downlink subframe; or the first length is less than the second length, and the first downlink subframe is located after the second downlink subframe.

It should be understood that the foregoing and other operations and/or functions of all units of the network device in this embodiment of the present invention shown in FIG. 16 are respectively used to implement corresponding procedures performed by the network device in the feedback method shown in FIG. 2 or FIG. 13. For brevity, details are not described herein again.

Figure 17:
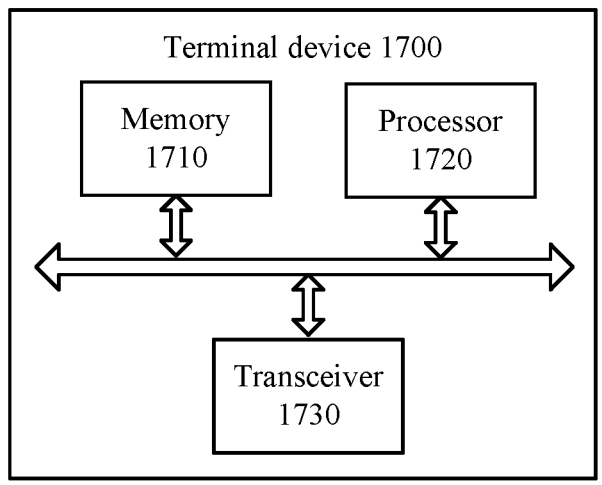
FIG. 17 is a schematic block diagram of a terminal device according to still another embodiment of the present invention.

FIG. 17 is a schematic block diagram of a terminal device 1700 according to an embodiment of the present invention. The terminal device 1700 includes a memory 1710 and a processor 1720. Optionally, the terminal device 1700 may further include a transceiver 1730.

The memory 1710 is configured to store a program.

The processor 1720 is configured to execute the program stored in the memory 1710.

When executing the program stored in the memory 1710, the processor 1720 is specifically configured to perform data channel detection on a first downlink subframe.

The processor 1720 is further configured to perform data channel detection on a second downlink subframe, where the second downlink subframe does not overlap the first downlink subframe in terms of time domain resources.

The processor 1720 is further configured to send first HARQ-ACK information to a network device by using a first uplink channel when the detection module determines that the first downlink subframe includes a first downlink data channel and that the second downlink subframe does not include a second downlink data channel, where the first HARQ-ACK information is used to indicate a receiving status of the first downlink data channel, and a first length of a time domain resource corresponding to the first downlink data channel is different from a second length of a time domain resource corresponding to the second downlink data channel.

The processor 1720 is further configured to send second HARQ-ACK information to the network device by using a second uplink channel when the detection module determines that the first downlink subframe includes the first downlink data channel and that the second downlink subframe includes the second downlink data channel, where the second HARQ-ACK information is used to indicate the receiving status of the first downlink data channel, and a radio resource occupied by the first uplink channel is different from that occupied by the second uplink channel.

In this embodiment of the present invention, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in an embodiment, the processor 1720 is further configured to: send third HARQ-ACK information to the network device by using a third uplink channel when the processor determines that the first downlink subframe includes the first downlink data channel and that the second downlink subframe includes the second downlink data channel, where the third HARQ-ACK information is used to indicate a receiving status of the second downlink data channel, and the third uplink channel overlaps the first uplink channel in time domain.

Optionally, in an embodiment, when the processor fails to detect a seventh downlink data channel in the second downlink subframe, the second HARQ-ACK information is further used to indicate a receiving status of the seventh downlink data channel, where the seventh downlink data channel does not overlap the second downlink data channel in time domain, and a length of a time domain resource corresponding to the seventh downlink data channel is equal to the second length.

Optionally, in an embodiment, when the processor sends the second HARQ-ACK information to the network device by using the second uplink channel, the second HARQ-ACK is further used to indicate a receiving status of the second downlink data channel.

Optionally, in an embodiment, the second uplink channel overlaps the first uplink channel in time domain.

Optionally, in an embodiment, the second HARQ-ACK information is further used to indicate a receiving status of a third downlink data channel, where the third downlink data channel and the second downlink data channel correspond to a same time domain resource and occupy different carriers.

Optionally, in an embodiment, the second uplink channel corresponds to or is located in one of uplink sTTIs of an uplink subframe. Further, the second uplink channel corresponds to the last uplink sTTI of the uplink subframe. Correspondingly, the second downlink data channel corresponds to the last downlink sTTI of the second downlink subframe.

Optionally, in an embodiment, when determining that the first downlink subframe includes the first downlink data channel and that the second downlink subframe includes the second downlink data channel, the processor feeds back the receiving status of the first downlink data channel in each of at least two sTTIs in the uplink subframe. Further, the at least two uplink sTTIs are located in the second slot of the uplink subframe.

Optionally, in an embodiment, when determining that the first downlink subframe includes the first downlink data channel and that the second downlink subframe includes the second downlink data channel, the processor further feeds back the receiving status of the first downlink data channel in an uplink sTTI that is used to carry an sPDSCH receiving status and that is in the uplink subframe. Further, the uplink sTTI is located in the second slot of the uplink subframe.

Optionally, in an embodiment, when determining that the first downlink subframe includes the first downlink data channel and that the second downlink subframe includes the second downlink data channel, the processor feeds back the receiving status of the first downlink data channel in each of at least two uplink sTTIs that are used to carry an sPDSCH receiving status and that are in the uplink subframe. In other words, the processor sends seventh HARQ-ACK information to the network device by using a seventh uplink channel when further determining that the second downlink subframe includes an eighth downlink data channel, where the seventh HARQ-ACK information is used to indicate the receiving status of the first downlink data channel and a receiving status of the eighth downlink data channel, the eighth downlink data channel does not overlap the second downlink data channel in time domain, and the seventh uplink channel does not overlap the second uplink channel in time domain. Further, a length of a time domain resource occupied by the eighth downlink data channel is equal to the second length. Further, the seventh uplink channel overlaps the first uplink channel in time domain, or the seventh uplink channel and the second uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the processor is specifically configured to: when failing to detect the second downlink data channel in the second downlink subframe or detecting a fourth downlink data channel in the second downlink subframe, determine that the second downlink subframe does not include the second downlink data channel, where a length of a time domain resource corresponding to the fourth downlink data channel is different from the second length.

Optionally, in an embodiment, when the processor determines that the first downlink subframe does not include the first downlink data channel and that the second downlink subframe includes the second downlink data channel, the processor is further configured to send fourth HARQ-ACK information to the network device by using a fourth uplink channel, where the fourth HARQ-ACK information is used to indicate the receiving status of the second downlink data channel, and the fourth uplink channel overlaps the first uplink channel in time domain.

Optionally, in an embodiment, the fourth uplink channel is the same as the second uplink channel.

Optionally, in an embodiment, the processor is specifically configured to: when failing to detect the first downlink data channel in the first downlink subframe, determine that the first downlink subframe does not include the first downlink data channel, where the fourth HARQ-ACK information is further used to indicate the receiving status of the first downlink data channel in the first downlink subframe.

Optionally, in an embodiment, the processor is specifically configured to: when detecting a fifth downlink data channel in the first downlink subframe, determine that the first downlink subframe does not include the first downlink data channel, where a length of a time domain resource corresponding to the fifth downlink data channel is different from the first length.

Optionally, in an embodiment, the fourth HARQ-ACK information is further used to indicate the receiving status of the first downlink data channel in the first downlink subframe.

Optionally, in an embodiment, the fourth HARQ-ACK information is further used to indicate a receiving status of the fifth downlink data channel in the first downlink subframe.

Optionally, in an embodiment, the fourth uplink channel corresponds to or is located in one of uplink sTTIs of an uplink subframe.

Optionally, in an embodiment, when determining that the first downlink subframe does not include the first downlink data channel and that the second downlink subframe includes the second downlink data channel, the processor further feeds back the receiving status of the first downlink data channel in an uplink sTTI that is used to carry an sPDSCH receiving status and that is in the uplink subframe. Further, the uplink sTTI is located in the second slot of the uplink subframe.

When determining that the first downlink subframe does not include the first downlink data channel and that the second downlink subframe includes the second downlink data channel, the processor feeds back the receiving status of the first downlink data channel in each of at least two uplink sTTIs that are used to carry an sPDSCH receiving status and that are in the uplink subframe. In other words, the processor sends eighth HARQ-ACK information to the network device by using an eighth uplink channel when further determining that the second downlink subframe includes a ninth downlink data channel, where the eighth HARQ-ACK information is used to indicate the receiving status of the first downlink data channel and a receiving status of the ninth downlink data channel, the ninth downlink data channel does not overlap the second downlink data channel in time domain, and the eighth uplink channel does not overlap the fourth uplink channel in time domain. Further, a length of a time domain resource occupied by the ninth downlink data channel is equal to the second length. Further, the eighth uplink channel overlaps the first uplink channel in time domain, or the eighth uplink channel and the fourth uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the terminal device further includes a transceiver, configured to receive control signaling sent by the network device, where the control signaling is used to indicate that the network device has sent the first downlink data channel in the first downlink subframe, or the control signaling is used to instruct the terminal device to send, to the network device, HARQ-ACK information used to indicate the receiving status of the first downlink data channel.

Optionally, in an embodiment, the transceiver is specifically configured to receive the control signaling that is sent by the network device by using a downlink control channel corresponding to the second downlink data channel.

Optionally, in an embodiment, the transceiver is specifically configured to receive the control signaling that is sent by the network device by using a downlink control channel corresponding to the eighth downlink data channel.

Optionally, in an embodiment, the transceiver is specifically configured to receive the control signaling that is sent by the network device by using a downlink control channel corresponding to the ninth downlink data channel.

Optionally, in an embodiment, the processor is further configured to: send fifth HARQ-ACK information to the network device by using a fifth uplink channel, where the fifth HARQ-ACK information is used to indicate a receiving status of the fifth downlink data channel, and the fifth uplink channel and the fourth uplink channel occupy different radio resources.

Optionally, in an embodiment, the processor is further configured to: send sixth HARQ-ACK information to the network device by using a sixth uplink channel when the detection module fails to detect a sixth downlink data channel in the first downlink subframe, where the sixth HARQ-ACK information is used to indicate a receiving status of the sixth downlink data channel, a length of a time domain resource corresponding to the sixth downlink data channel is different from the first length, and the sixth uplink channel and the fourth uplink channel occupy different radio resources.

Optionally, in an embodiment, the first downlink subframe is located before the second downlink subframe, and the first length is greater than the second length.

Optionally, in an embodiment, a length of a time domain resource corresponding to the first uplink channel is greater than a length of a time domain resource corresponding to the second uplink channel.

It should be understood that the terminal device in this embodiment of the present invention shown in FIG. 17 may correspond to the terminal device shown in FIG. 14, and the foregoing and other operations and/or functions of the units of the terminal device in this embodiment of the present invention shown in FIG. 17 are respectively used to implement corresponding procedures of the feedback method shown in FIG. 2. For brevity, details are not described herein again.

Figure 18:
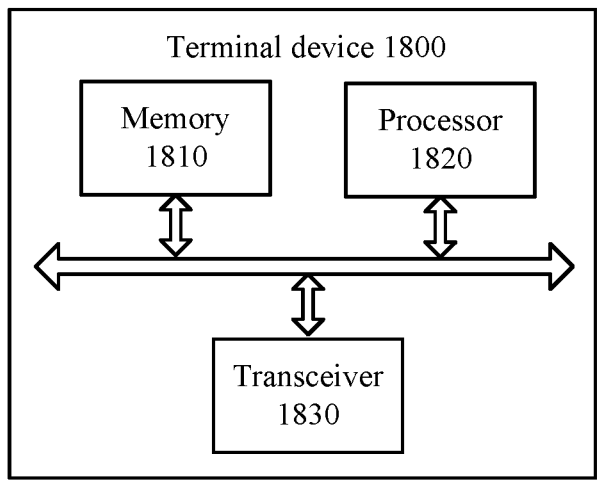
FIG. 18 is a schematic block diagram of a terminal device according to yet another embodiment of the present invention.

FIG. 18 is a schematic block diagram of a terminal device 1800 according to an embodiment of the present invention. The terminal device 1800 includes a memory 1810 and a processor 1820. Optionally, the terminal device 1800 may further include a transceiver 1830.

The memory 1810 is configured to store a program.

The processor 1820 is configured to execute the program stored in the memory 1810.

When executing the program stored in the memory 1810, the processor 1820 is specifically configured to perform data channel detection on a first downlink subframe.

The processor 1820 is further configured to perform data channel detection on a second downlink subframe, where the first downlink subframe does not overlap the second downlink subframe in terms of time domain resources.

The processor 1820 is further configured to send first HARQ-ACK information to a network device by using a first uplink channel when the detection module determines that the first downlink subframe includes the first downlink data channel and that the second downlink subframe does not include the second downlink data channel, where the first HARQ-ACK information is used to indicate a receiving status of the first downlink data channel.

In this embodiment of the present invention, when determining that the first downlink subframe includes the first downlink data channel, the terminal device selects a different uplink channel for the first downlink data channel depending on whether the second downlink subframe includes the second downlink data channel, to send HARQ-ACK information used to indicate the receiving status of the first downlink data channel, so that HARQ-ACK information used to indicate a receiving status of a downlink data channel is properly fed back to the network device when different transmission time intervals appear during data transmission.

Optionally, in an embodiment, the processor is further configured to send second HARQ-ACK information to the network device by using the first uplink channel when the processor determines that the first downlink subframe includes the first downlink data channel and that the second downlink subframe includes the second downlink data channel, where the second HARQ-ACK information is used to indicate the receiving status of the first downlink data channel and a receiving status of the second downlink data channel.

Optionally, in an embodiment, the processor is specifically configured to: when failing to detect the second downlink data channel in the second downlink subframe, determine that the second downlink subframe does not include the second downlink data channel, where the first HARQ-ACK is further used to indicate the receiving status of the second downlink data channel.

Optionally, in an embodiment, the processor is specifically configured to: when detecting a third downlink data channel in the second downlink subframe, determine that the second downlink subframe does not include the second downlink data channel, where a length of a time domain resource corresponding to the third downlink data channel is different from a length of a time domain resource corresponding to the second downlink data channel.

Optionally, in an embodiment, the first HARQ-ACK is further used to indicate the receiving status of the second downlink data channel.

Optionally, in an embodiment, the first HARQ-ACK is further used to indicate a receiving status of the third downlink data channel.

Optionally, in an embodiment, the first uplink channel corresponds to or is located in one of uplink sTTIs of an uplink subframe. Further, the first uplink channel corresponds to the last uplink sTTI of the uplink subframe. Correspondingly, the first downlink data channel corresponds to the last downlink sTTI of the first downlink subframe.

Optionally, in an embodiment, when determining that the first downlink subframe includes the first downlink data channel and that the second downlink subframe includes the second downlink data channel, the processor feeds back the receiving status of the second downlink data channel in each of at least two sTTIs in the uplink subframe. Further, the at least two uplink sTTIs are located in the second slot of the uplink subframe.

Optionally, in an embodiment, when determining that the first downlink subframe includes the first downlink data channel and that the second downlink subframe includes the second downlink data channel, the processor further feeds back the receiving status of the second downlink data channel in an uplink sTTI that is used to carry an sPDSCH receiving status and that is in the uplink subframe. Further, the uplink sTTI is located in the second slot of the uplink subframe.

Optionally, in an embodiment, when determining that the first downlink subframe includes the first downlink data channel and that the second downlink subframe includes the second downlink data channel, the processor feeds back the receiving status of the second downlink data channel in each of at least two uplink sTTIs that are used to carry an sPDSCH receiving status and that are in the uplink subframe. In other words, the processor sends fifth HARQ-ACK information to the network device by using a fourth uplink channel when further determining that the first downlink subframe includes a fifth downlink data channel, where the fifth HARQ-ACK information is used to indicate the receiving status of the second downlink data channel and a receiving status of the fifth downlink data channel, the fifth downlink data channel does not overlap the first downlink data channel in time domain, and the fourth uplink channel does not overlap the first uplink channel in time domain. Further, a length of a time domain resource occupied by the fifth downlink data channel is equal to a length of a time domain resource occupied by the first downlink data channel. Further, the fourth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, when determining that the first downlink subframe includes the first downlink data channel and that the second downlink subframe does not include the second downlink data channel, the processor further feeds back the receiving status of the second downlink data channel in an uplink sTTI that is used to carry an sPDSCH receiving status and that is in the uplink subframe. Further, the uplink sTTI is located in the second slot of the uplink subframe.

Optionally, in an embodiment, when determining that the first downlink subframe includes the first downlink data channel and that the second downlink subframe does not include the second downlink data channel, the processor feeds back the receiving status of the second downlink data channel in each of at least two uplink sTTIs that are used to carry an sPDSCH receiving status and that are in the uplink subframe. In other words, the processor sends sixth HARQ-ACK information to the network device by using a fifth uplink channel when further determining that the first downlink subframe includes a sixth downlink data channel, where the sixth HARQ-ACK information is used to indicate the receiving status of the second downlink data channel and a receiving status of the sixth downlink data channel, the sixth downlink data channel does not overlap the first downlink data channel in time domain, and the fifth uplink channel does not overlap the first uplink channel in time domain. Further, a length of a time domain resource occupied by the sixth downlink data channel is equal to a length of a time domain resource occupied by the first downlink data channel. Further, the fifth uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the terminal device further includes the transceiver, configured to receive control signaling sent by the network device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in an embodiment, the transceiver is specifically configured to receive the control signaling that is sent by the network device by using a downlink control channel corresponding to the first downlink data channel.

Optionally, in an embodiment, the terminal device sends third HARQ-ACK information to the network device by using a second uplink channel, the third HARQ-ACK information is used to indicate the receiving status of the third downlink data channel, and the second uplink channel and the first uplink channel correspond to different radio resources.

Optionally, in an embodiment, the processor is further configured to send fourth HARQ-ACK information to the network device by using a third uplink channel when the processor fails to detect a fourth downlink data channel in the second downlink subframe, where the fourth HARQ-ACK information is used to indicate a receiving status of the fourth downlink data channel, a length of a time domain resource corresponding to the fourth downlink data channel is different from a length of a time domain resource corresponding to the second downlink data channel, and the third uplink channel and the first uplink channel occupy different radio resources.

Optionally, in an embodiment, a first length of a time domain resource corresponding to the first downlink data channel is greater than a second length of a time domain length corresponding to the second downlink data channel, and the first downlink subframe is located before the second downlink subframe; or the first length is less than the second length, and the first downlink subframe is located after the second downlink subframe.

It should be understood that the terminal device in this embodiment of the present invention shown in FIG. 18 may correspond to the terminal device shown in FIG. 15, and the foregoing and other operations and/or functions of the units of the terminal device in this embodiment of the present invention shown in FIG. 18 are respectively used to implement corresponding procedures of the feedback method shown in FIG. 13. For brevity, details are not described herein again.

Figure 19:
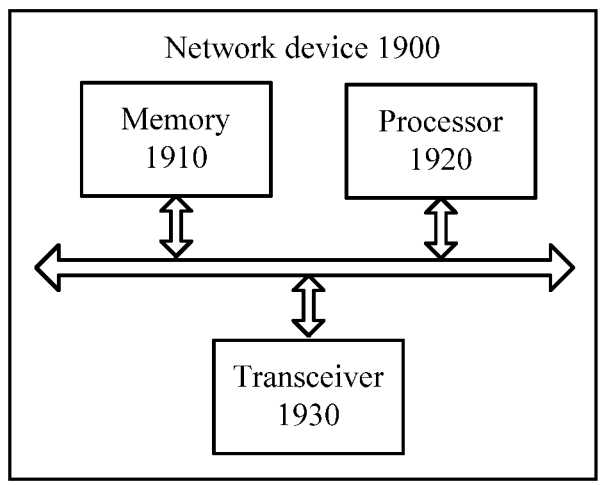
FIG. 19 is a schematic block diagram of a network device according to another embodiment of the present invention.

FIG. 19 is a schematic block diagram of a network device 1900 according to an embodiment of the present invention. The network device 1900 includes a memory 1910, a processor 1920, and a transceiver 1930.

The memory 1910 is configured to store a program.

The processor 1920 is configured to execute the program stored in the memory 1910.

When the processor 1920 executes the program stored in the memory 1910, the transceiver 1930 is specifically configured to receive first HARQ-ACK information that is sent by a terminal device on a first uplink channel, where the first HARQ-ACK is used to indicate a receiving status of a first downlink data channel in a first downlink subframe and a receiving status of a second downlink data channel in a second downlink subframe, and the first downlink subframe does not overlap the second downlink subframe in terms of time domain resources.

The transceiver 1930 is further configured to transmit downlink data based on the first HARQ-ACK information.

In this embodiment of the present invention, HARQ-ACK information sent by the terminal device and received by the network device is HARQ-ACK information that is used to indicate the receiving status of the first downlink data channel and that is sent by the terminal device by using a different uplink channel, where the different uplink channel is selected, when the terminal device determines that the first downlink subframe includes the first downlink data channel, for the first downlink data channel depending on whether the second downlink subframe includes the second downlink data channel, so that HARQ-ACK information used to indicate a receiving status of a downlink data channel is properly fed back when different transmission time intervals appear during data transmission.

Optionally, in an embodiment, the transceiver is further configured to receive the receiving status of the first downlink data channel and the receiving status of the second downlink data channel that are fed back by the terminal device on the first uplink channel, where the first uplink channel corresponds to or is located in one of uplink sTTIs of an uplink subframe. Further, the first uplink channel corresponds to the last uplink sTTI of the uplink subframe.

Optionally, in an embodiment, the transceiver is further configured to receive the receiving status of the second downlink data channel that is fed back by the terminal device in each of at least two sTTIs in the uplink subframe. Further, the at least two uplink sTTIs are located in the second slot of the uplink subframe.

Optionally, in an embodiment, the transceiver is further configured to receive the receiving status of the second downlink data channel that is fed back by the terminal device in an uplink sTTI that is used to carry an sPDSCH receiving status and that is in the uplink subframe. Further, the uplink sTTI is located in the second slot of the uplink subframe.

Optionally, in an embodiment, the transceiver is further configured to receive the receiving status of the second downlink data channel that is fed back by the terminal device in each of at least two uplink sTTIs that are used to carry an sPDSCH receiving status and that are in the uplink subframe. In other words, the transceiver is further configured to receive third HARQ-ACK information that is sent by the terminal device on a third uplink channel, where the third HARQ-ACK is used to indicate a receiving status of a third downlink data channel in the first downlink subframe and the receiving status of the second downlink data channel. It should be understood that the third downlink data channel does not overlap the first downlink data channel in terms of time domain resources, and the third uplink channel does not overlap the first uplink channel in time domain. Further, a length of a time domain resource occupied by the third downlink data channel is equal to a length of a time domain resource occupied by the first downlink data channel. Further, the third uplink channel and the first uplink channel are located in a same uplink subframe. Further, the at least two uplink sTTIs used to carry an sPDSCH receiving status include all uplink sTTIs that are used to carry an sPDSCH receiving status and that are in the uplink subframe. Further, the at least two uplink sTTIs are located in the second slot of the uplink subframe.

Optionally, in an embodiment, the transceiver is further configured to receive second HARQ-ACK information that is sent by the terminal device on a second uplink channel, where the second HARQ-ACK information is used to indicate a receiving status of a third downlink data channel in the second downlink subframe, the second uplink channel and the first uplink channel occupy different radio resources, and a length of a time domain resource corresponding to the third downlink data channel is different from a length of a time domain resource corresponding to the second downlink data channel.

Optionally, in an embodiment, the transceiver is further configured to: send control signaling to the terminal device, where the control signaling is used to indicate that the network device has sent the second downlink data channel in the second downlink subframe, or the control signaling is used to instruct the terminal device to send, to the network device, HARQ-ACK information used to indicate the receiving status of the second downlink data channel.

Optionally, in an embodiment, the transceiver is specifically configured to send the control signaling to the terminal device by using a downlink control channel corresponding to the first downlink data channel.

Optionally, in an embodiment, a first length of a time domain resource corresponding to the first downlink data channel is greater than a second length of a time domain resource corresponding to the second downlink data channel, and the first downlink subframe is located before the second downlink subframe; or the first length is less than the second length, and the first downlink subframe is located after the second downlink subframe.

It should be understood that the network device in this embodiment of the present invention shown in FIG. 19 may correspond to the network device shown in FIG. 16, and the foregoing and other operations and/or functions of the units of the network device in this embodiment of the present invention shown in FIG. 19 are respectively used to implement corresponding procedures performed by the network device in the feedback method shown in FIG. 2 or FIG. 13. For brevity, details are not described herein again.

Figure 20:
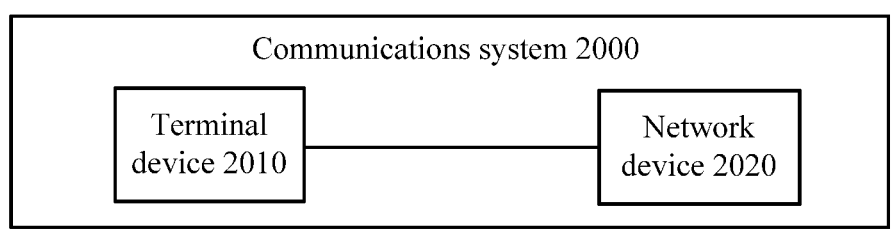
FIG. 20 is a schematic block diagram of a communications system according to an embodiment of the present invention.

FIG. 20 is a schematic block diagram of a communications system 2000 according to an embodiment of the present invention. It should be understood that the communications system shown in FIG. 20 is merely an example. The communications system in this embodiment of the present invention may further include another device or unit, or may include modules whose functions are similar to those of modules in FIG. 20, or may not include all modules in FIG. 20.

The communications system 2000 includes a terminal device 2010 and a network device 2020. The terminal device may be the terminal device 1400 shown in FIG. 14 or the terminal device 1700 shown in FIG. 17, or may be the terminal device 1500 shown in FIG. 15 or the terminal device 1800 shown in FIG. 18. The network device 2020 may be the network device 1600 shown in FIG. 16 or the network device 1900 shown in FIG. 19. For brevity, details are not described herein again.

A person of ordinary skill in the art may be aware that, the units and algorithm steps in the examples described with reference to the embodiments disclosed in the specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, read-only memory), a random access memory (RAM, random access memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A hybrid automatic repeat request-acknowledgement (HARQ-ACK) information feedback method, the method comprising:
    performing, by a communication device, data channel detection on a first downlink subframe;
    performing, by the communication device, data channel detection on a second downlink subframe, wherein the second downlink subframe does not overlap with the first downlink subframe in time domain;
    sending, by the communication device, first HARQ-ACK information to a network device by using a first uplink channel when determining that the first downlink subframe comprises a first downlink data channel and that the second downlink subframe does not comprise a second downlink data channel,
    wherein the first HARQ-ACK information indicates a receiving status of the first downlink data channel and that wherein a first length of a time domain resource corresponding to the first downlink data channel is greater than a second length of a time domain resource corresponding to the second downlink data channel; and
    sending, by the communication device, second HARQ-ACK information to the network device by using a second uplink channel when determining that the first downlink subframe comprises the first downlink data channel and that the second downlink subframe comprises the second downlink data channel, wherein the second HARQ-ACK information indicates the receiving status of the first downlink data channel, and wherein a radio resource occupied by the first uplink channel is different from that occupied by the second uplink channel, and
    wherein a length of a time domain resource corresponding to the first uplink channel is greater than a length of a time domain resource corresponding to the second uplink channel.

2. The feedback method according to claim 1, wherein the second uplink channel overlaps with the first uplink channel in time domain.

3. The feedback method according to claim 1, Wherein when the communication device sends the second HARQ-ACK information to the network device by using the second uplink channel, the second HARQ-ACK information further indicates a receiving status of the second downlink data channel.

4. The feedback method according to claim 1, further comprising, when determining that the first downlink subframe comprises the first downlink data channel and that the second downlink subframe comprises the second downlink data channel, sending, by the communication device, seventh HARQ-ACK information to the network device by using a seventh uplink channel when determining that the second downlink subframe comprises an eighth downlink data channel, wherein the seventh HARQ-ACK information is used to indicate the receiving status of the first downlink data channel and a receiving status of the eighth downlink data channel, and wherein the eighth downlink data channel not overlapping with the second downlink data channel in time domain and the seventh uplink channel not overlapping with the second uplink channel in time domain.

5. The feedback method according to claim 4, wherein the seventh uplink channel overlaps with the first uplink channel in time domain.

6. The feedback method according to claim 1, further comprising sending, by the communication device, fourth HARQ-ACK information to the network device by using the second uplink channel when determining that the first downlink subframe does not comprise the first downlink data channel and that the second downlink subframe comprises the second downlink data channel, wherein the fourth HARQ-ACK information indicates the receiving status of the first downlink data channel and the receiving status of the second downlink data channel, and wherein the second uplink channel overlaps with the first uplink channel in time domain.

7. The feedback method according to claim 6, wherein the receiving status of the first downlink data channel fed back in the fourth HARQ-ACK information is a negative acknowledgement (NACK).

8. The feedback method according to claim 6, further comprising, when determining that the first downlink subframe does not comprise the first downlink data channel and that the second downlink subframe comprises the second downlink data channel,
    sending, by the communication device, eighth HARQ-ACK information to the network device by using an eighth uplink channel when further determining that the second downlink subframe comprises a ninth downlink data channel, wherein the eighth HARQ-ACK information indicates the receiving status of the first downlink data channel and a receiving status of the ninth downlink data channel, and wherein the ninth downlink data channel does not overlap with the second downlink data channel in time domain and the eighth uplink channel does not overlap with the second uplink channel in time domain.

9. The feedback method according to claim 8, wherein the eighth uplink channel overlaps with the first uplink channel in time domain.

10. The feedback method according to claim 8, wherein the receiving status of the first downlink data channel fed back in the eighth HARQ-ACK information is a NACK.

11. The feedback method according to claim 1, wherein the first downlink sub frame is located before the second downlink subframe.

12. A device comprising:
    a non-transitory memory storing program instructions; and at least one processor in communication with the memory, wherein the at least one processor is configured to:

perform data, channel detection on a first downlink subframe;

perform data channel detection on a second downlink subframe, wherein the second downlink subframe does not overlap with the first downlink subframe in time domain; and send first hybrid automatic repeat request-acknowledgement (HARQ-ACK) information to a network device by using a first uplink channel when determining that the first downlink subframe comprises a first downlink data channel and that the second downlink subframe does not comprise a second downlink data channel, wherein the first HARQ-ACK information indicates a receiving status of the first downlink data channel, and wherein that a first length of a time domain resource corresponding to the first downlink data channel is greater than a second length of a time domain resource corresponding to the second downlink data channel; and send second HARQ-ACK information to the network device by using a second uplink channel when determining that the first downlink subframe comprises the first downlink data channel and that the second downlink subframe comprises the second downlink data channel, wherein the second HARQ-ACK information indicates the receiving status of the first downlink data channel, and wherein that a radio resource occupied by the first uplink channel is different from that occupied by the second uplink channel, and wherein a length of a time domain resource corresponding to the first uplink channel is greater than a length of a time domain resource corresponding to the second uplink channel.

13. The device according to claim 12, wherein the second uplink channel overlaps with the first uplink channel in time domain.

14. The device according to claim 12, wherein the second HARQ-ACK information further indicates a receiving status of the second downlink data channel when sending the second HARQ-ACK information to the network device by using the second uplink channel.

15. The device according to claim 12, further comprising the instructions to send seventh HARQ-ACK information to the network device, by using a seventh uplink channel when determining that the second downlink subframe comprises an eighth downlink data channel, wherein the seventh HARQ-ACK information indicates the receiving status of the first downlink data channel and a receiving status of the eighth downlink data channel, and wherein the eighth downlink data channel does not overlap with the second downlink data channel in time domain and the seventh uplink channel does not overlap with the second uplink channel in time domain.

16. The device according to claim 12, further comprising the instructions to send fourth HARQ-ACK information to the network device by using the second uplink channel when determining that the first downlink subframe does not comprise the first downlink data channel and that the second downlink subframe comprises the second downlink data channel, wherein the fourth HARQ-ACK information indicates the receiving status of the first downlink data channel and the receiving status of the second downlink data channel, and wherein the second uplink channel overlaps with the first uplink channel in time domain.

17. The device according to claim 16, further comprising the instructions to send eighth HARQ-ACK information to the network device by using an eighth uplink channel when determining that the second downlink subframe comprises a ninth downlink data channel, wherein the eighth HARQ-ACK information indicates the receiving status of the first downlink data channel and a receiving status of the ninth downlink data channel, and wherein the ninth downlink data channel does not overlap with the second downlink data, channel in time domain and the eighth uplink channel does not overlap with the second uplink channel in time domain.

18. The device according to claim 12, wherein the first downlink subframe is located before the second downlink subframe.

19. A non-transitory computer-readable storage medium comprising instructions which, when executed by a processor, cause the processor to:

perform data channel detection on a first downlink subframe;

perform data channel detection on a second downlink subframe, wherein the second downlink subframe does not overlap with the first downlink subframe in time domain; and send first hybrid automatic repeat request-acknowledgement (HARQ-ACK) information to a network device by using a first uplink channel when a detector determines that the first downlink subframe comprises a first downlink data channel and that the second downlink subframe does not comprise a second downlink data, channel, wherein the first HARQ-ACK information indicates a receiving status of the first downlink data channel and wherein that a first length of a time domain resource corresponding to the first downlink data channel is greater than a second length of a time domain resource corresponding to the second downlink data channel; and send second HARQ-ACK information to the network device by using a second uplink channel when the detector determining that the first downlink subframe comprises the first downlink data channel and that the second downlink subframe comprises the second downlink data channel, wherein the second HARQ-ACK information indicates the receiving status of the first downlink data channel, wherein that a radio resource occupied by the first uplink channel is different from that occupied by the second uplink channel, and wherein a length of a time domain resource corresponding to the first uplink channel is greater than a length of a time domain resource corresponding to the second uplink channel.

20. The device according to claim 15, wherein the seventh uplink channel overlaps with the first uplink channel in time domain.

21. The device according to claim 17, wherein the eighth uplink channel overlaps with the first uplink channel in time domain.

22. The non-transitory computer-readable storage medium according to claim 19, wherein the first downlink subframe is located before the second downlink subframe.

* * * * *

UNITED STATES PATENT AND TRADEMARK OFFICE
CERTIFICATE OF CORRECTION

PATENT NO. : 10,784,995 B2  
APPLICATION NO. : 16/370395  
DATED : September 22, 2020  
INVENTOR(S) : Yuan Li et al.

Page 1 of 2

It is certified that error appears in the above-identified patent and that said Letters Patent is hereby corrected as shown below:

In the Claims

In Column 71, Line 39, Claim 1, delete "second downlink data channel," and insert --second downlink data channel and that wherein a first length of time domain resource corresponding to the first downlink data channel is greater than a second length of a time domain resource corresponding to the second downlink data channel; and--.

In Column 71, Lines 41-42, Claim 1, delete "the first downlink data channel and that wherein" and insert --the first downlink data channel, and wherein--.

In Column 71, Line 65, Claim 3, delete "Wherein" and insert --wherein--.

In Column 72, Line 63, Claim 11, delete "sub frame" and insert --subframe--.

In Column 73, Line 3, Claim 12, delete "perform data, channel detection" and insert --perform data channel detection--.

In Column 73, Line 17, Claim 12, delete "wherein that" and insert --wherein--.

In Column 73, Line 31, Claim 12, delete "wherein that" and insert --wherein--.

In Column 74, Lines 12-13, Claim 17, delete "the second downlink data, channel" and insert --the second downlink data channel--.

In Column 74, Lines 32-33, Claim 19, delete "a second downlink data, channel" and insert --a second downlink data channel--.

In Column 74, Lines 35-36, Claim 19, delete "the first downlink data channel and wherein that a first length of a time domain resource" and insert --the first downlink data channel, and wherein a first length of a time domain resource--.

Signed and Sealed this  
Second Day of March, 2021

Drew Hirshfeld  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 10,784,995 B2

In Column 74, Lines 48-49, Claim 19, delete "the receiving status of the first downlink data channel, wherein" and insert --the receiving status of the first downlink data channel, and wherein--.